US012561055B2

(12) United States Patent
Zhou et al.

(10) Patent No.: US 12,561,055 B2
(45) Date of Patent: Feb. 24, 2026

(54) DEVICE CONTROL METHOD AND ELECTRONIC DEVICE

(71) Applicant: Huawei Technologies Co., Ltd., Shenzhen (CN)

(72) Inventors: Yu Zhou, Shenzhen (CN); Wei Wang, Shenzhen (CN); Yonglin Xia, Dongguan (CN); Chaoxiang Han, Shenzhen (CN); Siju Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/941,667

(22) Filed: Nov. 8, 2024

(65) Prior Publication Data

US 2025/0094037 A1 Mar. 20, 2025

Related U.S. Application Data

(63) Continuation of application No. PCT/CN2023/097460, filed on May 31, 2023.

(30) Foreign Application Priority Data

Jun. 6, 2022 (CN) .......................... 202210631098.5

(51) Int. Cl.
| | |
|---|---|
| *G06F 3/0488* | (2022.01) |
| *G06F 3/04847* | (2022.01) |
| *G06F 3/0485* | (2022.01) |

(52) U.S. Cl.
CPC ........ *G06F 3/0488* (2013.01); *G06F 3/04847* (2013.01); *G06F 3/0485* (2013.01); *G06F 2203/04806* (2013.01)

(58) Field of Classification Search
CPC .. G06F 3/0488; G06F 3/04847; G06F 3/0485; G06F 2203/04806; G06F 2203/04808; G06F 3/04883; G06F 3/04886; G06F 3/048; H04N 21/42224; H04N 21/42218; H04N 21/42204; H04N 21/482
See application file for complete search history.

(56) References Cited

U.S. PATENT DOCUMENTS

| | | | |
|---|---|---|---|
| 2011/0074713 A1 | 3/2011 | Yamada et al. | |
| 2013/0290844 A1* | 10/2013 | Friedlander .......... | H04N 21/482 |
| | | | 715/716 |
| 2017/0083197 A1* | 3/2017 | Lee ..................... | G06F 3/04886 |

(Continued)

FOREIGN PATENT DOCUMENTS

| | | |
|---|---|---|
| CN | 102611858 A | 7/2012 |
| CN | 102713822 A | 10/2012 |
| CN | 103645847 A | 3/2014 |

(Continued)

*Primary Examiner* — Rodney Amadiz
(74) *Attorney, Agent, or Firm* — Slater Matsil, LLP

(57) ABSTRACT

A first electronic device or a component, such as a chip system, may obtain a first touch point in a first touch area of a first control interface of the first electronic device and, in response, perform operation control in a first mode on a second electronic device. The first electronic device may obtain a second touch point in a second touch area of the first control interface and, in response, perform operation control in a second mode on the second electronic device.

20 Claims, 70 Drawing Sheets

(56) References Cited

U.S. PATENT DOCUMENTS

2019/0034075 A1* 1/2019 Smochko ............ G06F 3/04842

FOREIGN PATENT DOCUMENTS

| | | | |
|---|---|---|---|
| CN | 104349195 | A | 2/2015 |
| CN | 205566485 | U | 9/2016 |
| CN | 106331378 | A | 1/2017 |
| CN | 104321729 | B | 11/2017 |
| CN | 107728923 | A | 2/2018 |
| CN | 103914253 | B | 9/2018 |
| CN | 108958569 | A | 12/2018 |
| CN | 110381349 | A | 10/2019 |
| CN | 112218134 | A | 1/2021 |
| CN | 109309854 | B | 6/2021 |
| TW | 202145206 | A | 12/2021 |

* cited by examiner

Electronic device 100

TO

201

Clock    Settings    Recorder

Remote control

20

The short video application
C is a mobile application

CONT.
FROM

The video application A is a television application

CONT.
FROM

~
TO

The video application B supports both a
touch operation and a button operation

CONT.
FROM

The video application B supports both a
touch operation and a button operation

CONT.
FROM

The video application B supports both a
touch operation and a button operation

CONT.
FROM

~

When there are a plurality of applications on the
television, the mobile phone may display the
interface 10 of the touch remote control When the interfaces of a plurality of applications are displayed on the television, the mobile phone displays the interface 10 of the touch remote control by default The focus on the television is located on the interface 270,
and the mobile phone switches to the interface 10

The focus on the television is located on the interface 260,
and the mobile phone switches to the interface 30

The focus on the television is located on the interface 270,
and the mobile phone switches to the interface 10

The focus on the television is located on the interface 270,
and the mobile phone switches to the interface 10

The focus on the television is located on the interface 260,
and the mobile phone switches to the interface 30

The user slides from the edge of the screen to the middle, to control the television to exit the current application Control focus movement on the television on the mobile phone interface 10

The video application A is a television application

CONT.
FROM

Slide on the mobile phone screen, to control the
cursor on the television to move to the target position

CONT.
FROM

~

Slide on the mobile phone screen, to control the
cursor on the television to move Slide on the mobile phone screen, to control the cursor
on the television to move to the target position The short video application C is a mobile application

CONT.
FROM

~

CONT.
FROM

230

TO

Image

Tap the control 111, to trigger a gesture mode

CONT.
FROM

~

In a focus movement mode, the finger of the user slides up to
the position 112 on the mobile phone screen

CONT.
FROM

In a tap mode, the user taps any position on the screen

CONT.
FROM

~

If it is detected that the mobile phone is held by the right hand, the switch control is displayed on the right part of the screen If the user is used to performing an operation on the lower right part of the screen, the switch control is displayed on the lower right part of the screen Television display
(a)

Mobile phone display
(b)

CONT.
FROM

~

Slide quickly

CONT.
FROM

DEVICE CONTROL METHOD AND ELECTRONIC DEVICE

CROSS-REFERENCE TO RELATED APPLICATIONS

This application is a continuation of International Application No. PCT/CN2023/097460, filed on May 31, 2023, which claims priority to Chinese Patent Application No. 202210631098.5, filed on Jun. 6, 2022. The disclosures of the aforementioned applications are hereby incorporated by reference in their entireties.

TECHNICAL FIELD

This application relates to the field of communication technologies, and in particular, to a device control method and an electronic device.

BACKGROUND

Currently, an increasing quantity of users choose to use large-screen devices. A user may interact with a large-screen device, to meet different audio-visual experience requirements.

In a process of interaction between the user and the large-screen device, the user mainly uses a remote control to control the large-screen device, and needs to frequently press buttons on the remote control. This leads to complex operations, poor device interaction experience, and low control efficiency.

SUMMARY

This application provides a device control method and an electronic device, to improve efficiency and experience of interaction between a user and a large-screen device.

To achieve the foregoing technical objective, the following technical solutions are used in this application.

According to a first aspect, a device control method is provided. The method is applied to a first electronic device or a component (for example, a chip system) that can support the first electronic device in implementing a function, where the first electronic device performs operation control on content displayed on a second electronic device, and the method includes: obtaining a first touch point, and performing operation control in a first mode on the second electronic device in any area of a first control interface of the first electronic device based on that the first touch point belongs to a first touch area; and obtaining a second touch point, and performing operation control in a second mode on the second electronic device in any area of the first control interface based on that the second touch point belongs to a second touch area.

It may be learned that a user can conveniently trigger a remote control mode. After the remote control mode is triggered, the user may perform operation control in a large area range (for example, the full screen) of the first electronic device. This facilitates a user operation and improves efficiency and experience of interaction between the user and the second electronic device.

For example, the first electronic device is a mobile phone, the second electronic device is a television, and the first mode is a focus movement mode. As shown in FIG. 6B, the user inputs an operation on an interface 10 (the first control interface), the first touch point of the operation is a point A, and the first touch point A belongs to a focus movement control area 101 (the first touch area). In this case, the mobile phone performs operation control on the television in any area of the interface 10 in the focus movement mode (the first mode). For example, the user may slide in any area of the interface 10, and the mobile phone controls content displayed on the television. In this solution, in a process in which the user uses the mobile phone daily, the user can control the content displayed on the television, and the user can control the television in a habitual interaction manner (for example, control the television by operating the mobile phone). Therefore, a holding manner of the mobile phone and a gesture of interaction between the user and the mobile phone do not need to be changed. In addition, in some use scenarios, this is also convenient for the user to implement a one-hand operation, and reduces learning costs of controlling the television by the user.

In a possible design, both the first touch area and the second touch area belong to the first control interface, the first touch point is a start point of a first slide operation, and the second touch point is a start point of a second slide operation;

the obtaining a first touch point, and performing operation control in a first mode on the second electronic device in any area of a first control interface based on that the first touch point belongs to a first touch area includes: obtaining the start point of the first slide operation, and performing, on the second electronic device on the first control interface based on that the start point of the first slide operation belongs to the first touch area, operation control associated with the first slide operation in the first mode; and the obtaining a second touch point, and performing operation control in a second mode on the second electronic device in any area of the first control interface based on that the second touch point belongs to a second touch area includes: obtaining the start point of the second slide operation, and performing, on the second electronic device on the first control interface based on that the start point of the second slide operation belongs to the second touch area, operation control associated with the second slide operation in the second mode.

For example, as shown in FIG. 16B(a) and FIG. 16B(b), it is assumed that the first touch area is a focus movement control area 1807, the second touch area is a gesture control area 1806, the first mode is a focus movement mode, and the second mode is a gesture mode. The user inputs a slide operation (the first slide operation) on an interface 1805 (the first control interface), and a start point of the slide operation is located in the focus movement control area 1807. In this case, the mobile phone performs, on the television in the focus movement mode on the interface 1805, the operation control associated with the slide operation. For example, in response to the slide operation of the user, the mobile phone may control the television to move a focus on the television.

Similarly, the user inputs a slide operation (the second slide operation) on an interface 1805, and a start point of the slide operation is located in the gesture control area 1806. In this case, the mobile phone performs, on the television in the gesture mode on the interface 1805, the operation control associated with the slide operation. For example, in response to the slide operation of the user, the mobile phone may control scrolling of a display interface on the television, zooming in or out of the display interface on the television, and the like.

It can be learned that, in different time periods, the interface of the mobile phone may be in different remote control modes (for example, the focus movement mode or the gesture mode). In the focus movement mode or the gesture mode, the user may perform an operation in a larger screen range of the mobile phone, for example, on the entire display interface. This is convenient for controlling the television. For example, after the focus movement mode is triggered, a finger of the user may slide back and forth on the full screen of the mobile phone for a plurality of times, and slide tracks are not limited. This improves continuity of an interaction operation between the user and a device, and further improves interaction efficiency and interaction experience.

In a possible design, the first touch area is a focus movement control area, the first mode is a focus movement mode, and the operation control performed on the second electronic device includes: moving a focus on a display interface of the second electronic device; and the second touch area is a gesture control area, the second mode is a gesture mode, and the operation control performed on the second electronic device includes: scrolling the display interface of the second electronic device, or zooming in or out the display interface of the second electronic device.

The user may perform a plurality of types of operation control on the television by using the first electronic device, to meet rich interaction requirements of the user and improve interaction experience.

In a possible design, the method further includes:

in the focus movement mode or the gesture mode, receiving an input operation on the first control interface, and in response to the input operation, performing an associated operation on the display interface of the second electronic device, where the input operation includes at least one of the following: tap, double-tap, and touch and hold.

For example, as shown in FIG. 23(a), in the focus movement mode, the finger of the user slides up on the mobile phone interface 10 (an end position of a slide-up operation is shown by a mark 112), to control the focus on the television interface 70 to move from a movie identifier shown by a mark 702 to an input box 701. In an example, as shown in FIG. 23(b), the user may lift the finger and tap a position (for example, tap a point B on the mobile phone screen) on the interface 10. In response to an operation (an example of the input operation) of tapping the point B by the user, as shown in FIG. 23(c), the input box 701 on the interface 10 obtains the focus, the mobile phone may invoke a virtual keyboard, and the user may input content in the input box 701 on a television interface 80 by using the virtual keyboard. In some application scenarios, in the focus movement mode, a range of a tap operation performed by the user may be set to any position other than the function area 109, to avoid an accidental touch caused by the tap operation of the user on another control in the function area 109.

In a possible design, the method further includes: obtaining information about an application on the display interface of the second electronic device; and switching the first electronic device from the first control interface to a second control interface based on the obtained information about the application, where a manner of performing operation control on the second electronic device on the second control interface is different from a manner of performing operation control on the second electronic device on the first control interface.

In a possible design, the method further includes:

obtaining an intention of a user to perform operation control on the second electronic device; and the obtaining information about an application on the display interface of the second electronic device includes:

obtaining information about the display interface of the second electronic device in response to the intention, where the information about the display interface includes the information about the application on the display interface.

In a possible design, the switching the first electronic device from the first control interface to a second control interface based on the obtained information about the application includes:

displaying an interface switching prompt on the first electronic device based on the obtained information about the application; and obtaining a selection operation associated with the prompt, and switching from the first control interface to the second control interface in response to the selection operation.

For example, as shown in FIG. 14D(a), if the focus on the television is located on an interface 270 of a note application (it is assumed that the note application is a mobile application), after obtaining a remote control intention of the user, the mobile phone may display the touch remote control interface 10 that matches the television interface 270. For example, as shown in FIG. 14D(b), if the focus on the television is located on an interface 260 of a video application (it is assumed that the video application is a television application), after obtaining a remote control intention of the user, the mobile phone may display an interface switching prompt 601. The mobile phone obtains a selection operation associated with the prompt 601. For example, if the user taps a "Yes" button (the selection operation), as shown in FIG. 14D(c), the mobile phone may switch from the touch remote control interface 10 (an example of the first control interface) to a button remote control interface 30 (an example of the second control interface) that matches the television interface 260.

In this solution, the mobile phone may automatically switch, for the user based on an intention of using an application on the television (for example, moving the focus on the television to an interface of the application), a remote control interface that matches the application. This avoids high operation complexity caused by a case in which the user operates a control like a control 103 to trigger switching of forms of a remote control.

In a possible design, the information about the application includes a type of the application.

In a possible design, the second control interface is an operation control interface including a button control component.

For example, the mobile phone displays the interface 30 shown in FIG. 8(b). The interface 30 is an operation control interface including a button control component. For example, as shown in FIG. 8(b), the interface 30 may include buttons, for example, direction buttons such as an up button 301, a down button 302, a left button 303, and a right button 304, and a confirm (OK) button.

In a possible design, the method further includes:

obtaining an interface switching event on the first electronic device; and switching the first electronic device from the first control interface to a second control interface in response to the interface switching event, where a manner of performing operation control on the second electronic device on the second control interface is different from a manner of performing operation control on the second electronic device on the first control interface.

For example, after the mobile phone displays the touch remote control interface by default, the user may perform some operations, for example, tap the control 103 on the mobile phone interface 10 shown in FIG. 14B, to control the mobile phone to switch to the button remote control interface. In other words, in response to an interface switching event triggered by the user, the mobile phone switches styles of the remote control interface.

In a possible design, the mobile phone may further control switching of the forms of the remote control in another possible application scenario. This application scenario includes but is not limited to a scenario in which the user opens an application. For example, as shown in FIG. 15(*b*), the mobile phone currently displays the touch remote control interface 10, and it is assumed that the focus of the television is located on an icon of a video application A. The mobile phone learns, in response to the tap operation of the user, that the user wants to open the video application A on the television. In this way, as shown in FIG. 15(*c*), the mobile phone may control the television to open the video application A, and a home application interface of the video application A may be displayed on the television. In addition, the mobile phone may switch from the remote control interface 10 to the button remote control interface 30 that matches the video application A. This helps the user perform an operation on a television application (for example, the video application A) on the television on the button remote control interface 30 of the mobile phone. In this solution, the mobile phone may automatically switch, for the user based on an intention of opening an application on the television (for example, selecting an icon of the application on the television on the mobile phone interface), a remote control interface that matches the application. This avoids high operation complexity caused by a case in which the user operates a control like a control 103 to trigger switching of the forms of the remote control.

In a possible design, the first control interface includes a function area, the function area includes one or more function controls, and when being operated, the one or more function controls are capable of executing one or more corresponding functions associated with the second electronic device.

For example, as shown in FIG. 5(*b*), the interface 10 includes the function area 109, and the function area 109 includes one or more function controls (for example, a control 102 to a control 107).

In a possible design, in the focus movement mode or the gesture mode, an area available for the input operation is that of the first control interface excluding the function area. For example, as shown in FIG. 5(*b*), to prevent the user from accidentally triggering the function control in the function area 109, an area in which the user can perform an operation similar to a tap operation or the like is an area, on the interface 10, other than the function area 109.

In a possible design, the method further includes: displaying a setting interface based on an obtained user instruction, where the setting interface is used for setting content associated with the first touch area on the first control interface. For example, as shown in FIG. 24A(b), the mobile phone displays a setting interface 1901. The setting interface 1901 may be used for setting content associated with the focus movement control area on the touch remote control interface. For example, the setting interface may be used for setting a position, a shape, and a size of the focus movement control area.

In a possible design, the content indicates one or more of the following items of the first touch area: a shape, a position, and a size of the area.

In a possible design, the setting interface is further used for setting content associated with the second touch area on the first control interface.

In a possible design, before the second electronic device is controlled to perform an operation corresponding to the first slide operation, the method further includes:
obtaining an operation parameter of the first slide operation, where the operation parameter includes one or more of speed, acceleration, and distance; and
the performing, on the second electronic device on the first control interface based on that the start point of the first slide operation belongs to the first touch area, operation control associated with the first slide operation in the first mode includes:
performing, on the second electronic device in the first mode on the first control interface based on the information that the start point of the first slide operation belongs to the first touch area and the operation parameter of the first slide operation, the operation control associated with the first slide operation.

For example, as shown in FIG. 30(*a*), the user inputs a slide operation, a start point of the slide operation is located in the focus movement control area, and a speed of the slide operation is high. In this case, the mobile phone controls the focus on the television to quickly move from a position 405 to a position 404. In this implementation, the focus on the television can be quickly moved. As shown in FIG. 30(*b*), the user inputs a slide operation, a start point of the slide operation is located in the focus movement control area, and a speed of the slide operation is low. In this case, the mobile phone controls the focus on the television to slowly move from the position 405 to a position 406. In this implementation, the focus on the television can be precisely moved.

In a possible design, the method further includes:
detecting a holding posture of the user on the first electronic device; and
displaying the first control interface based on the holding posture, where a layout of the first touch area and/or the second touch area on the first control interface is associated with the holding posture.

In a possible design, if the holding posture is right-hand holding, the first touch area and/or the second touch area are/is laid out on a right side of the first control interface; or if the holding posture is left-hand holding, the first touch area and/or the second touch area are/is laid out on a left side of the first control interface.

For example, as shown in FIG. 28A, if the user holds the mobile phone with a right hand, the focus movement control area 101 is laid out on a right side of the interface 10. In some examples, an area, on the interface 10, other than the function area 109 and the focus movement control area 101 is considered as a gesture control area 111. Similarly, if the user holds the mobile phone with a left hand, the focus movement control area 101 and/or the gesture control area 111 are/is laid out on a left side of the interface 10.

Optionally, the focus movement control area 101 and the gesture control area 111 may be displayed near a thumb operation area. In this way, the user can conveniently control the television by performing the one-hand operation.

According to a second aspect, this application provides an electronic device. The electronic device has a function of implementing the device control method according to any one of the foregoing aspect and the possible implementations of the aspect. The function may be implemented by hardware, or may be implemented by hardware executing corresponding software. The hardware or the software includes one or more modules corresponding to the function.

According to a third aspect, this application provides a computer-readable storage medium. The computer-readable storage medium stores a computer program (which may also be referred to as instructions or code). When the computer program is executed by an electronic device, the electronic device is enabled to perform the method according to any one of the first aspect or the implementations of the first aspect.

According to a fourth aspect, this application provides a computer program product. When the computer program product runs on an electronic device, the electronic device is enabled to perform the method according to any one of the first aspect or the implementations of the first aspect.

According to a fifth aspect, this application provides a circuit system. The circuit system includes a processing circuit, and the processing circuit is configured to perform the method according to any one of the first aspect or the implementations of the first aspect.

According to a sixth aspect, this application provides a chip system, including at least one processor and at least one interface circuit. The at least one interface circuit is configured to: perform a sending/receiving function, and send instructions to the at least one processor. When the at least one processor executes the instructions, the at least one processor performs the method according to any one of the first aspect or the implementations of the first aspect.

BRIEF DESCRIPTION OF THE DRAWINGS

FIG. 7(a) and FIG. 7(b) to FIG. 12(a) to FIG. 12(c) are diagrams of interfaces according to an embodiment of this application;

FIG. 21(a) and FIG. 21(b) to FIG. 23(a) to FIG. 23(c) are diagrams of interfaces according to an embodiment of this application;

FIG. 30(a) and FIG. 30(b) to FIG. 32(a) and FIG. 32(b) are diagrams of interfaces according to an embodiment of this application;

DETAILED DESCRIPTION OF ILLUSTRATIVE EMBODIMENTS

The terms "first" and "second" mentioned below are merely intended for an objective of description, and shall not be understood as an indication or implication of relative importance or an implicit indication of a quantity of indicated technical features. Therefore, a feature limited by "first" or "second" may explicitly or implicitly include one or more features. In description of embodiments, unless otherwise specified, "a plurality of" means two or more.

Figure 1:
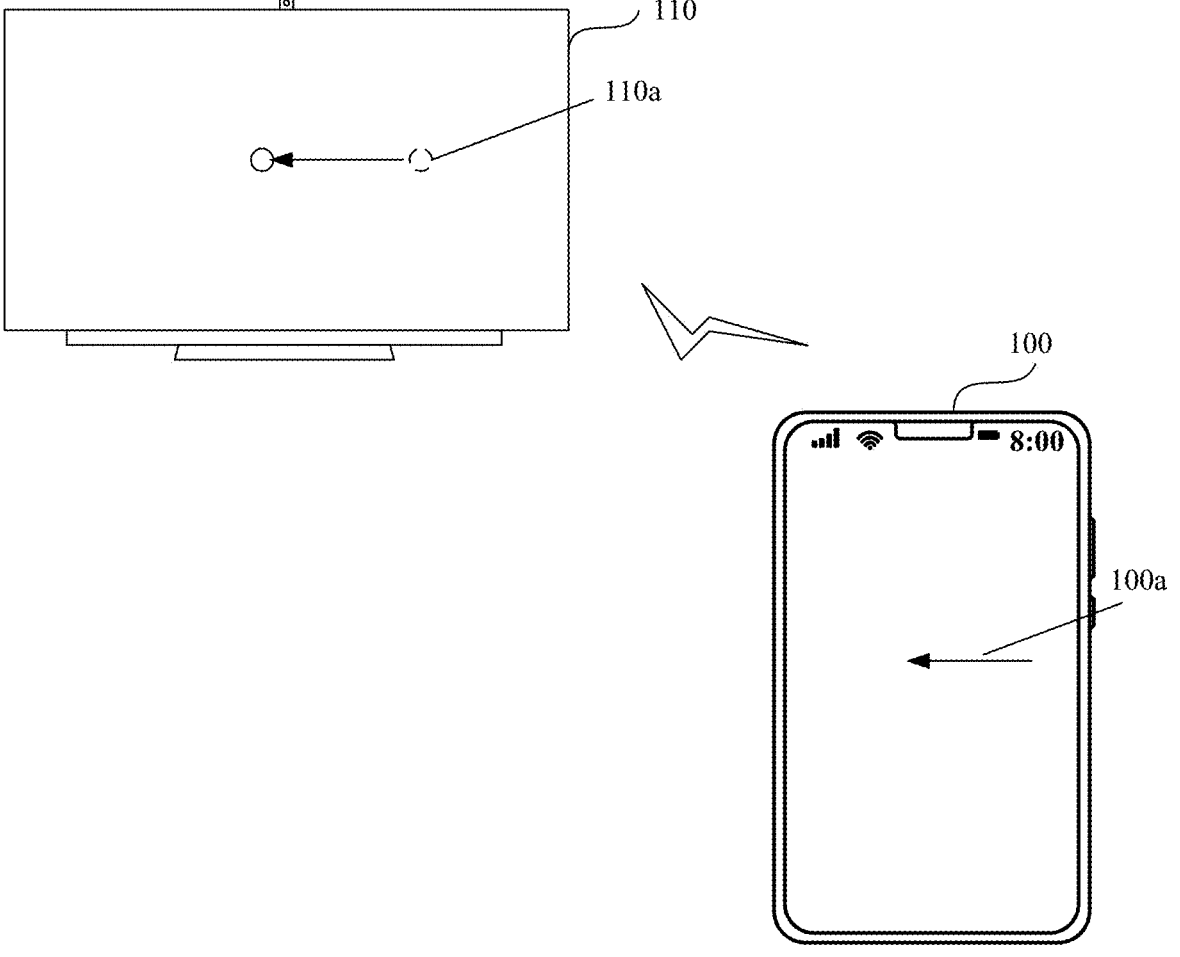
FIG. 1 is a diagram of a system architecture according to an embodiment of this application.

A method provided in embodiments of this application may be applied to a smart home control system (for example, a system for controlling a large-screen device like a television). FIG. 1 shows an example architecture of a smart home control system applicable to an embodiment of this application. The system includes a first electronic device 100 and a second electronic device 110.

The first electronic device 100 may be a device like a mobile phone, a tablet computer, a laptop computer, a handheld computer, or a notebook computer. A specific form of the first electronic device is not specially limited in embodiments of this application. In some examples, the first electronic device 100 may include a touchscreen, and a user may input operation information on the touchscreen of the first electronic device 100. The first electronic device 100 may send the operation information of the user to the second electronic device 110, to control the second electronic device 100 to perform a corresponding operation. For example, as shown in FIG. 1, the first electronic device 100 receives a left slide operation (as shown by a mark 100a) of the user, and sends information about the left slide operation (for example, a slide amplitude of the left slide operation) to the second electronic device 110. In some examples, the second electronic device 110 moves a focus 110a (for example, a cursor) of the second electronic device 110 leftward based on the information about the left slide operation. In some examples, a display of the first electronic device 100 may be virtualized as a remote control, and the remote control may be used to control the second electronic device.

In this embodiment of this application, the first electronic device 100 may also be referred to as a control device.

The second electronic device 110 may be, but is not limited to, a device including a screen, for example, a smart screen, a smart television, a smart projector, a smart display, a head unit/vehicle-mounted smart screen, a tablet, or a computer. The second electronic device 110 may receive the operation information of the user from the first electronic device 100, and perform the corresponding operation based on the operation information.

In this embodiment of this application, the second electronic device 110 may also be referred to as a controlled smart device, a controlled device, a display device, or the like.

In this embodiment of this application, a connection may be established between the first electronic device 100 and the second electronic device 110. The connection may be a connection based on a Bluetooth protocol, or may be a wireless fidelity (Wi-Fi) connection, or may be a connection of another type. A protocol standard type of the connection is not limited in embodiments of this application.

Optionally, the first electronic device 100 and the second electronic device 110 in this embodiment of this application may be located in a same local area network. In some other embodiments, the first electronic device 100 and the second electronic device 110 may alternatively be located in different local area networks.

Figure 2:
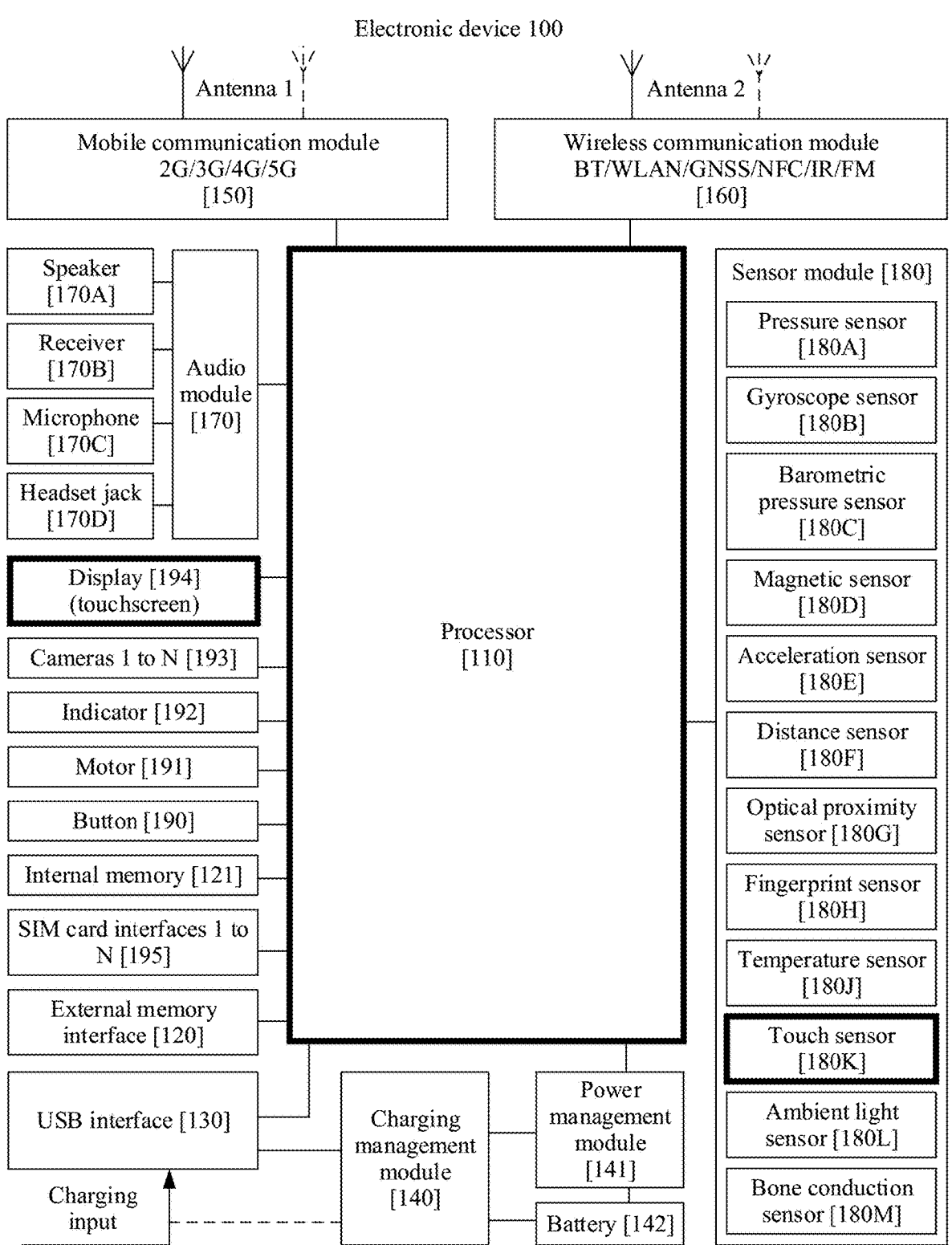
FIG. 2 is a diagram of a structure of an electronic device according to an embodiment of this application.

For example, the first electronic device 100 is a mobile phone. FIG. 2 is a diagram of an example structure of a mobile phone according to an embodiment of this application. As shown in FIG. 2, the first electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like.

The sensor module 180 may include sensors such as a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, and a bone conduction sensor 180M.

It may be understood that the structure shown in this embodiment of the present invention does not constitute a specific limitation on the first electronic device 100. In some other embodiments of this application, the first electronic device 100 may include more or fewer components than those shown in the figure, or a combination of a part of the components, or splits from a part of the components, or an arrangement of different components. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store the instructions or the data that have/has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, a universal serial bus (USB) interface, and/or the like.

It may be understood that an interface connection relationship between the modules that is shown in embodiments of the present invention is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 may further supply power to the electronic device through the power management module 141 while charging the battery 142.

The power management module 141 is configured to connect the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes 2G/3G/4G/5G or the like and that is applied to the electronic device 100. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transferred to the application processor. The application processor outputs a sound signal by using an audio device (which is not limited to the speaker 170A, or the receiver 170B), or displays an image or a video on the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that is applied to the electronic device 100 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more components integrating at least one communication processor module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the electronic device 100, the antenna 1 is coupled to the mobile communication module 150, and the antenna 2 is coupled to the wireless communication module 160, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-CDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 may implement a display function by using the GPU, the display 194, the application processor, and the like. The GPU is a microprocessor for image processing, and connects the display 194 and the application processor. The GPU is configured to: perform mathematical and geometric computation, and render an image. The processor 110 may include one or more GPUs, which execute program instructions to generate or change display information.

The display 194 is configured to display an image, a video, or the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (dot light-emitting diode, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is emitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and the like of the image. The ISP may further optimize parameters such as exposure and a color temperature of a photographing scene. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format like RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play or record videos in a plurality of encoding formats, for example, moving picture experts group (MPEG)-1, MPEG-2, MPEG-3, and MPEG-4.

The NPU is a neural-network (NN) computing processor, and quickly processes input information by referring to a structure of a biological neural network, for example, a transfer mode between human brain neurons, and may further continuously perform self-learning. Applications such as intelligent cognition of the electronic device 100, for example, image recognition, facial recognition, speech recognition, and text understanding, may be implemented by using the NPU.

The external memory interface 120 may be used to connect to an external storage card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a nonvolatile memory, for example, at least one magnetic disk storage device, a flash memory device, or a universal flash storage (UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode by using the speaker 170A.

The receiver 170B, also referred to as an "earpiece", is configured to convert an audio electrical signal into a sound signal. When a call is answered or voice message is received by using the electronic device 100, the receiver 170B may be put close to a human ear to listen to a voice.

The microphone 170C, also referred to as a "mike" or a "mic", is configured to convert a sound signal into an electrical signal. When making a call or sending a voice message, the user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be a USB interface 130, or may be a 3.5 mm open mobile terminal platform (OMTP) standard interface or cellular telecommunications industry association of the USA (CTIA) standard interface.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may also be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or different types. The SIM card interface 195 may further be compatible with different types of SIM cards. The SIM card interface 195 may further be compatible with an external storage card. The electronic device 100 interacts with a network through the SIM card, to implement functions such as calling and data communication. In some embodiments, the electronic device 100 uses an eSIM, namely, an embedded SIM card. The eSIM card may be embedded into the electronic device 100, and cannot be separated from the electronic device 100.

All methods in the following embodiments may be implemented on the electronic device 100 having the foregoing hardware structure.

A software system of the electronic device 100 may use a layered architecture, an event-driven architecture, a micro-kernel architecture, a micro service architecture, or a cloud architecture. In this embodiment of this application, a lay-
ered system architecture (for example, a system like an
Android® system) is used as an example to describe a
software structure of the electronic device 100.

Figure 3:
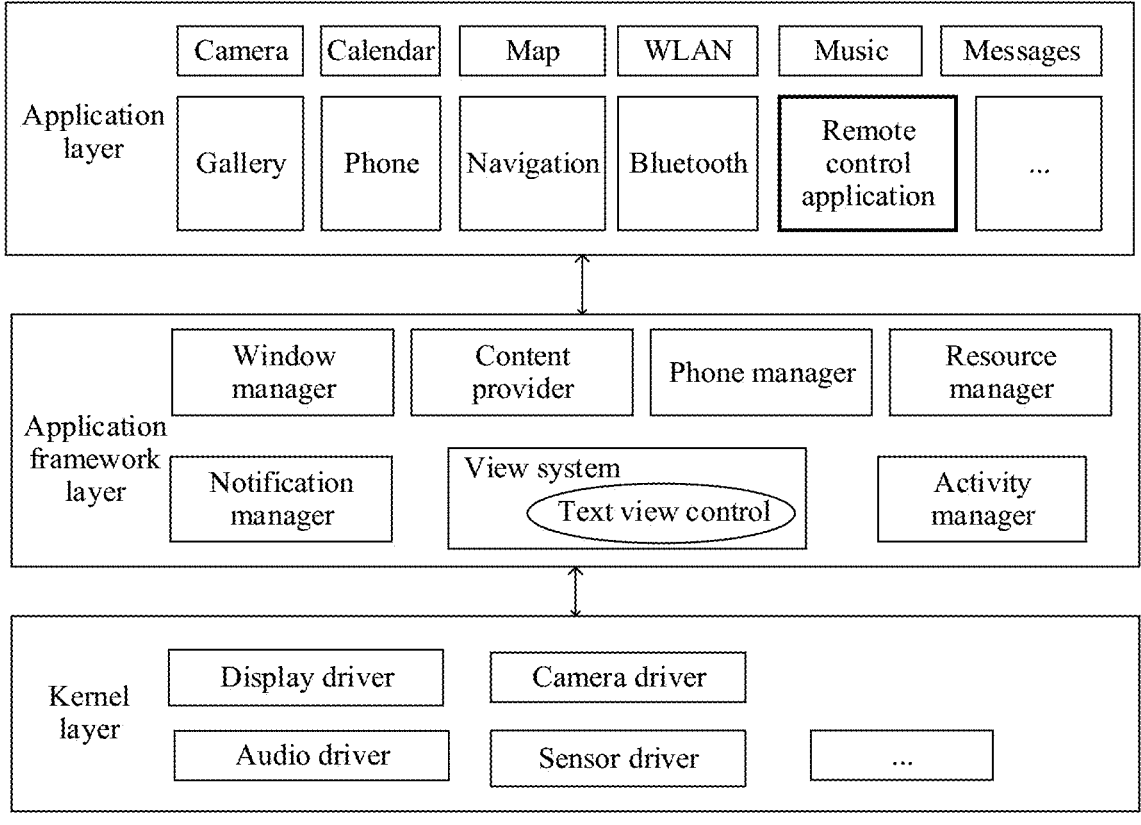
FIG. 3 is a diagram of an instance of a software architecture of an electronic device according to an embodiment of this application.

FIG. 3 is a block diagram of a software structure of an
electronic device 100 according to an embodiment of this
application. In a layered architecture, software may be
divided into several layers, and each layer has a clear role
and task. The layers communicate with each other through
a software interface. In some embodiments, a layered system
may include three layers: an application program layer
(application layer for short), an application framework layer
(framework layer for short), and a kernel layer (also referred
to as a driver layer) from top to bottom.

The application layer may include a series of application
packages, for example, the application packages may be
applications such as Camera, Gallery, Calendar, Phone,
Map, Navigation, WLAN, Bluetooth, Music, Video, Mes-
sages, and Desktop Launcher (Launcher).

Applications in this embodiment of this application may
include a remote control application and a remotely con-
trolled application. The remote control application may be
installed on a first electronic device (for example, a mobile
phone).

The remotely controlled application may be installed on a
second electronic device (for example, a smart screen). A
user may operate the remotely controlled application on the
second electronic device by using the remote control appli-
cation on the first electronic device. Alternatively, in some
other examples, the remotely controlled application may be
installed on the second electronic device and displayed on
the second electronic device, or in another manner, the
remotely controlled application (for example, a mobile
application) installed on another electronic device may be
displayed/run on the second electronic device. Alternatively,
in some other examples, the first electronic device and the
second electronic device respectively perform the foregoing
remote control operation and remotely controlled operation
in another possible form, instead of performing the remote
control operation and remotely controlled operation in an
application manner.

Based on a function supported by an application, the
remotely controlled application on the second electronic
device may be classified into an application of a mobile
device version (referred to as a mobile application for short),
a customized application (or referred to as a native appli-
cation), a compatible application, and the like.

Optionally, for example, the second electronic device is a
television. The customized application may be an applica-
tion of a television version (referred to as a television (TV)
application for short or a TV customized application). In this
embodiment of this application, an example in which the
second electronic device is the television and the customized
application is the television application is mainly used for
description. This is uniformly described herein, and details
are not described in the following again.

Optionally, the mobile application may be various types
of applications that are not customized for the second
electronic device. For example, the mobile application may
be a PC application, a tablet application, or a mobile phone
application. An operating system to which the application
adapts is not limited. For example, the application may be a
Windows® application, an Android application, a
linux\Unix® application, an iOS® application, a MAC®
application, or a HarmonyOS® application.

For example, the mobile application is a mobile phone
application. The mobile phone application supports a touchscreen operation (or referred to as a touch operation). For
example, the user inputs an operation on a touchscreen of the
mobile phone, to control an interface of the mobile phone
application to perform scrolling, page turning, and the like.
Although such a mobile phone application may be installed
on the television, the mobile phone application on the
television usually cannot be operated by using a conven-
tional button remote control.

Optionally, the touch operation includes but is not limited
to a slide operation, a tap operation, a touch operation, and
the like.

The television application supports an operation per-
formed by using a button remote control or supports an
intelligent voice operation. The button remote control
includes a physical remote control, or a virtual button remote
control (for example, a virtual button remote control dis-
played on the mobile phone as shown in FIG. 8(*b*)). Such a
television application may be installed on a device equipped
with a remote control, for example a smart television.

The compatible application supports both a touch opera-
tion and an operation that is performed by using a button
remote control.

In some embodiments, the mobile application, the tele-
vision application, and the compatible application may have
different entries, for example, different types of applications
are displayed on different interfaces. Alternatively, applica-
tions of various types may have a same entry, and types of
the applications may be distinguished in a manner of texts
such as TV and Mobile, or graphical badges.

In this embodiment of this application, the first electronic
device (for example, the mobile phone) may support a touch
remote control mode and a button remote control mode.

In the button remote control mode, the first electronic
device may display a button remote control interface. An
example in which the first electronic device is a mobile
phone is used. For example, the mobile phone displays an
interface 30 shown in FIG. 8(*b*). The interface 30 is an
operation control interface including a button control com-
ponent. For example, as shown in FIG. 8(*b*), the interface 30
may include buttons, for example, direction buttons such as
an up button 301, a down button 302, a left button 303, and
a right button 304, and a confirm (OK) button.

The user may control, by using the direction buttons on
the mobile phone interface 30, the television to perform a
corresponding operation. For example, the mobile phone
controls movement of a focus on the television. Generally,
in response to an operation of tapping a direction button on
the mobile phone interface 30, the television may move the
focus to a position, in a direction indicated by the direction
button, that is closest to the current focus and at which the
focus can be obtained. As shown in FIG. 8(*b*), it is assumed
that the current focus on the television is on an identifier of
a movie 1. If the user taps the right button 304 on the mobile
phone interface 30, the mobile phone controls the focus on
the television to move from the identifier of the movie 1 to
an identifier of a movie 2 (where the identifier of the movie
2 is located on a right side of the identifier of the movie 1,
and is closest to the identifier of the movie 1). If the user taps
the right button 304 on the mobile phone interface 30 again,
the mobile phone controls the focus on the television to
move from the identifier of the movie 2 to an identifier of a
movie 3.

In the touch remote control mode, the first electronic
device may display a touch remote control interface. An
example in which the first electronic device is a mobile
phone is used. For example, the mobile phone displays an interface 10 shown in FIG. 9. The interface 10 may include a focus movement control area 101 and a gesture control area 111.

Figure 9:
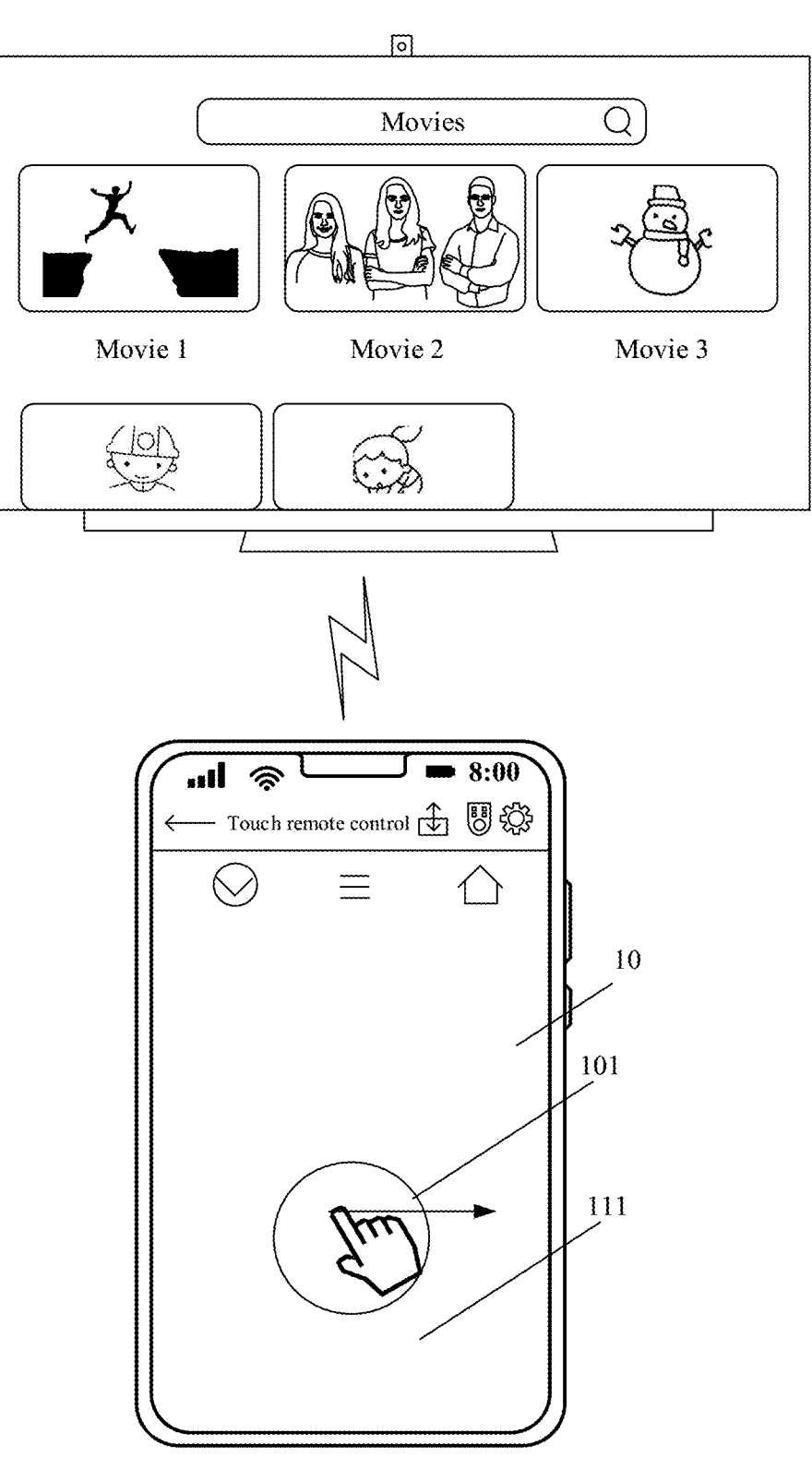

For example, the mobile phone controls movement of a focus on the television. The user may slide a finger on the interface 10, to control movement of the focus on the television. For example, as shown in FIG. 9, it is assumed that the current focus on the television is on an identifier of a movie 1. The user may input a slide operation on the interface 10. If a touch start point of the slide operation is located in the focus movement control area 101, a touch remote control of the mobile phone enters a focus movement mode. The mobile phone may perform, on the television in the focus movement mode on the interface 10, operation control associated with the slide operation. For example, the user may slide a finger on the interface 10 (for example, in a direction indicated by an arrow), and the mobile phone may control, based on the slide operation of the user, the focus on the television to move from the identifier of the movie 1 to an identifier of a movie 3. It can be learned that this case is different from a case in which the user taps a direction button once to control the focus on the television to move to a position that is closest to the current focus and at which the focus can be obtained (for example, the focus is moved from the identifier of the movie 1 to an identifier of a movie 2). In this case, the user controls movement of the focus on the television by using the touch remote control, and the slide operation of the user may control the focus on the television to directly move to a target position (for example, the focus is moved from the identifier of the movie 1 to the identifier of the movie 3). In addition, in a control manner of the touch remote control, a movement direction of the focus on the television is no longer limited to a direction of a direction button. For example, in addition to up, down, left, and right directions, the finger of the user may slide, based on a curved slide track, on the interface 10 shown in FIG. 9, and then the television may move the focus on the television based on the curved slide track of the finger of the user.

For example, the first electronic device is a mobile phone, and the second electronic device is a television. Optionally, a button remote control on the mobile phone may be used to operate a television application and a compatible application on the television. A touch remote control on the mobile phone may be used to operate a mobile application and the compatible application on the television. The television application mainly supports a button-type operation provided by the button remote control, the mobile application mainly supports a touch-type operation provided by the touch remote control, and the compatible application may support both the button-type operation and the touch-type operation.

Optionally, the touch remote control on the mobile phone may be further configured to operate the television application on the television.

The framework layer provides an application programming interface (API) and a programming framework for an application at the application layer. The application framework layer includes some predefined functions. As shown in FIG. 3, the framework layer may include a window manager service (WMS), an activity manager service (AMS), and the like. Optionally, the framework layer may further include a content provider, a view (view) system, a phone manager, a resource manager, a notification manager, and the like (not shown in the figure).

The window manager WMS is configured to manage a window program. The window manager may obtain a size of the display, determine whether there is a status bar, perform screen locking, take a screenshot, or the like. The activity manager AMS is configured to manage an activity, and is responsible for work such as startup, switching, and scheduling of each component in a system, and management and scheduling of applications.

The kernel layer is a layer between hardware and software. The kernel layer includes at least a display driver, a camera driver, an audio driver, and a sensor driver. The kernel layer is a layer between hardware and software. The kernel layer may include a display driver, an input/output device driver (for example, a driver for a keyboard, a touchscreen, a headset, a speaker, or a microphone), a camera driver, an audio driver, a sensor driver, and the like.

The user performs an input operation (for example, a slide operation on the touchscreen) on the electronic device 100, and at the kernel layer, a corresponding input event (for example, a slide event) may be generated based on the input operation, and the event is reported to the application framework layer. Interface display is set by the activity manager AMS at the application framework layer. The window manager WMS at the application framework layer draws an interface based on settings of the AMS, and then sends interface data to the display driver at the kernel layer. The display driver displays the corresponding interface on a screen.

FIG. 3 is merely a possible example of a software architecture of the first electronic device 100. This does not constitute a limitation on the software architecture of the first electronic device 100. It may be understood that the software architecture of the first electronic device 100 may be another software architecture. For example, in a layered software architecture, there may be more layers or fewer layers, and a specific function of each layer is not limited.

Figure 4:
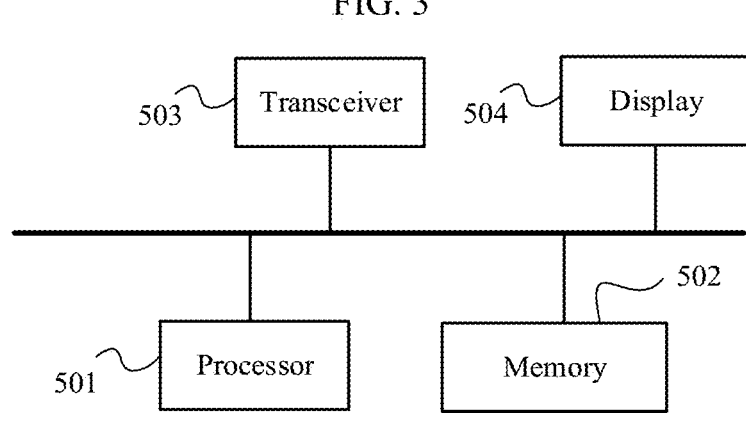
FIG. 4 is a diagram of a structure of another electronic device according to an embodiment of this application.

For example, FIG. 4 shows an example structure of a second electronic device 110. As shown in FIG. 4, the second electronic device 110 includes a processor 501, a memory 502, a transceiver 503, and a display. For implementations of the processor 501, the memory 502, and the display 504, refer to implementations of the processor and the memory of the first electronic device 100. The transceiver 503 is used for interaction between the second electronic device 110 and another device (for example, the first electronic device 100). The transceiver 503 may be a device based on Wi-Fi, Bluetooth, or another communication protocol. FIG. 4 is merely a possible example of the structure of the second electronic device 110. This does not constitute a limitation on the structure of the second electronic device 110.

A software architecture of the second electronic device 110 may be the same as or different from the software architecture of the first electronic device 100. For example, both the first electronic device 100 and the second electronic device 110 use an Android architecture. For another example, the first electronic device 100 uses an Android architecture, and the second electronic device 110 uses a structure other than the Android architecture. Specific implementations of the software architectures of the first electronic device 100 and the second electronic device 110 are not limited in embodiments of this application.

The following describes technical solutions of embodiments of this application in detail with reference to the accompanying drawings by using an example in which a mobile phone is used as the foregoing first electronic device and a television is used as the foregoing second electronic device.

Scenario 1

In a possible implementation, after receiving a remote control intention of a user, a mobile phone may display an adapted remote control device interface (which may also be referred to as a remote control interface for short) on a mobile phone screen based on information about an application run on a television. Optionally, the information about the application includes a type of the application.

The remote control interface of the mobile phone may include a touch remote control interface and a button remote control interface. Manners of performing operation control on the television on different remote control interfaces are different.

For ease of description, applications types that can be supported on the television may be classified, and the applications types include a mobile application, a compatible application, and a television application. The mobile application and the compatible application on the television may be operated on the touch remote control interface of the mobile phone. Optionally, the television application on the television may also be operated on the touch remote control interface of the mobile phone.

The television application and the compatible application on the television may be operated on the button remote control interface of the mobile phone.

That the mobile phone receives an intention of the user to perform operation control on the television (which may be referred to as a remote control intention for short) may be that the mobile phone receives a voice instruction input by the user (for example, the user inputs a voice "Open a remote control application"), or a gesture instruction (for example, a preset gesture instruction like tapping an icon of "Remote control application" by the user, or double-tapping a power button), or another intention used to indicate to open the remote control application. The gesture instruction may be a touch gesture instruction, or an air gesture instruction of the user. For example, the user taps the icon of the remote control application, to control the mobile phone to open the remote control interface. For another example, the television sends a notification message to the mobile phone, and the user taps the notification message on the mobile phone, to control the mobile phone to open the remote control interface. For another example, the television sends a notification message to the mobile phone, and the mobile phone directly pops up the remote control interface. For another example, the user holds the mobile phone in hand and makes a "recruit a wave" gesture to the television, to invoke the remote control interface of the mobile phone.

Figures 5A, 5B:
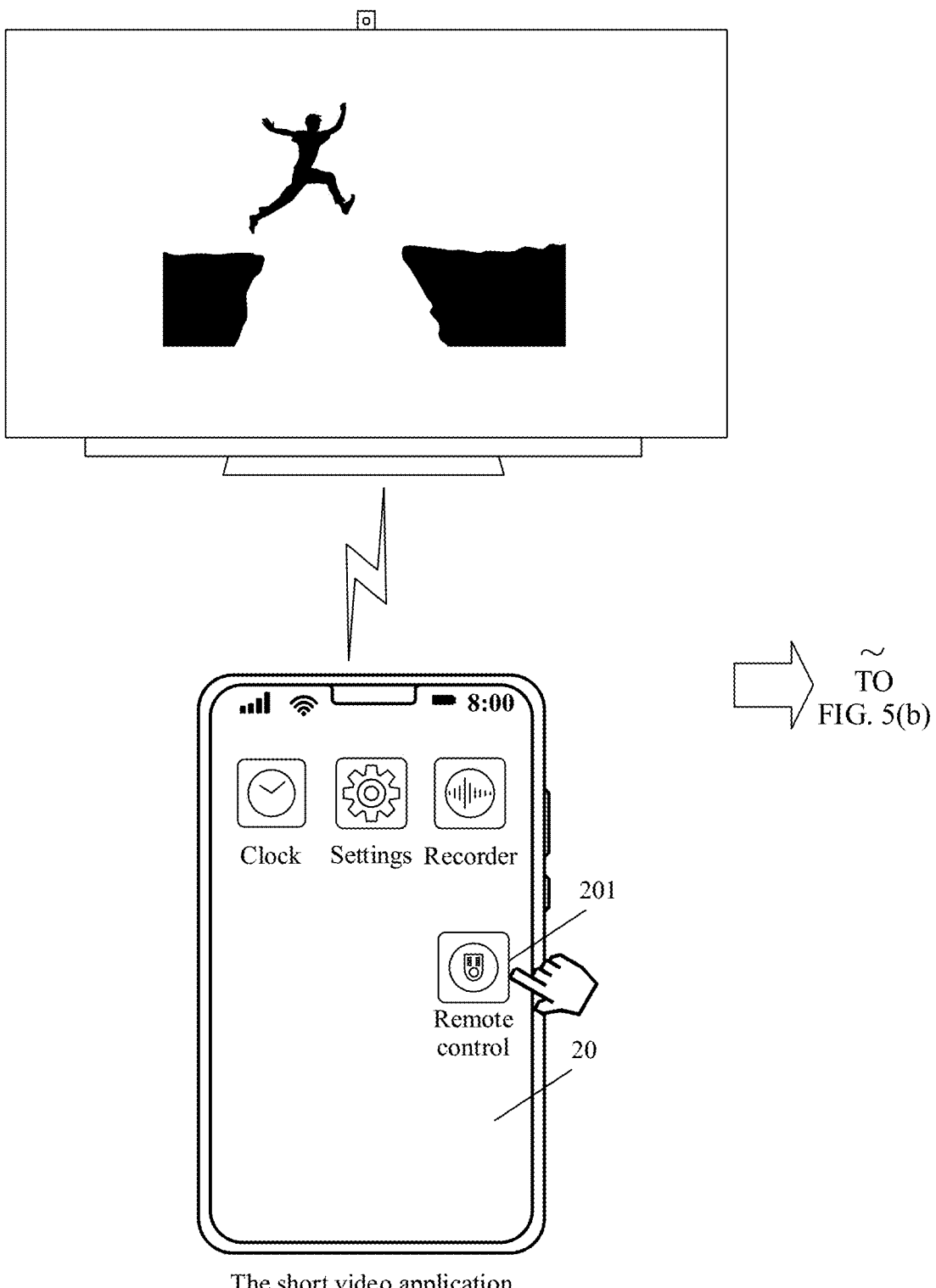
FIG. 5(a) and FIG. 5(b) are a diagram of interfaces according to an embodiment of this application.

For example, the mobile phone has established a communication connection to the television. As shown in FIG. 5(a), the mobile phone displays an interface 20, where the interface 20 includes an icon 201 of the remote control application. After detecting an operation of tapping the icon 201 by the user, the mobile phone may obtain a type of a short video application C on the current display interface on the television. If the short video application Cis a mobile application, the mobile phone may display a remote control interface adapted to the mobile application. For example, as shown in FIG. 5(b), the mobile phone may display a touch remote control interface 10 that matches the mobile application.

The remote control interface 10 may include a focus movement control area 101 and a gesture control area 111.

The focus movement control area 101 is an area that is on the remote control interface 10 and in which a focus movement operation may be triggered. The focus movement control area 101 may also be referred to as a cursor focus movement start area, a cursor focus movement trigger area, or the like. In some examples, the user may input a slide operation on the interface 10. If a touch start point of the slide operation of the user is in the focus movement control area 101, the mobile phone is triggered to activate a focus movement mode. Optionally, when a remote control mode is switched to the focus movement mode, the user may input the slide operation in any area of the remote control interface 10 (for example, any position of the full screen (including a function area 109, the focus movement control area 101, and the gesture control area 111) of the mobile phone shown in FIG. 5(b)), and the mobile phone may control, based on a slide track (or referred to as a slide path) of the slide operation, the focus movement operation to be performed on the television. The focus movement operation includes an operation of moving a cursor focus.

Optionally, a range of the focus movement control area 101 on the remote control interface 10 may be prompted by using a specific graphic shape. For example, a circle range shown in FIG. 5(b) is used to prompt the range of the focus movement control area 101.

Optionally, a position and a size of the focus movement control area 101 may be determined based on a position of a fingerprint pressing area (a screen area for inputting fingerprint information during fingerprint unlocking). For example, the focus movement control area 101 covers the fingerprint pressing area, and a size of the focus movement control area 101 is greater than a size of the fingerprint pressing area. In this way, the focus movement control area 101 can be set in a screen area that the user is used to using, so that the user operates the focus movement control area 101 more conveniently. This improves efficiency and experience of interaction between the user and an electronic device.

The gesture control area 111 is an area that is on the remote control interface 10 and in which a gesture operation may be triggered. The gesture control area 111 may also be referred to as a gesture control trigger area or the like. In some examples, if a touch start point of the slide operation of the user is in the gesture control area 111, the mobile phone is triggered to activate a gesture mode. When a remote control mode is switched to the gesture mode, the user may input the slide operation in any area of the remote control interface 10 (for example, any position of the full screen (including a function area 109, the focus movement control area 101, and the gesture control area 111) of the mobile phone shown in FIG. 5(b)), and the mobile phone may control, based on a slide track of the slide operation, the television to perform a gesture control operation. Optionally, the gesture control operation includes but is not limited to a non-focus movement operation like interface scrolling and interface zooming in or out on the television. It may be learned that the user can conveniently trigger a remote control mode. After the remote control mode is triggered, the user may perform an operation like a slide operation on the full screen of the mobile phone, to help the user implement a single-finger/one-hand operation. In addition, the user can hold the mobile phone with one hand and blindly operate the mobile phone with a single finger, to control content displayed on the television. In other words, in a process in which the user uses the mobile phone daily, the user can control the content displayed on the television, and the user can control the television in a habitual interaction manner (for example, control the television by operating the mobile phone). Therefore, a holding manner of the mobile phone and a gesture of interaction between the user and the mobile phone do not need to be changed. This reduces learning costs of controlling the television by the user.

Figures 5A, 5B:
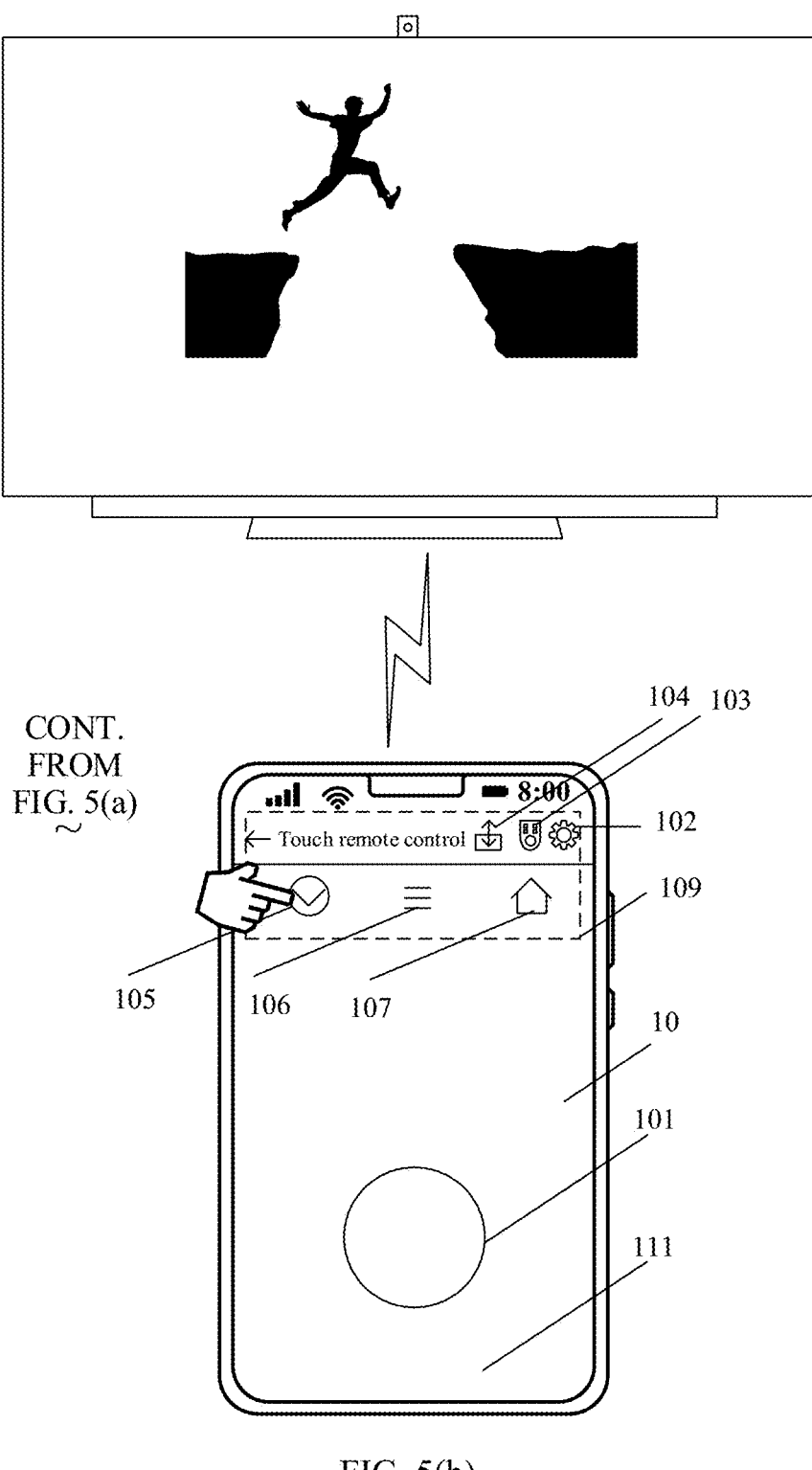

Optionally, the gesture control area 111 may not be prompted by a graphic presentation corresponding to a control. For example, as shown in FIG. 5(*b*), the remote control interface 10 includes the focus movement control area 101 (a circle icon is used to prompt the range of the focus movement control area 101). In an example, an area, on the interface 10 of the full screen of the mobile phone, other than the focus movement control area 101 and the function area 109 (as shown in a dashed-line box in FIG. 5(*b*)) may be considered as the gesture control area 111. Alternatively, in another embodiment, the gesture control area 111 may have a corresponding graphic presentation to prompt a specific range of the area.

Optionally, after the touch remote control enters the focus movement mode or the gesture mode, the user may also perform the slide operation in a specified area of the touch remote control interface, to control the focus movement operation or the gesture control operation to be performed on the television. FIG. 5(*b*) is still used as an example. After the touch remote control enters the focus movement mode or the gesture mode, the specified area may be any area (including the function area 109, the focus movement control area 101, and the gesture control area 111) on the mobile phone interface 10, or may be an area range that is on the mobile phone interface 10 and that excludes a specific area, for example, an area range excludes the function area 109.

In some embodiments, in addition to the focus movement mode and the gesture mode, optionally, the touch remote control may further support another remote control mode (for example, a tap mode). Optionally, still as shown in FIG. 5(*b*), to prevent the user from accidentally touching a function control (for example, a control 103) in the function area 109, in the tap mode, the user may input a tap operation in an area, on the remote control interface 10, other than the function area 109. The mobile phone may respond to this tap event, and control the television to perform an action associated with the tap event, for example, control the television to select an icon for an application on the television.

Optionally, the tap operation includes but is not limited to at least one of the following: tap, double-tap, and touch and hold.

Alternatively, optionally, the mobile phone may shield the function area 109, to temporarily fail the function control in the function area 109 or hide the function control in the function area 109. In this way, the user may perform the tap operation in a full-screen area of the mobile phone including the function area 109. For example, as shown in FIG. 6C, when it is detected that the user intends to control the touch remote control, to enter the tap mode (for example, a finger is lifted away from the mobile phone screen), the mobile phone may hide an icon of the function control in the function area 109, or temporarily fail the function control in the function area 109. Alternatively, when it is detected that the mobile phone interface enters the focus movement mode or the gesture mode, the function area 109 is hidden, or function area 109 is temporarily failed. In this way, the user may perform the tap operation at any position in the full-screen area of the mobile phone including the function area 109. The mobile phone may respond to this tap event, and control the television to perform an action associated with the tap event. Then, if an intention that the user needs to select an icon in the function area 109 is identified at a moment, the function area 109 is re-presented, or the function area 109 is available again.

In the tap mode, a position of the cursor is usually not moved. The user may tap any position in a set area, so that an input control (for example, an input box) at the position of the cursor obtains the focus (which may be referred to as focus obtaining for short) and enters a text input state. For example, it is assumed that in the focus movement mode, the user controls, based on a slide gesture on the mobile phone screen, the cursor on the television to be moved to an input box 1 on the remote control interface. Subsequently, the user may lift the finger away from the mobile phone screen, and may tap at any position of the full screen (equivalent to triggering the tap mode), and in response to the tap operation of the user, the input box 1 obtains the focus. The user can input a text in the input box 1 on the remote control interface.

Optionally, the tap mode may also support operations such as multi-finger gesture control, tap, double-tap, and touch and hold. A tap operation may be a tap operation of one or more knuckles, or a tap operation of a finger. A double-tap operation may be a double-tap operation of one or more knuckles, a double-tap operation of a finger, or the like.

Figures 10A, 10B:
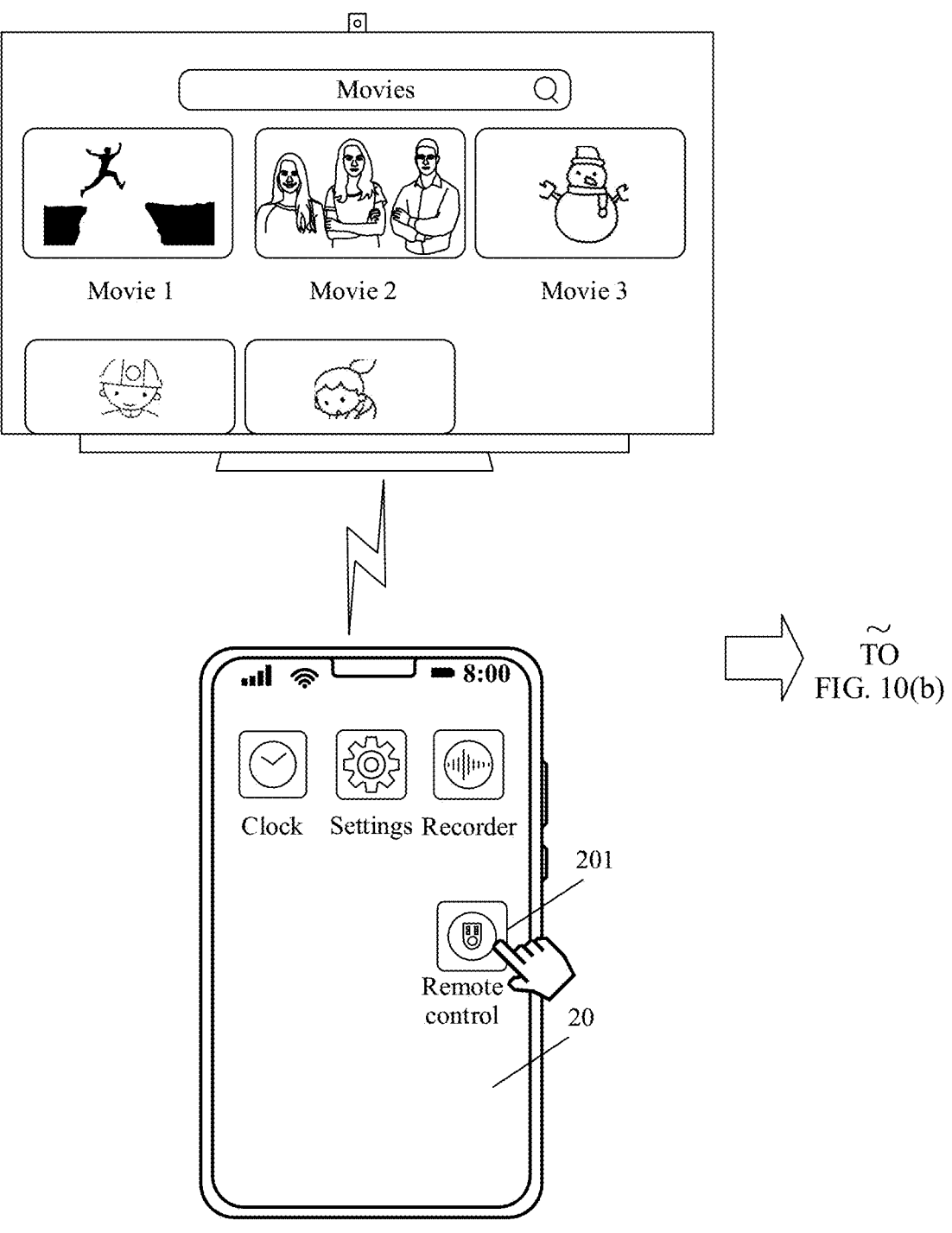
Figures 10A, 10B:
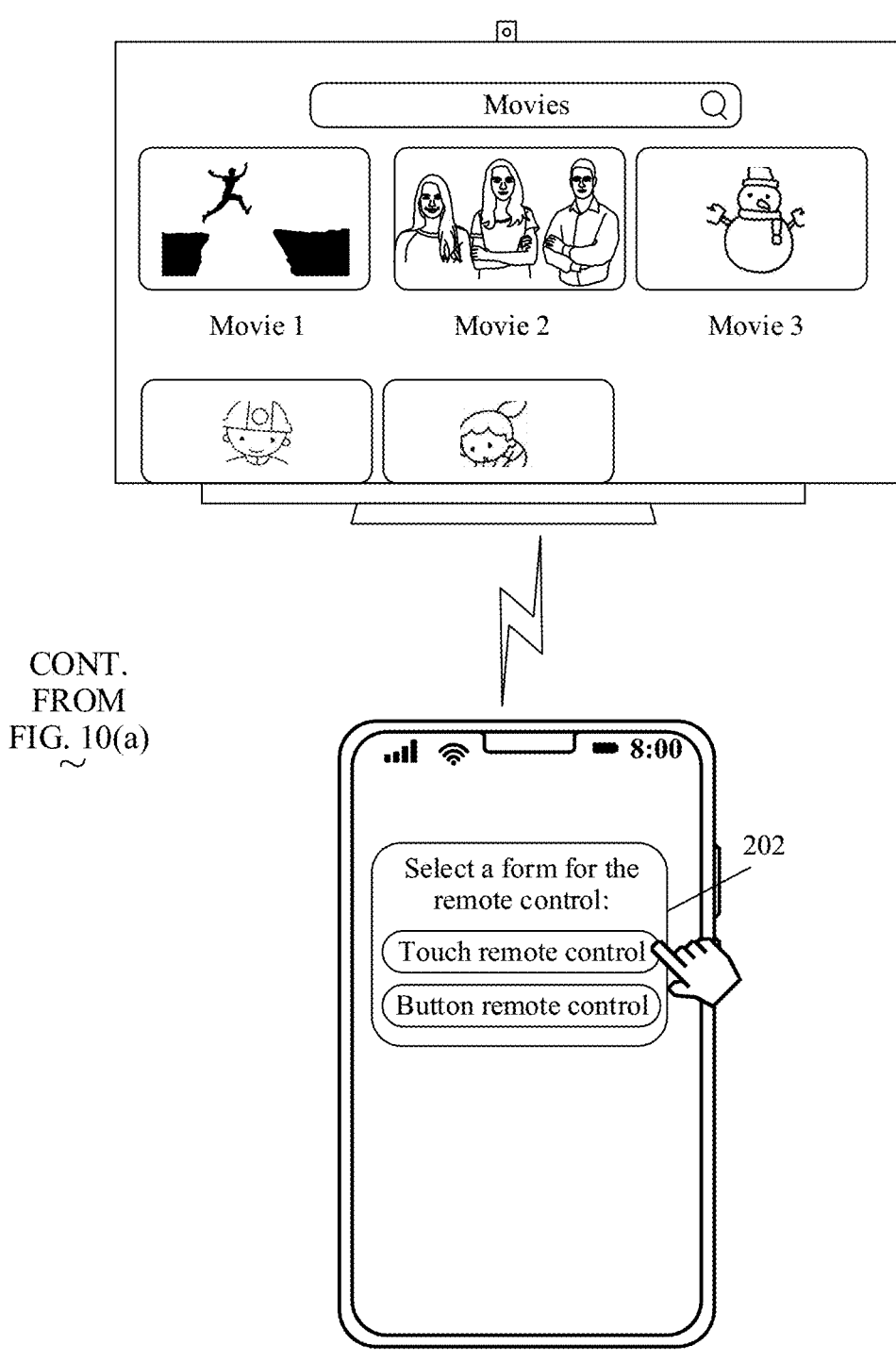

In some embodiments, the gesture mode and the focus movement mode may be compatible with the tap mode. The focus movement mode is used as an example. As shown in FIG. 10(*c*), in the focus movement mode, the finger of the user slides on the mobile phone screen, to control the focus (for example, the cursor) on the television to move. In the focus movement mode, after moving the cursor to a target position, for example, moving from an identifier of a movie 1 to an identifier of a movie 3, the user may lift the finger away from the mobile phone screen, and tap (equivalent to triggering the tap mode) in any area, on the mobile phone interface 10, other than the function area 109. In response to the tap operation of the user, the mobile phone determines that the user wants to open an interface of the movie 3, and may indicate the television to open the interface of the movie 3.

It should be noted that division of the remote control mode and a name of each remote control mode may be implemented in another manner. This is not limited herein.

Figure 18A:
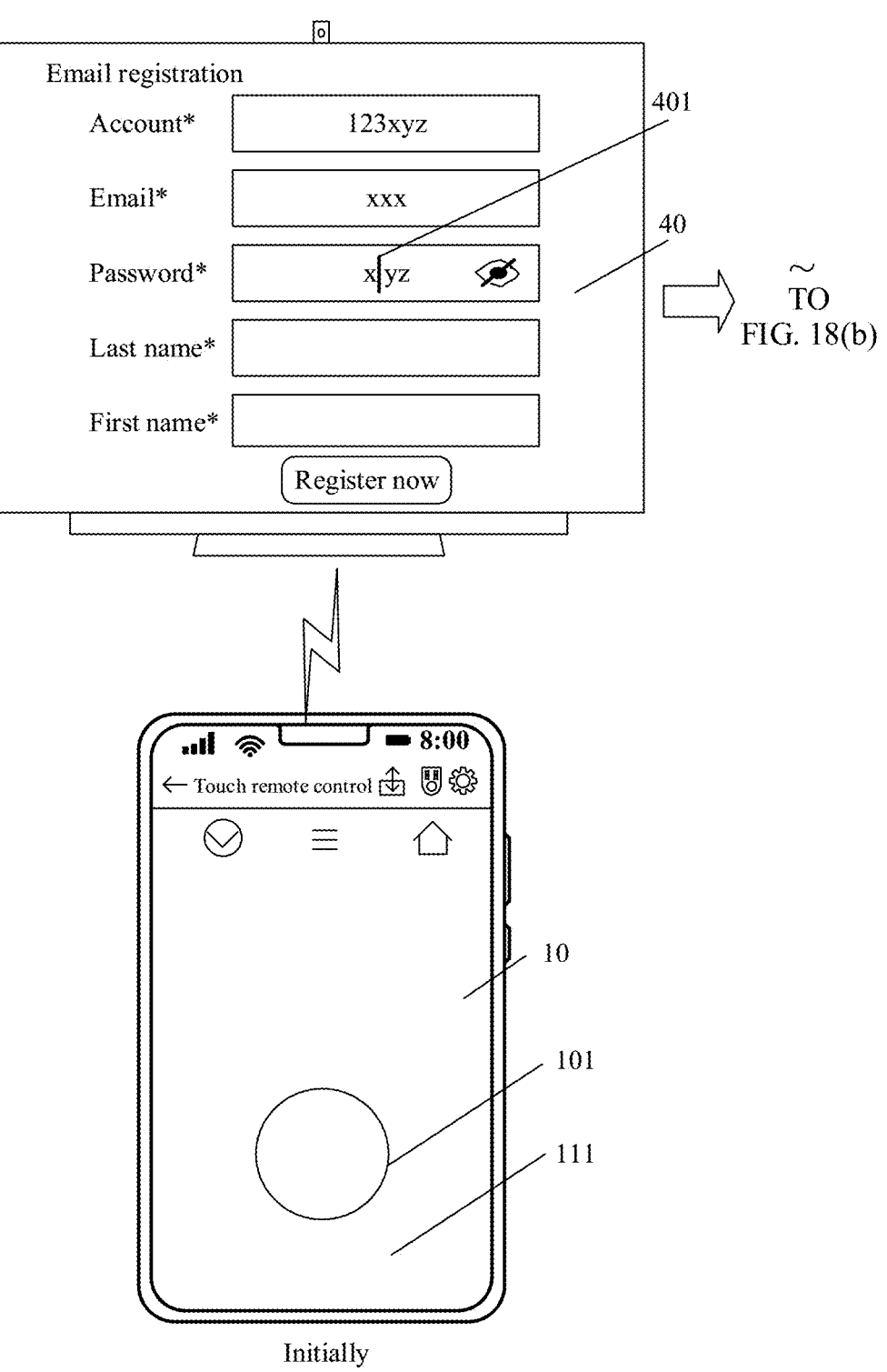
Figures 18A, 18B:
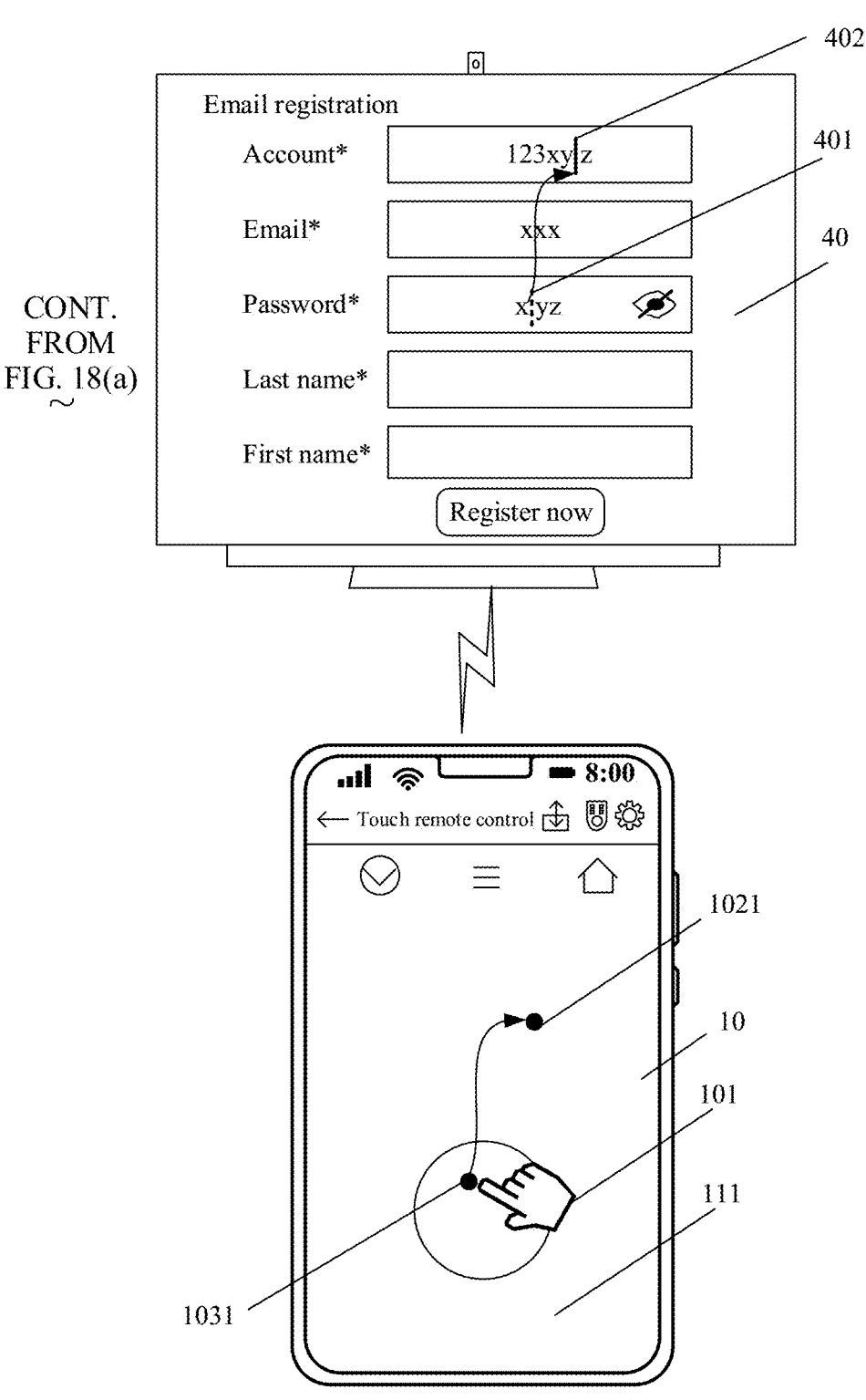

For example, as shown in FIG. 18(*a*), an interface 40 of an email application (the mobile application) is displayed on the television, and a position of the cursor on the television is shown by a mark 401. The touch remote control interface 10 that matches the mobile application is displayed on the mobile phone.

Subsequently, as shown in FIG. 18(*b*), the finger of the user touches the focus movement control area 101 on the mobile phone interface 10, to trigger the interface 10 to enter the focus movement mode. In the focus movement mode, the user may slide the finger along a track (a start point position is shown by a mark 1031) shown in the figure on the interface 10, and an end point position of the slide track is shown by a mark 1021. In response to the slide operation performed by the finger of the user on the interface 10, the mobile phone sends information (for example, the slide track, and the start point and the end point of the slide track) about the slide operation to the television, and the television moves the cursor (moves the cursor from the position 401 to a position 402) based on the information about the slide operation.

In some embodiments, optionally, as shown in FIG. 5(*b*), the remote control interface 10 may further include the function area 109 (as shown in the dashed-line box in FIG. 5(*b*)), and the function area 109 may include one or more function controls (for example, a control 102 to a control 107). When being operated, the one or more function controls may execute one or more corresponding functions associated with the television.

The control 104 is configured to switch layouts of controls on the remote control interface 10. The layouts include but are not limited to: inside-outside layout, up-down layout, or left-right layout. For example, the inside-outside layout may be, for example, a layout shown in FIG. 5(b). The focus movement control area 101 is located in the circle range of the interface 10, and the gesture control area 111 is located outside the circle range (and does not include the function area 109). For example, the left-right layout may be a layout shown in FIG. 16A. A focus movement control area 1807 is located on a left side of an interface 1805, and a gesture control area 1806 is located on a right side of the interface 1805.

The control 103 is configured to switch display styles (or referred to as display forms) of the remote control interface. The display styles include but are not limited to a style of the touch remote control and a style of a conventional button remote control.

The control 102 is configured to set a function of a remote control.

A control 106 is configured to display a common menu function related to remote control. For example, when detecting an operation of tapping the control 106 on the mobile phone interface 10 by the user, the mobile phone may control the television to display a progress bar, definition (for example, high definition), and the like of a currently played video. The finger of the user may perform an operation like a slide operation on the mobile phone interface 10, to adjust a progress of the video on the television. Alternatively, the finger of the user may slide and tap on the mobile phone interface 10, to select a new video definition (for example, ultra high definition).

The control 105 is configured to display/hide another function related to remote control. As shown in FIG. 5(b), when detecting an operation of the user like tapping the control 105 (or a slide-down operation performed on the control 105), the mobile phone may display a screenshot function 105a and a screen recording function 105b shown in (a) in FIG. 6A. The mobile phone may further display another function related to remote control.

Figure 6A:
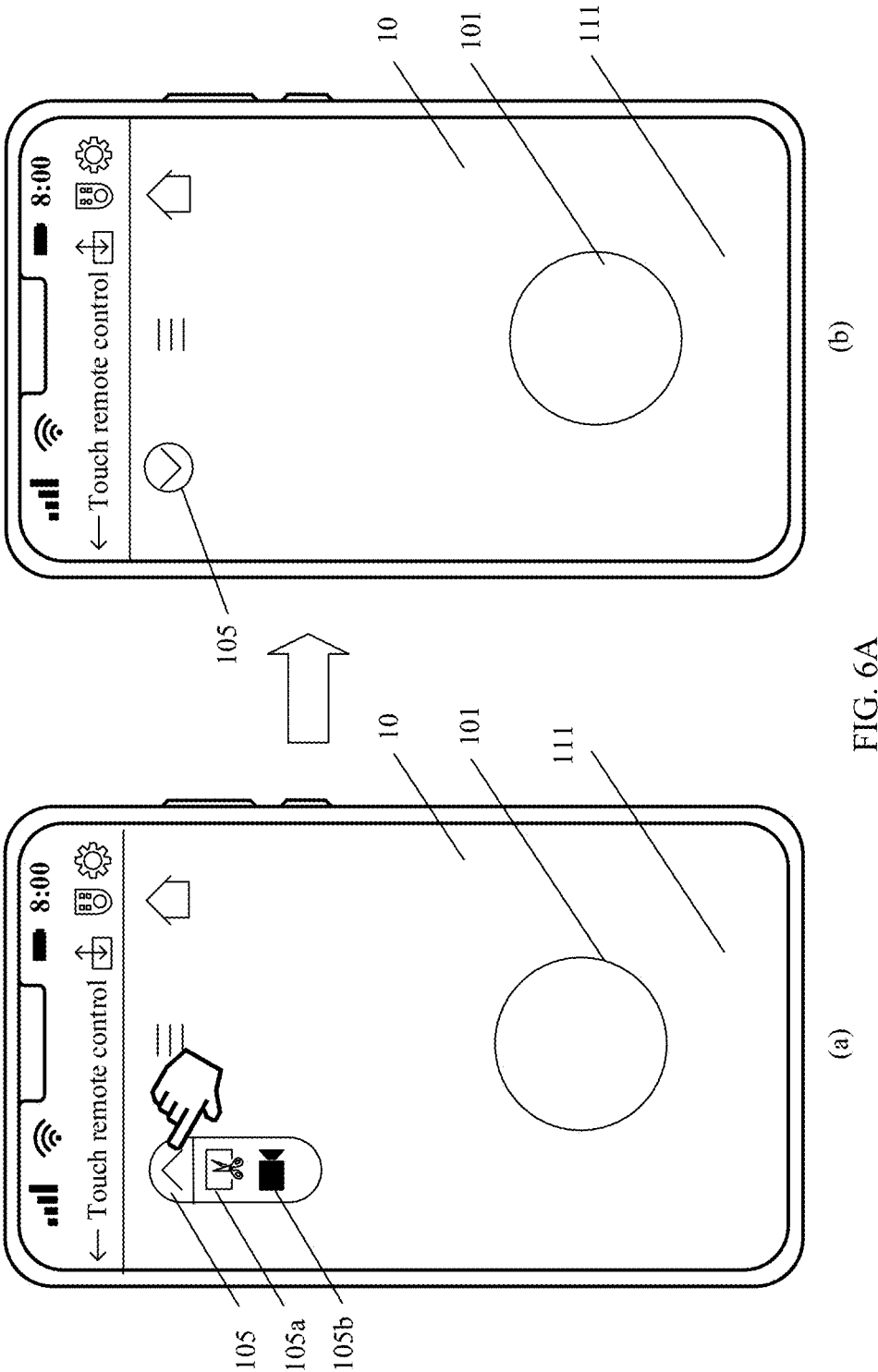
FIG. 6A, FIG. 6B, and FIG. 6C are diagrams of interfaces according to an embodiment of this application.

Optionally, as shown in (a) in FIG. 6A, when detecting that the user taps the control 105 again, the mobile phone may hide a function option related to remote control. For example, when detecting that the user taps the control 105 shown in (a) in FIG. 6A again, as shown in (b) in FIG. 6A, the mobile phone only displays the control 105, and no longer displays a function option like screenshot.

The control 107 is configured to return to a home page of a remotely controlled device.

Figure 7A:
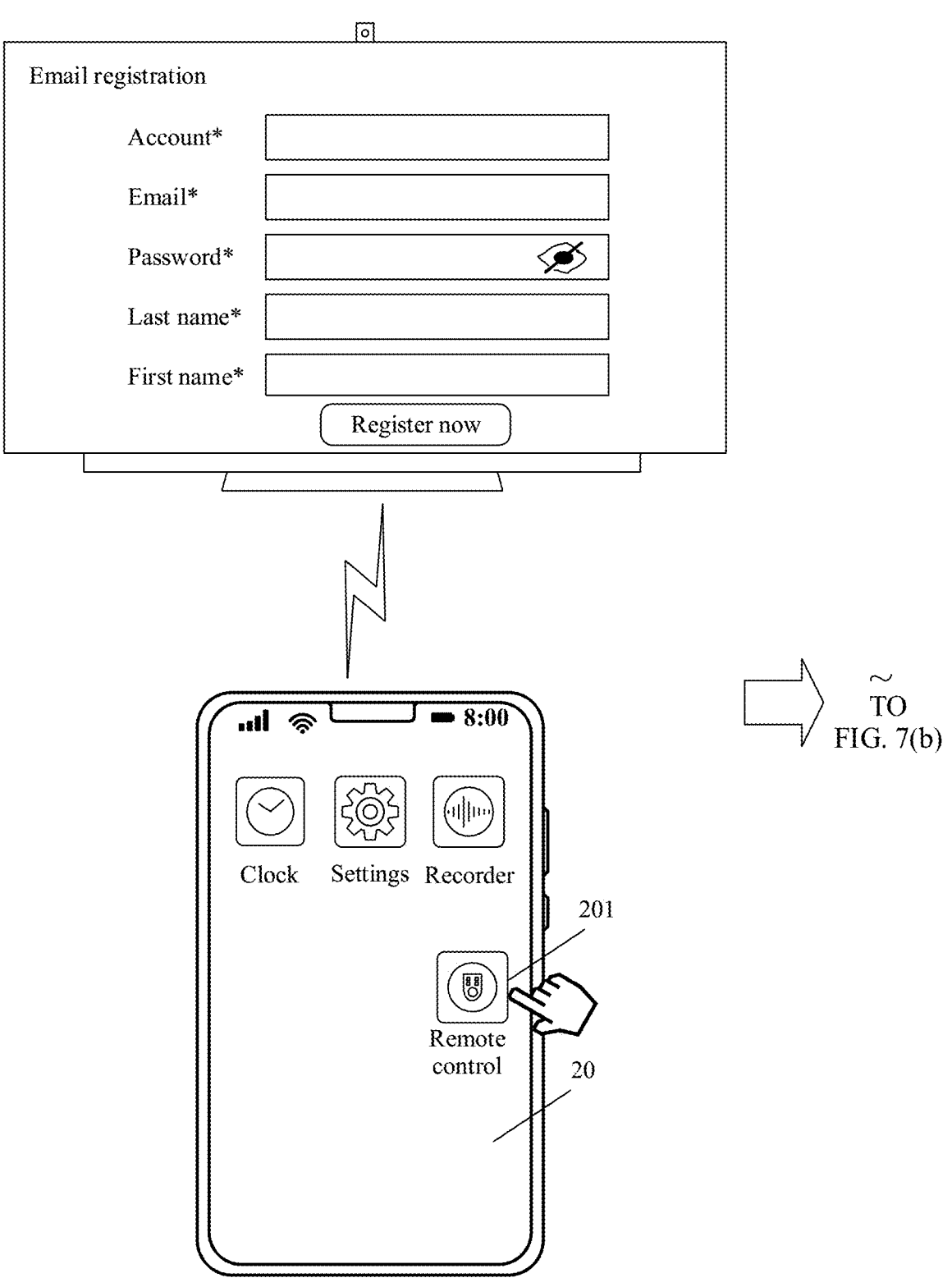
Figure 7B:
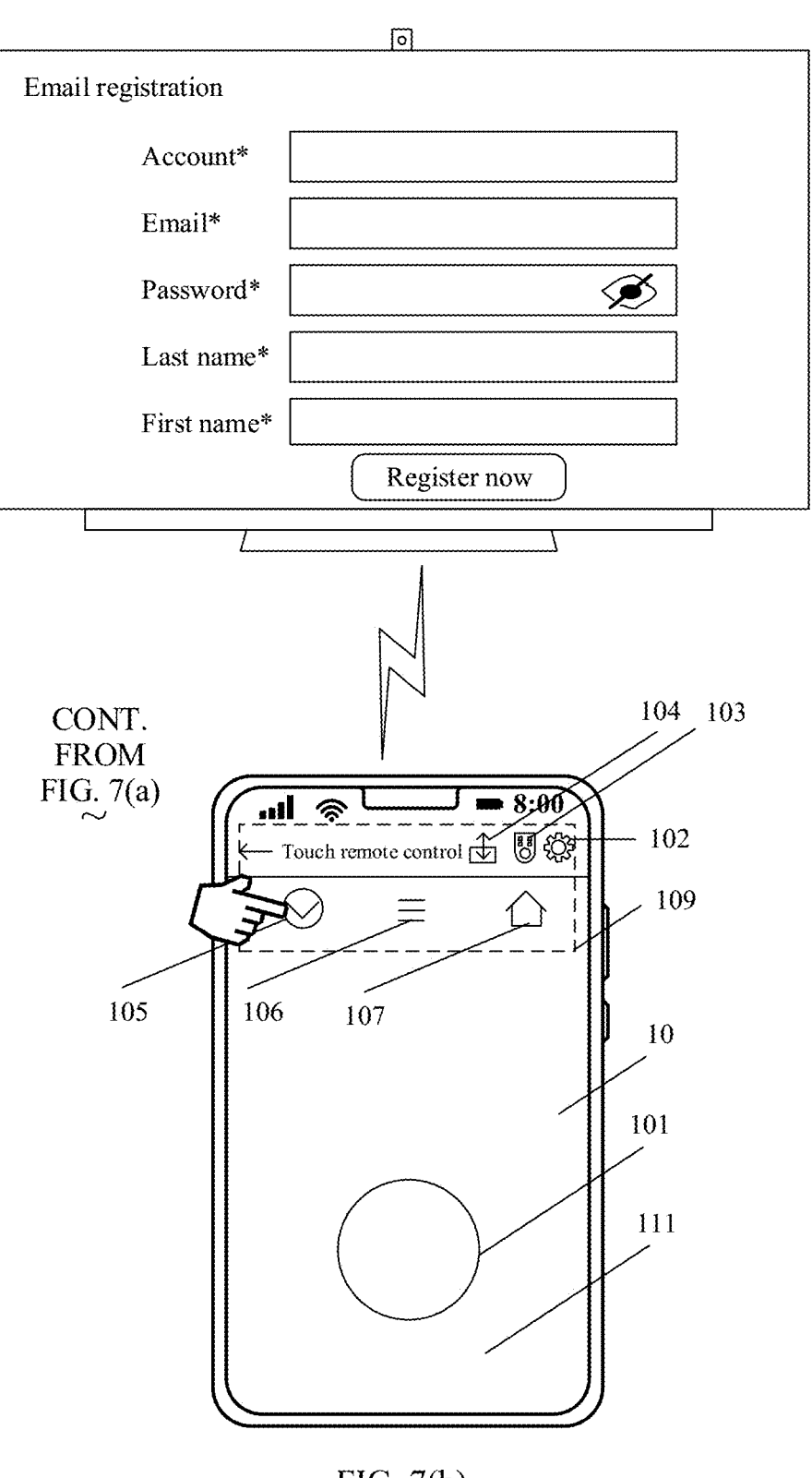

For another example, as shown in FIG. 7(a), the mobile phone displays the interface 20, where the interface 20 includes the icon 201 of the remote control application. After detecting an operation of tapping the icon 201 by the user, the mobile phone may obtain a type of an email application currently run on the television. If the email application is a mobile application, the mobile phone may display a remote control interface adapted to the mobile application. For example, as shown in FIG. 7(b), the mobile phone may display the touch remote control interface 10 that matches the mobile application.

In this solution, when receiving the remote control intention of the user, the mobile phone may automatically switch, based on a type of an application run on the television, to a remote control interface that matches the application. This reduces complexity of a user operation and helps improve device control efficiency.

Figure 8A:
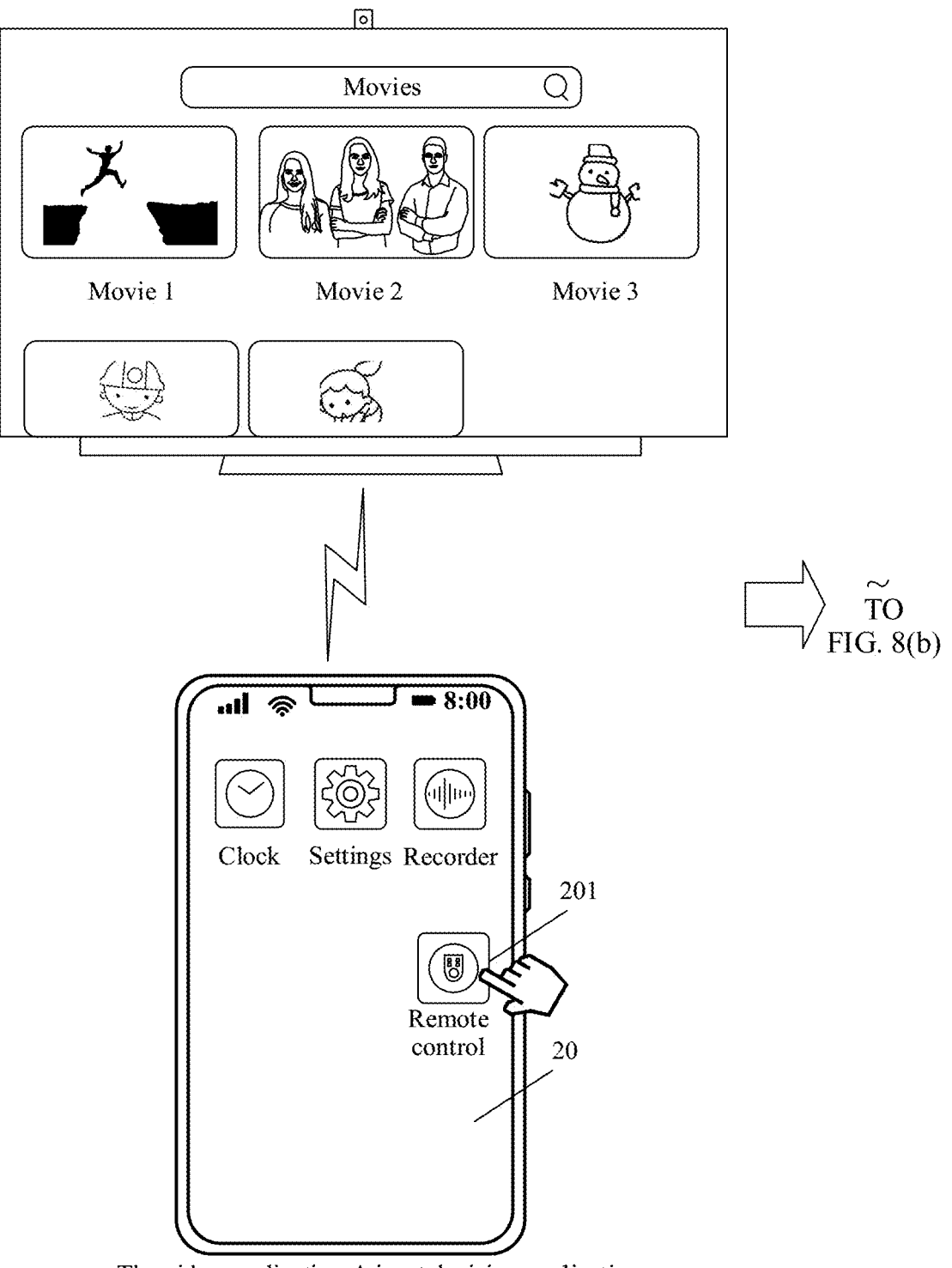
Figures 8A, 8B:
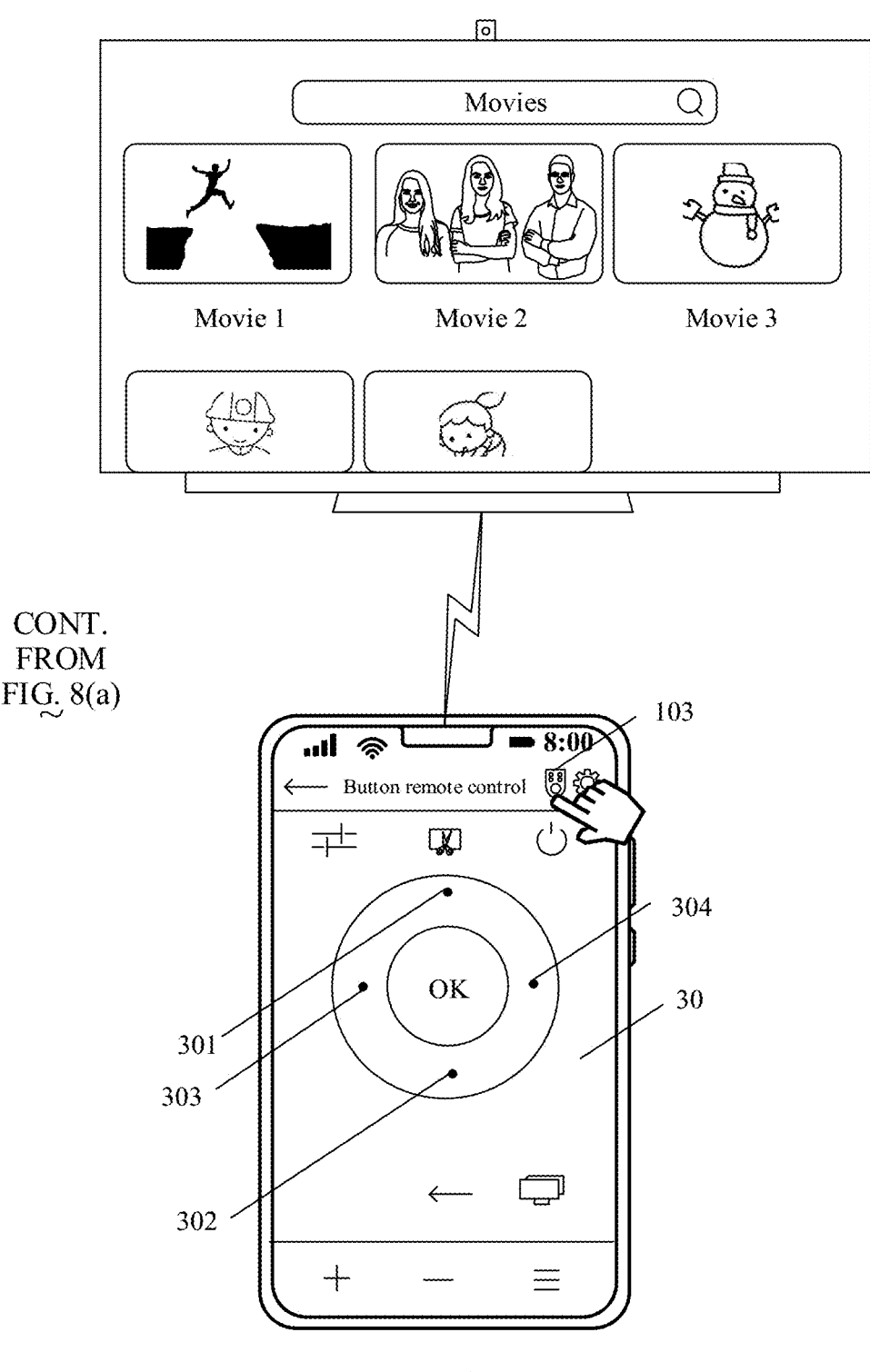

For example, the application run on the television is a television application. For example, as shown in FIG. 8(a), the mobile phone displays the interface 20, where interface 20 includes the icon 201 of the remote control application. After detecting an operation of tapping the icon 201 by the user, the mobile phone may obtain a type of a video application A currently run on the television. If the video application A is a television application, the mobile phone may display a remote control interface adapted to the television application. For example, as shown in FIG. 8(b), the mobile phone may display a button remote control interface 30 that matches the mobile application. For a specific design of the button remote control interface 30, refer to a related technology, and details are not described herein again.

Alternatively, in some other embodiments, when the touch remote control also supports an operation on the television application, the user may control a related operation of the television application on the television by using the touch remote control. For example, as shown in FIG. 8(b), an interface of a video application A is displayed on the television, and a button remote control interface 30 is displayed on the mobile phone. After detecting a switching intention (for example, an operation of tapping the control 103) of the user, the mobile phone switches to the touch remote control interface 10 shown in FIG. 9. In this way, the user may perform related control on the video application A on the television on the touch remote control interface 10 of the mobile phone. In this remote control interface switching mode, the user may freely select, based on a use habit, a remote control interface that the user wants to use, and conveniently control the television on the remote control interface on the mobile phone. This helps improve efficiency and experience of interaction between the user and the device.

Alternatively, in some other embodiments, if the application run on the television in the foreground is a television application, the mobile phone may pop up a prompt box, where the prompt box may be used by the user to select the touch remote control or the button remote control. If detecting that the user selects an option of the touch remote control, the mobile phone may display the touch remote control interface; otherwise, if detecting that the user selects an option of the button remote control, the mobile phone may display the button remote control interface.

Alternatively, in some other embodiments, if the mobile phone determines that the application currently run on the television is a television application, the mobile phone may determine an operation preference of the user based on historical information that the user controls the television application by using the mobile phone, and display a corresponding remote control interface based on the operation preference of the user.

For example, based on the historical operation information of the user, the mobile phone determines that the user prefers to use the touch remote control of the mobile phone to control the television application on the television. In this way, subsequently, when detecting the remote control intention (used to control the television application on the television) of the user, the mobile phone may display the touch remote control interface, so that the user can perform device control in a most habitual and comfortable operation manner. This improves interaction experience of the user.

For example, the application run on the television is a compatible application. For example, as shown in FIG. 10(a), the mobile phone displays the interface 20, where the interface 20 includes the icon 201 of the remote control application. After detecting an operation of tapping the icon 201 by the user, the mobile phone may obtain a type of a video application B currently run on the television. If the video application B supports operations performed by using both the touch remote control and the button remote control (which means that the video application B is an application of a compatible version), the mobile phone may display a pop-up window 202 shown in FIG. 10(b), to prompt the user to select a form for a remote control.

Figure 10C:
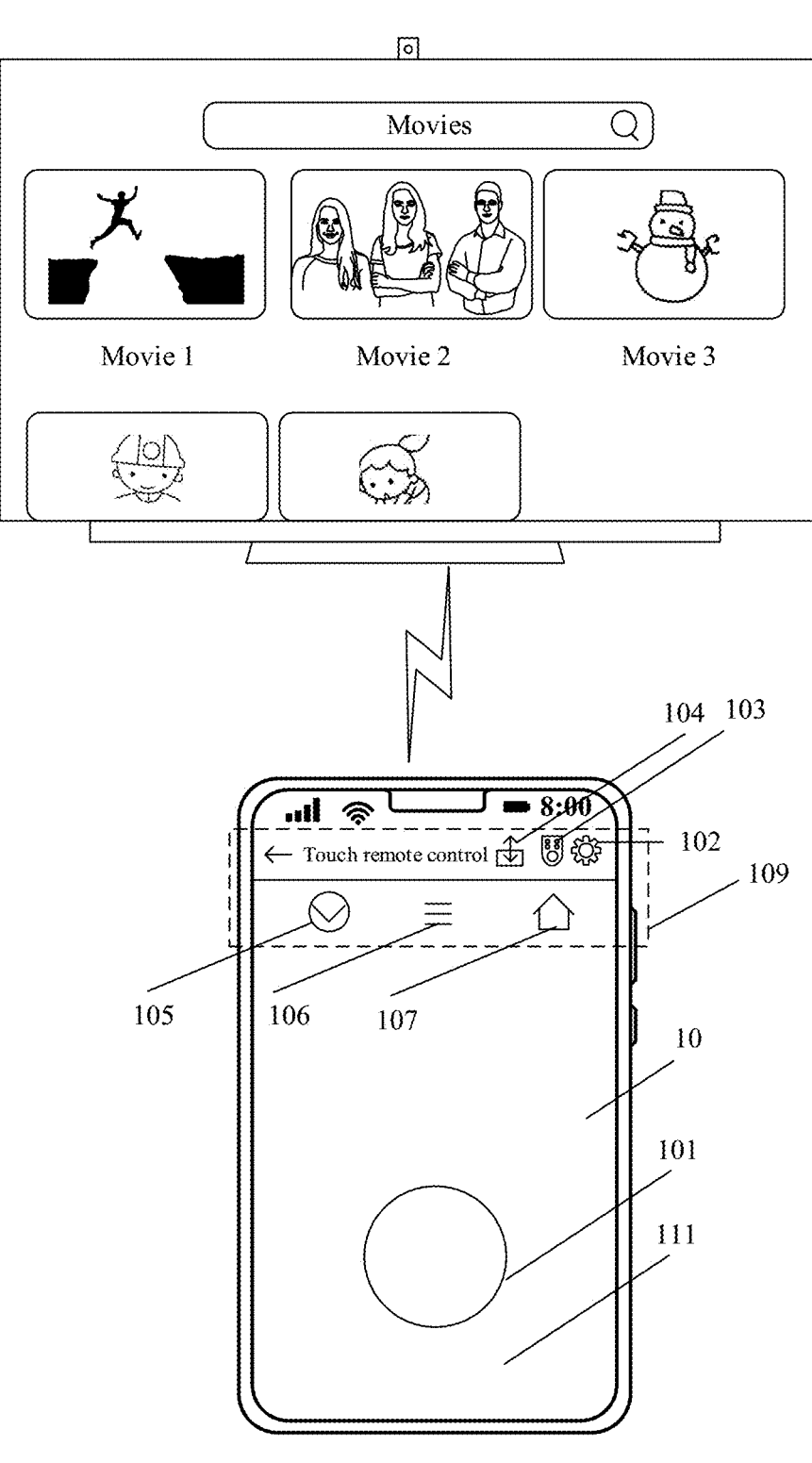

In some examples, if detecting that the user taps a "Touch remote control" option, the mobile phone may display the touch remote control interface 10 shown in FIG. 10(c). If detecting that the user taps a "Button remote control" option, the mobile phone may display a button remote control interface 30 shown in FIG. 8(b).

Optionally, since the mobile phone pops up the pop-up window 202 shown in FIG. 10(b), if the mobile phone does not detect, within a time period, an operation of tapping "Touch remote control" or "Button remote control", the mobile phone displays, by default, the touch remote control interface 10 shown in FIG. 10(c). In this way, the user can quickly and conveniently control an application-related operation on the television on the touch remote control interface 10.

Alternatively, in some other embodiments, if the mobile phone determines that the application currently run on the television is a compatible application, the mobile phone may determine an operation preference of the user based on historical information that the user controls the compatible application on the television by using the mobile phone, and display a corresponding remote control interface based on the operation preference of the user.

Figure 11A:
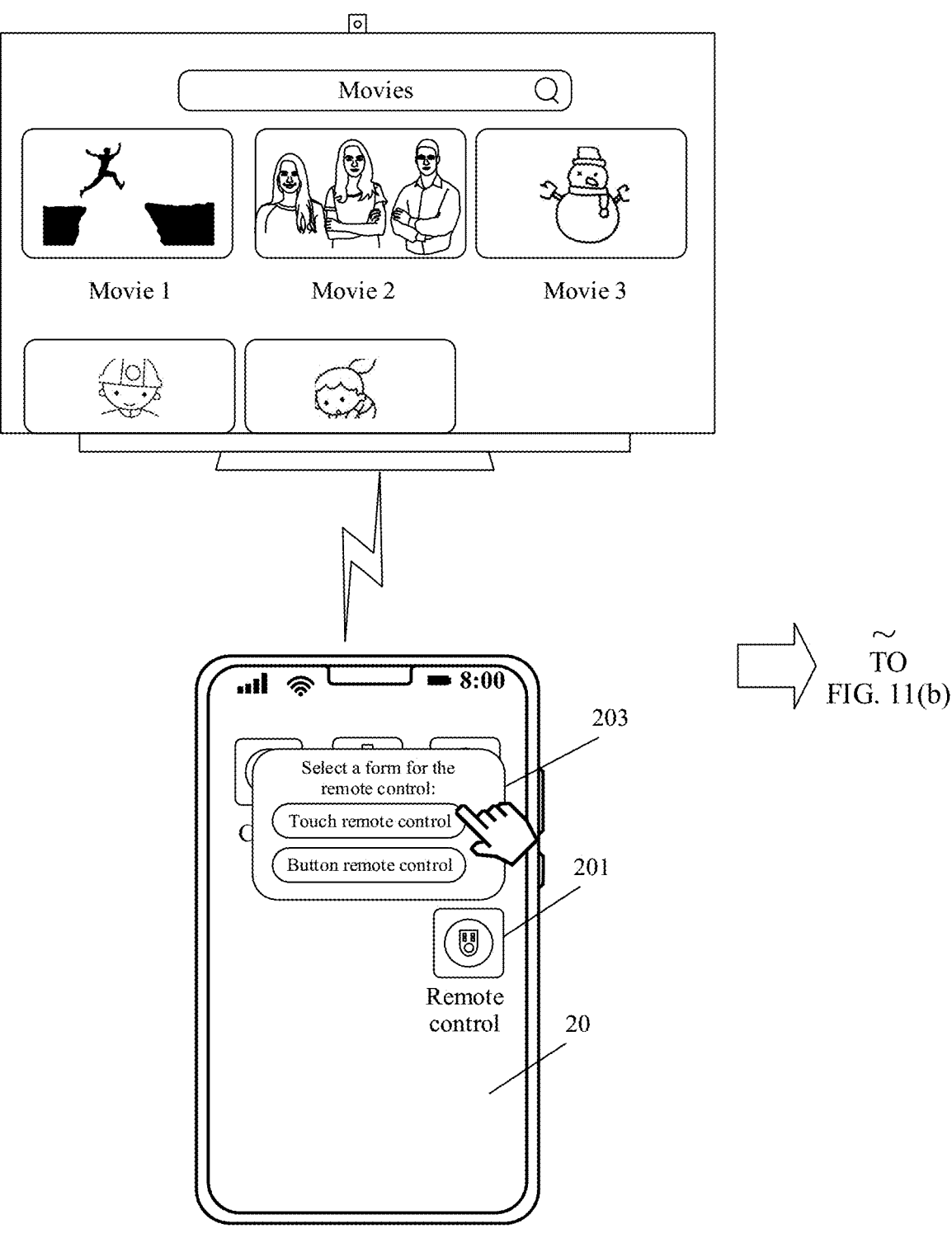
Figures 11A, 11B:
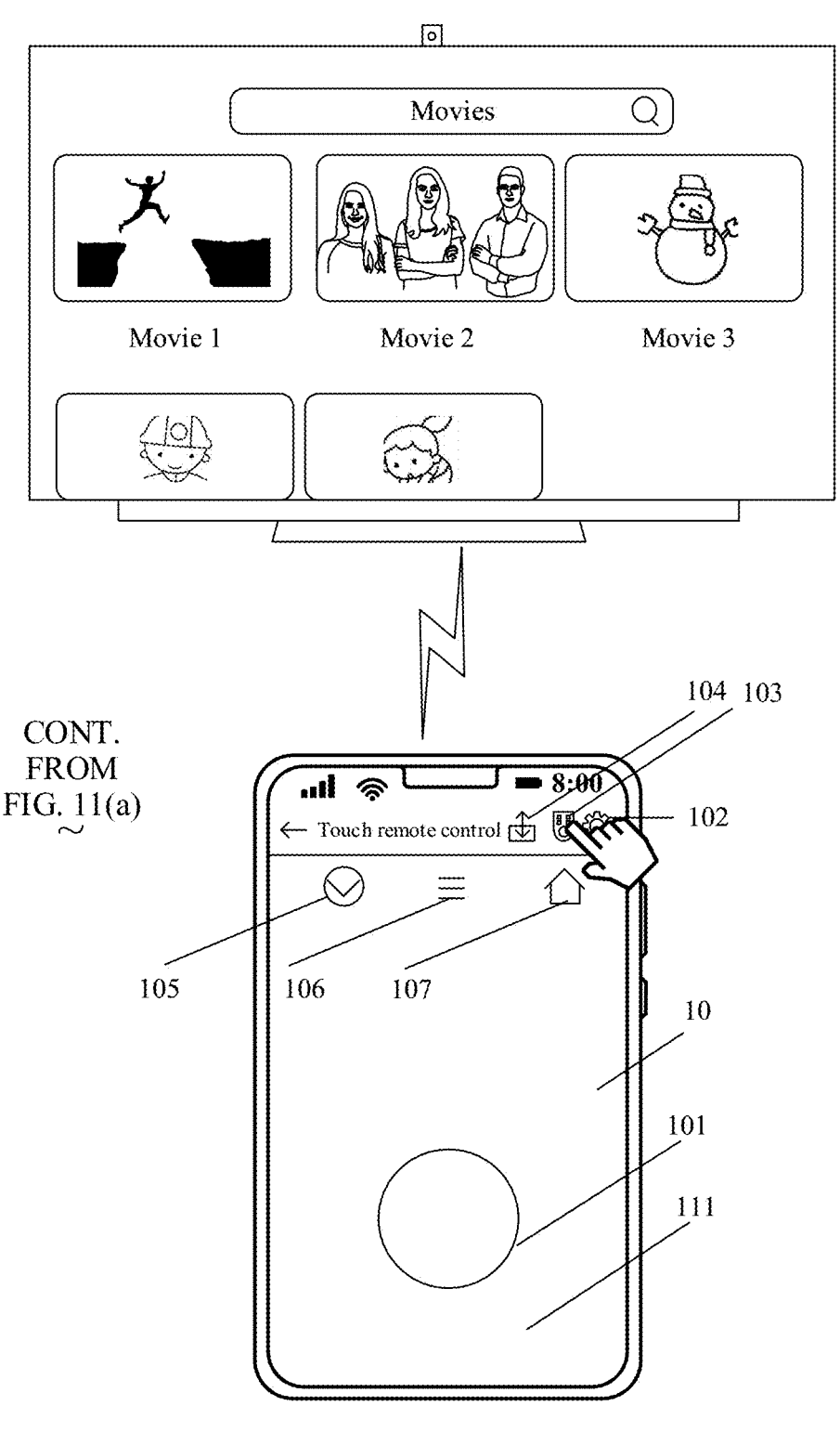

In FIG. 10(a) to FIG. 10(c), the mobile phone pops up the pop-up window 202 is mainly used as an example to prompt the user to select a form for the remote control. In some other embodiments, the mobile phone may further provide another entry for selecting the form for the remote control. For example, as shown in FIG. 11(a), the mobile phone displays the interface 20, where the interface 20 includes the icon 201 of the remote control application. When detecting an operation of touching and holding the icon 201 by the user, the mobile phone may pop up a shortcut card 202 to prompt the user to select the form for the remote control. In some examples, after detecting an operation of tapping the "Touch remote control" option, the mobile phone may display the touch remote control interface 10 shown in FIG. 11(b).

Figure 12A:
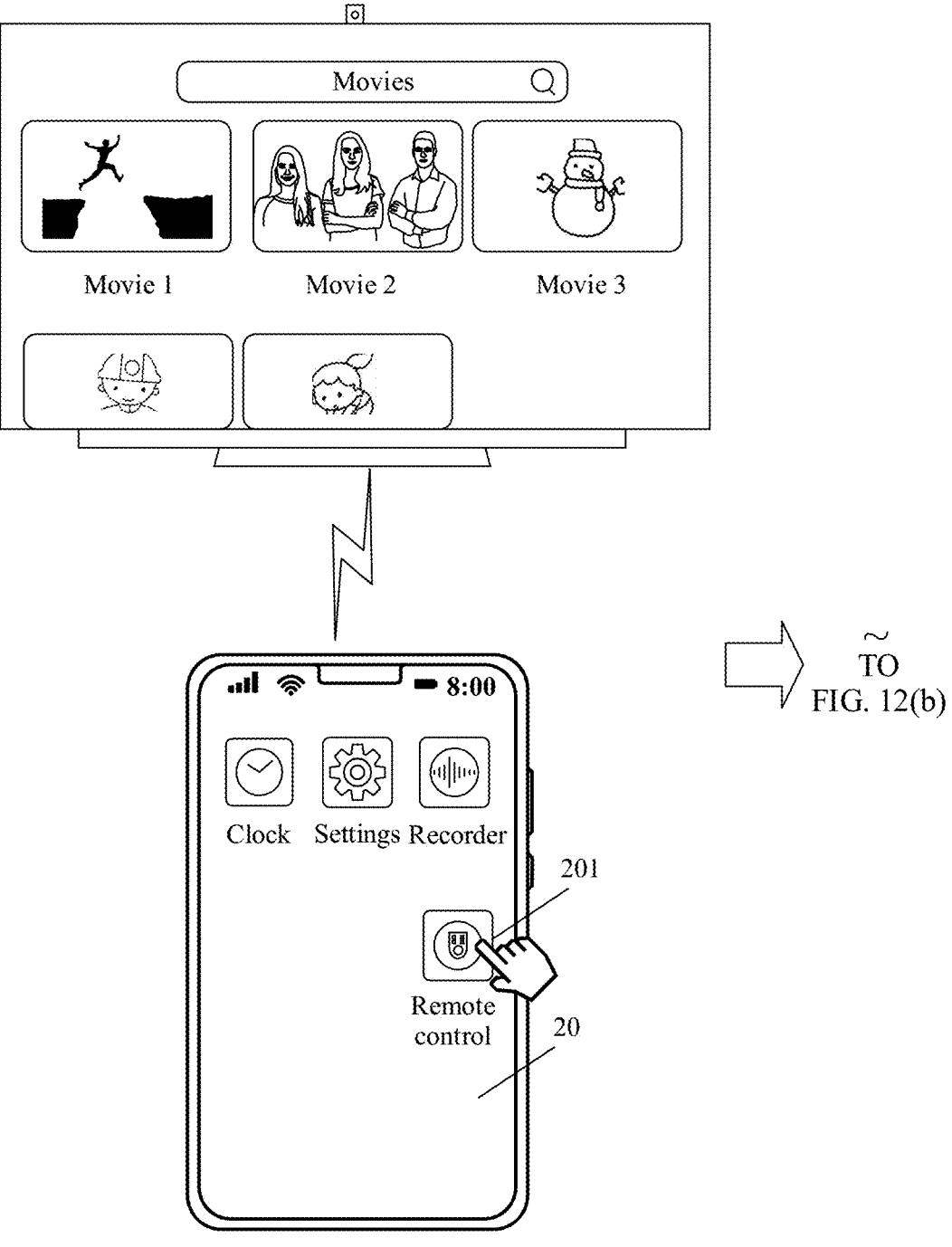

In some other embodiments, when the application currently run on the television is a compatible application, the mobile phone may display, by default, a touch remote control interface that can be compatible with more application types, so that the user can conveniently and quickly control the television. Subsequently, when receiving an operation of switching forms of the remote control by the user, the mobile phone switches the forms of the remote control based on the operation. For example, as shown in FIG. 12(a), when detecting that the user taps the icon 201 of the remote control application, the mobile phone displays, by default based on the type of the video application B (a compatible application) run on the television, the touch remote control interface 10 shown in FIG. 12(b). If an operation of tapping the control 103 by the user is detected, and the mobile phone determines that the user wants to switch the forms of the remote control, the mobile phone may switch the remote control interface from the touch remote control interface 10 shown in FIG. 11(b) to the button remote control interface 30 shown in FIG. 12(c).

It should be noted that the mobile phone may further provide more entries and manners for the user to select the form for the remote control. This is not limited in embodiments of this application.

Figure 13:
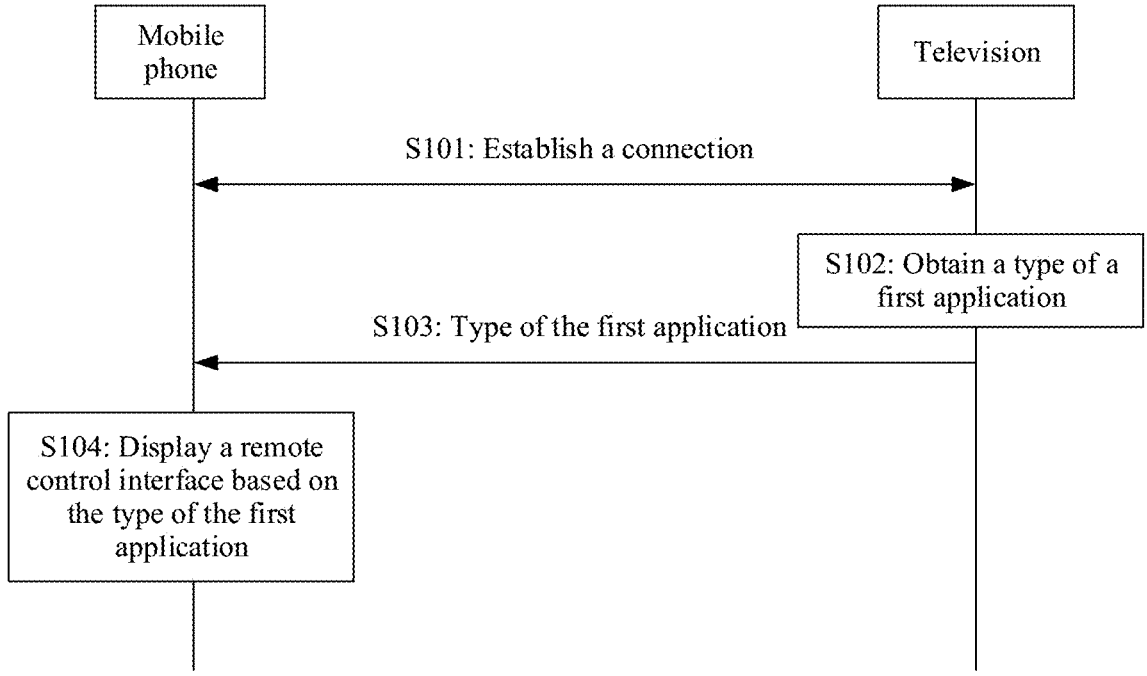
FIG. 13 is a schematic flowchart of a device control method according to an embodiment of this application.

FIG. 13 is a flowchart of an example of a device control method according to an embodiment of this application. For example, a television is a second electronic device, and a mobile phone is a first electronic device. As shown in FIG. 13, the method includes the following steps.

S101: A connection is established between the mobile phone and the television.

Optionally, a Bluetooth protocol-based connection, a Wi-Fi connection, or another type of connection may be established between the mobile phone and the television.

S102: The television obtains a type of a first application.

The first application may be an application currently run/displayed on the television.

Figures 12A, 12B:
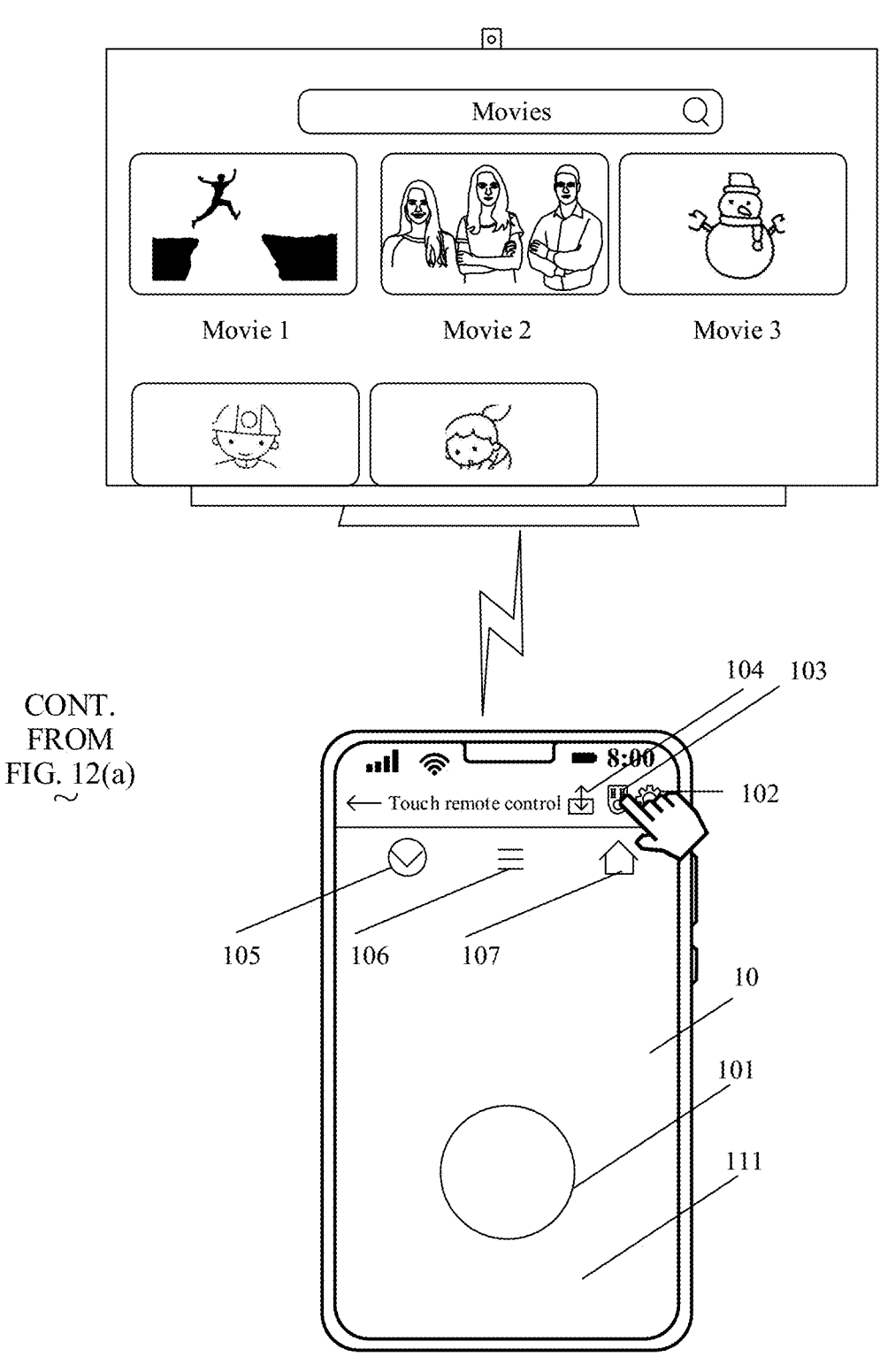
Figure 12C:
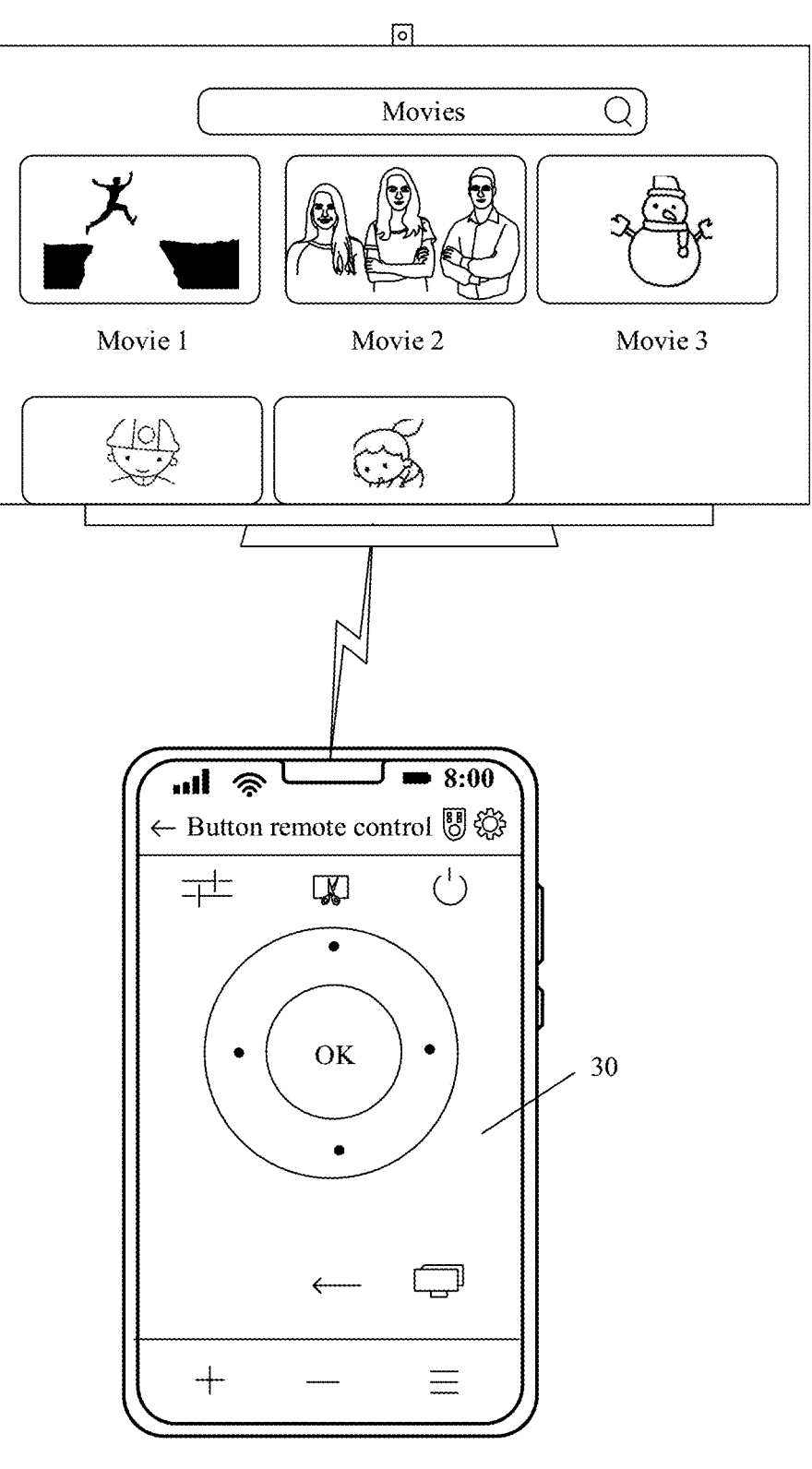

For example, as shown in FIG. 12(b), the first application may be a video application B being displayed on the television.

S103: The television sends the type of the first application to the mobile phone.

S104: The mobile phone displays a remote control interface based on the type of the first application.

It may be understood that, because different types of applications on the television support different operations, the mobile phone may display, based on the type of the first application on the television, the remote control interface that matches the first application, to better control a related operation of the first application on the television on the remote control interface.

For example, as shown in FIG. 12(b), an interface of a video application B is currently displayed on the television. To facilitate operation on the video application B, the mobile phone displays, based on a type of the video application B (for example, the type is a mobile application), the remote control interface 10 that matches the video application B, so that a user can conveniently and quickly control a related operation of the video application B on the television.

In the foregoing solution, the mobile phone may automatically identify a type of an application on the television, and automatically switch forms of a remote control. In other words, when the user opens any application on the television, a virtual remote control of the mobile phone may be automatically switched to a corresponding control form. In this way, a probability of manually switching the forms of the remote control by the user can be reduced, and efficiency and experience of interaction between the user and the television can be improved. In some scenarios, the user does not need to manually switch the forms of the remote control, that is, insensitive remote control experience can be provided to the user. This improves interaction efficiency and interaction experience.

The foregoing mainly uses an example in which there is one application currently run and displayed in the foreground on the television. In some other embodiments, there may be a plurality of applications run and displayed in the foreground on the television.

Figure 14A:
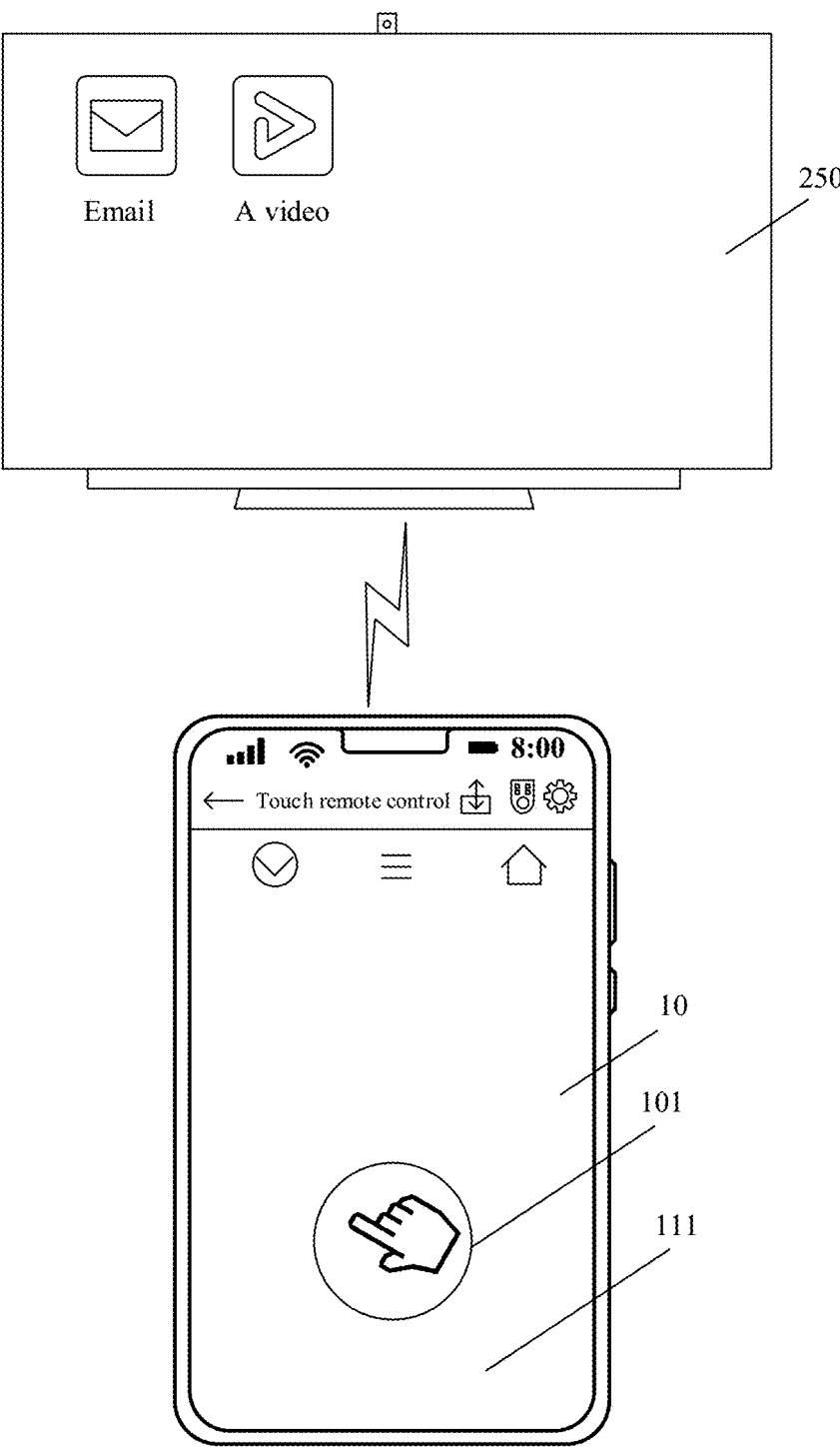
FIG. 14A, FIG. 14B, FIG. 14C(a) and FIG. 14C(b), and FIG. 14D(a) to FIG. 14D(c) are diagrams of interfaces according to an embodiment of this application.

In this case, in a possible implementation, because a touch remote control may support operations on a plurality of types of applications, the mobile phone may display a touch remote control interface by default after receiving a remote control intention of the user. For example, as shown in FIG. 14A, it is assumed that after the television is powered on, an interface 250 is displayed, and a notification message is sent to the mobile phone, to indicate the mobile phone to turn on the remote control. After receiving the notification message, the mobile phone displays a touch remote control interface 10 based on application icons of a plurality of applications (such as an email application and a video application A) displayed on the television interface 250. In this way, the user may perform an operation on an application on the television on the mobile phone interface 10, for example, select an icon for the email application, or select an icon for the video application A.

Optionally, after the mobile phone displays the touch remote control interface by default, the user may perform some operations, for example, tap a control 103 shown in (b) in FIG. 6A, to control the mobile phone to switch to a button remote control interface.

In another possible implementation, when a plurality of applications are run/displayed on the television, after a remote control intention of the user is received, a touch remote control interface is displayed by default. Subsequently, the user may tap a control like a control 103, to control the mobile phone to switch to a button remote control.

In another possible implementation, the mobile phone may alternatively take statistics of remote control preferences of the user in different scenarios, and display a corresponding remote control interface in a target scenario. For example, in a startup scenario, if the user prefers to use a touch remote control, when the television displays a startup interface, the mobile phone correspondingly displays a touch remote control interface.

In another example, the television interface may alternatively display application interfaces of a plurality of applications, for example, display application interfaces of an email application and a video application A in a split-screen manner.

Figure 14B:
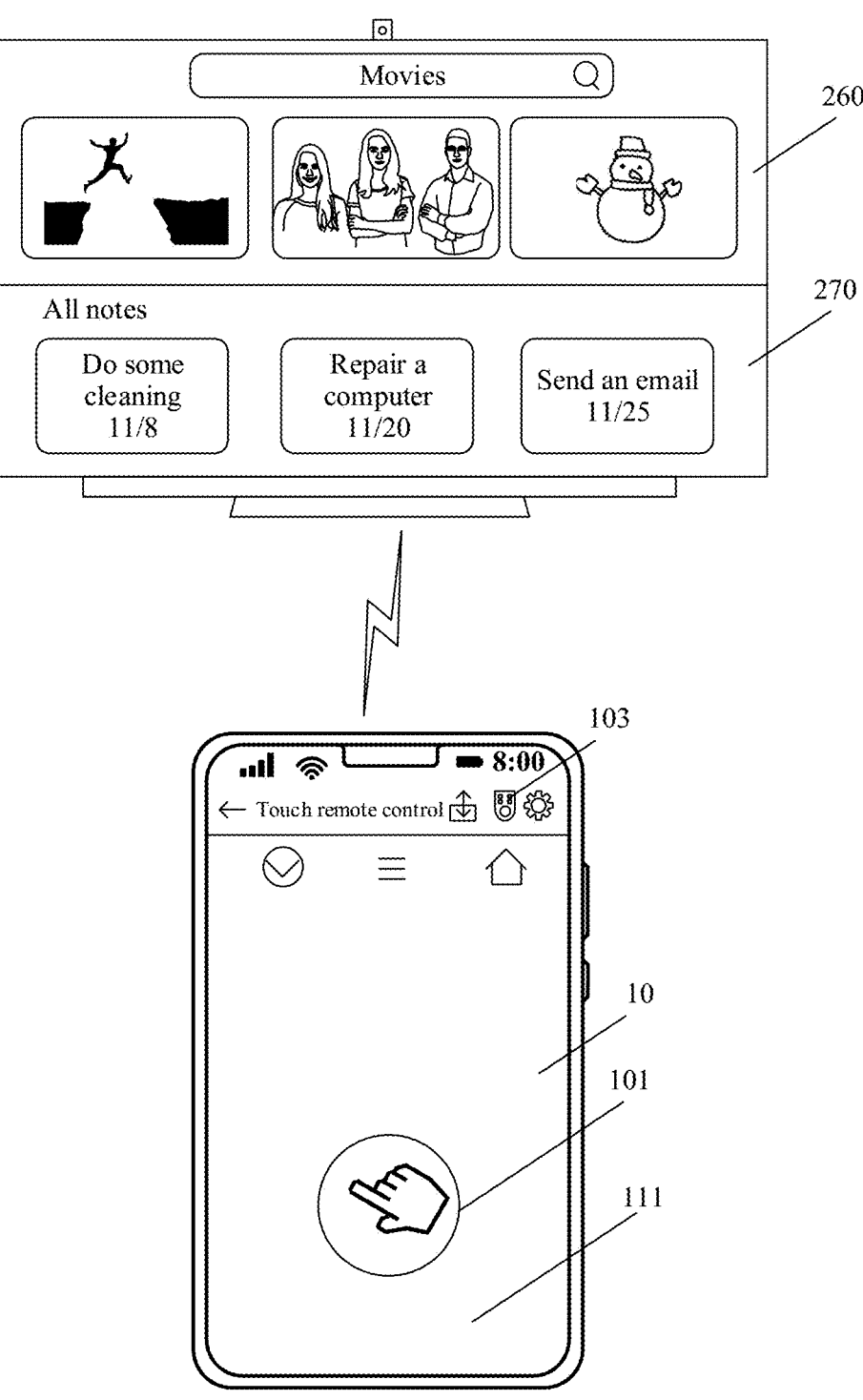

In this case, in a possible implementation, when it is learned that the interfaces corresponding to the plurality of applications are displayed on the television in the split-screen manner, the mobile phone may display a touch remote control interface by default. This helps perform operations on a plurality of types of applications on the television. For example, as shown in FIG. 14B, the television displays an interface 260 of a video application and an interface 270 of a note application in the split-screen manner. In this way, after obtaining a remote control intention of the user, the mobile phone may display the touch remote control interface 10 by default based on the interfaces of the plurality of applications displayed on the television, and the user may control the television on the touch remote control interface 10.

Optionally, after the mobile phone displays the touch remote control interface by default, the user may perform some operations, for example, tap a control 103 on the mobile phone interface 10 shown in FIG. 14B, to control the mobile phone to switch to a button remote control interface. In other words, in response to an interface switching event triggered by the user, the mobile phone switches styles of the remote control interface.

Figure 14C:
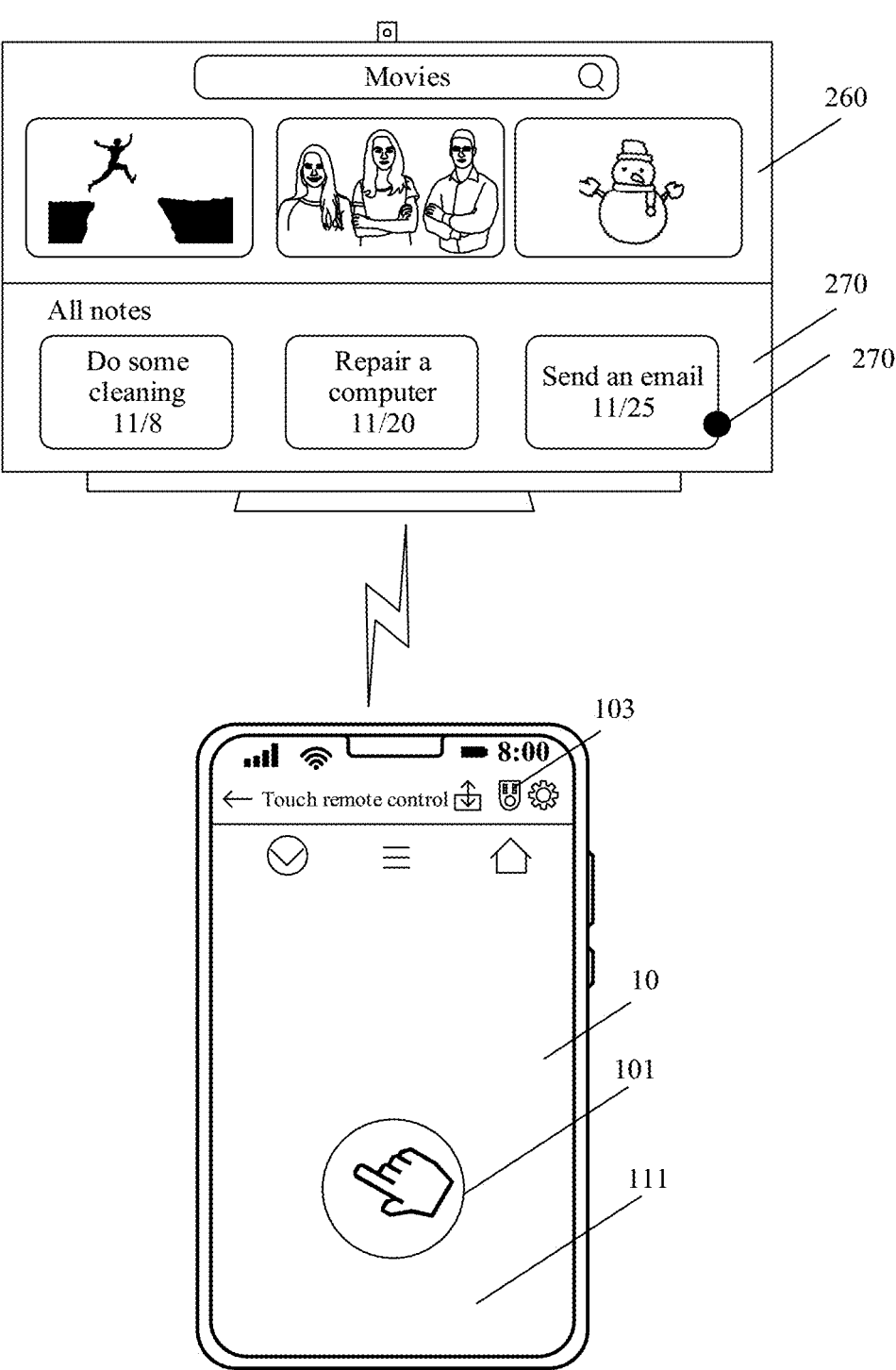
Figure 14C:
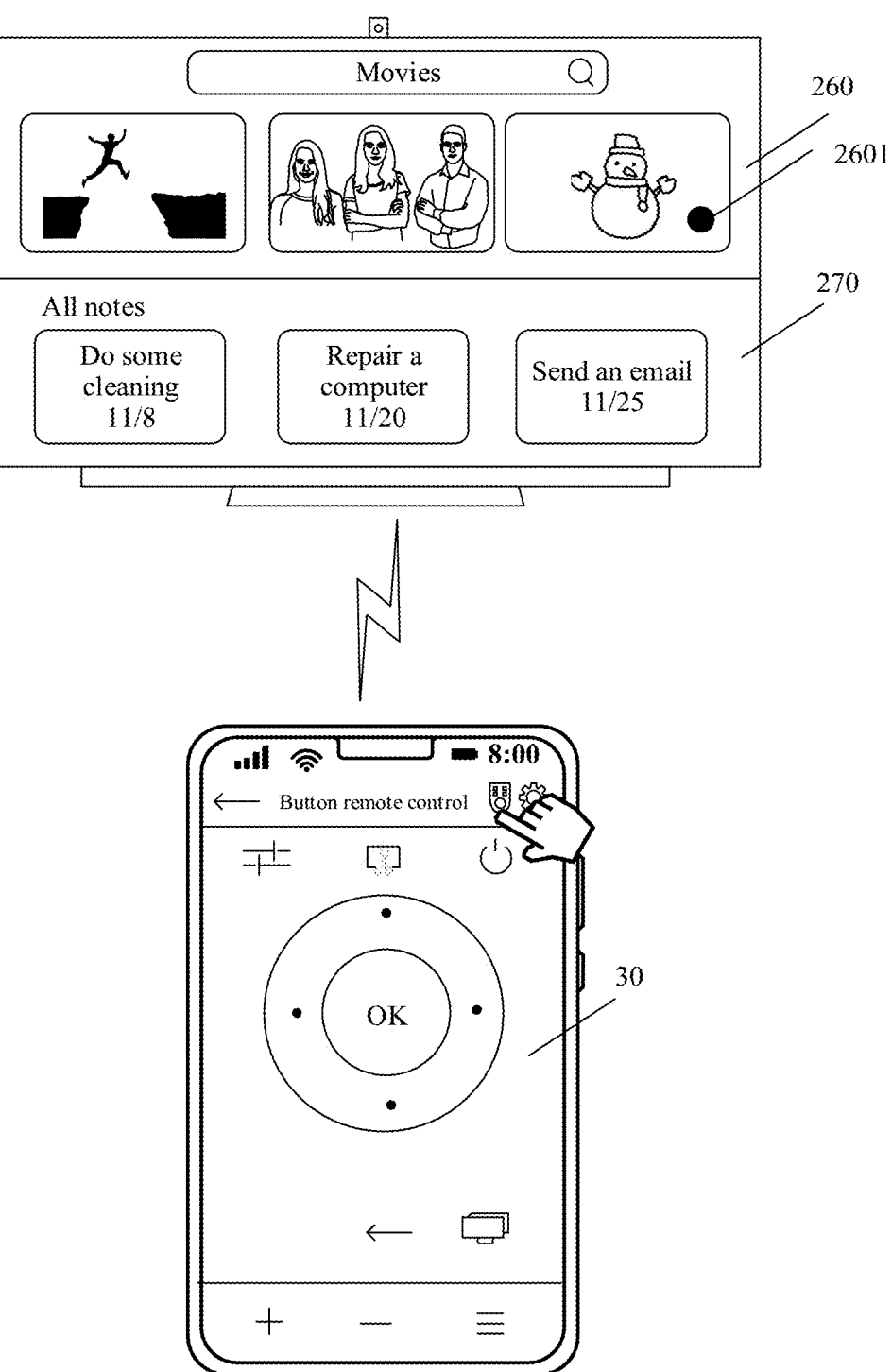

In another possible implementation, when it is learned that the interfaces corresponding to the plurality of applications are displayed on the television in the split-screen manner, the mobile phone may obtain a position of a focus on the television, and determine, based on the position of the focus on the television, to switch to a touch remote control or a button remote control. For example, as shown in FIG. 14C(a), if the focus on the television is located on an interface 270 of a note application (it is assumed that the note application is a mobile application), after obtaining a remote control intention of the user, the mobile phone may switch to the touch remote control interface 10 that matches the interface 270 of the note application. For example, as shown in FIG. 14C(b), if the focus on the television is located on an interface 260 of a video application (it is assumed that the video application is a television application), after obtaining a remote control intention of the user, the mobile phone may switch to a button remote control interface 30 that matches the interface 260 of the video application.

Figure 14D:
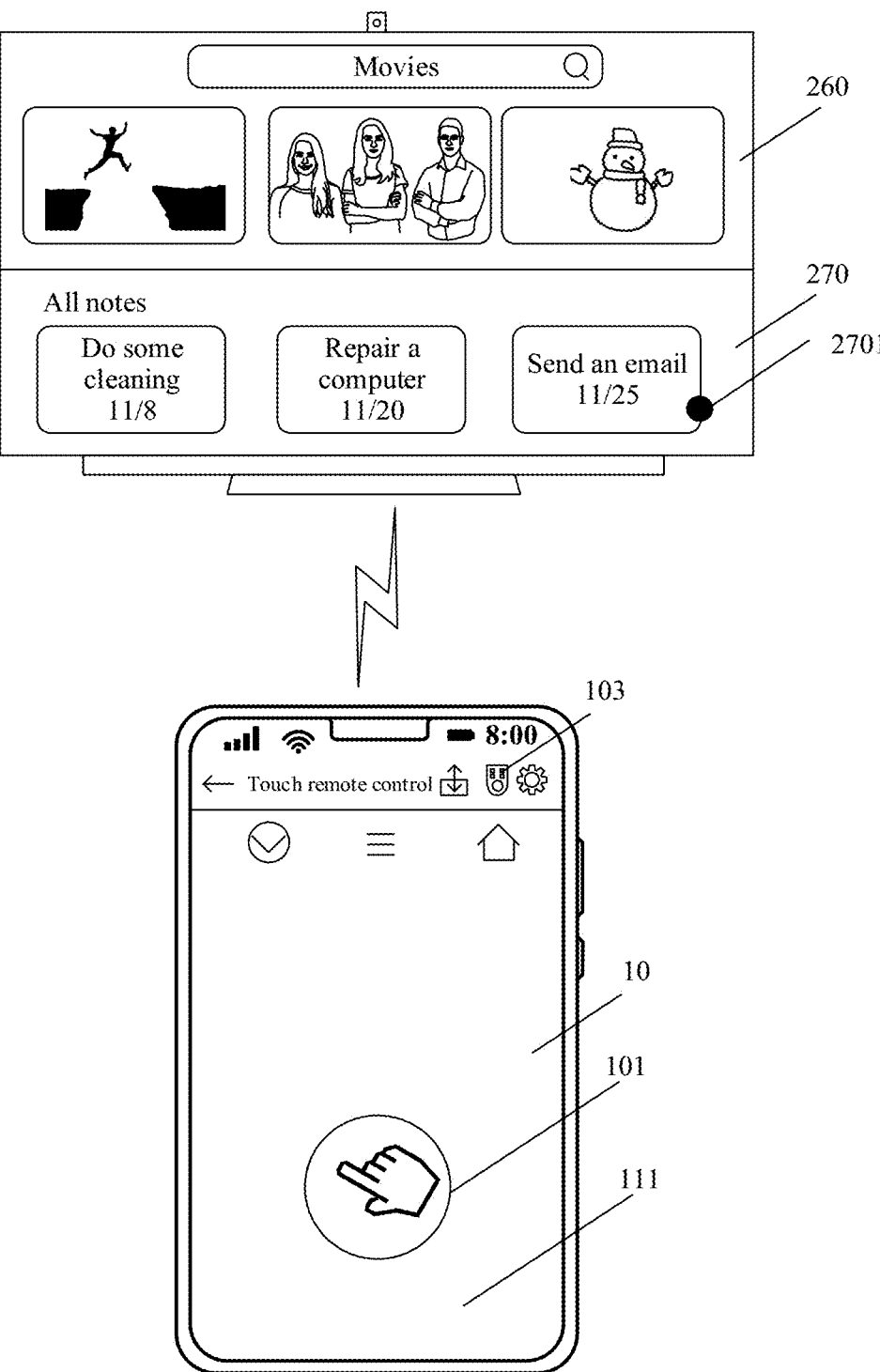
Figure 14D:
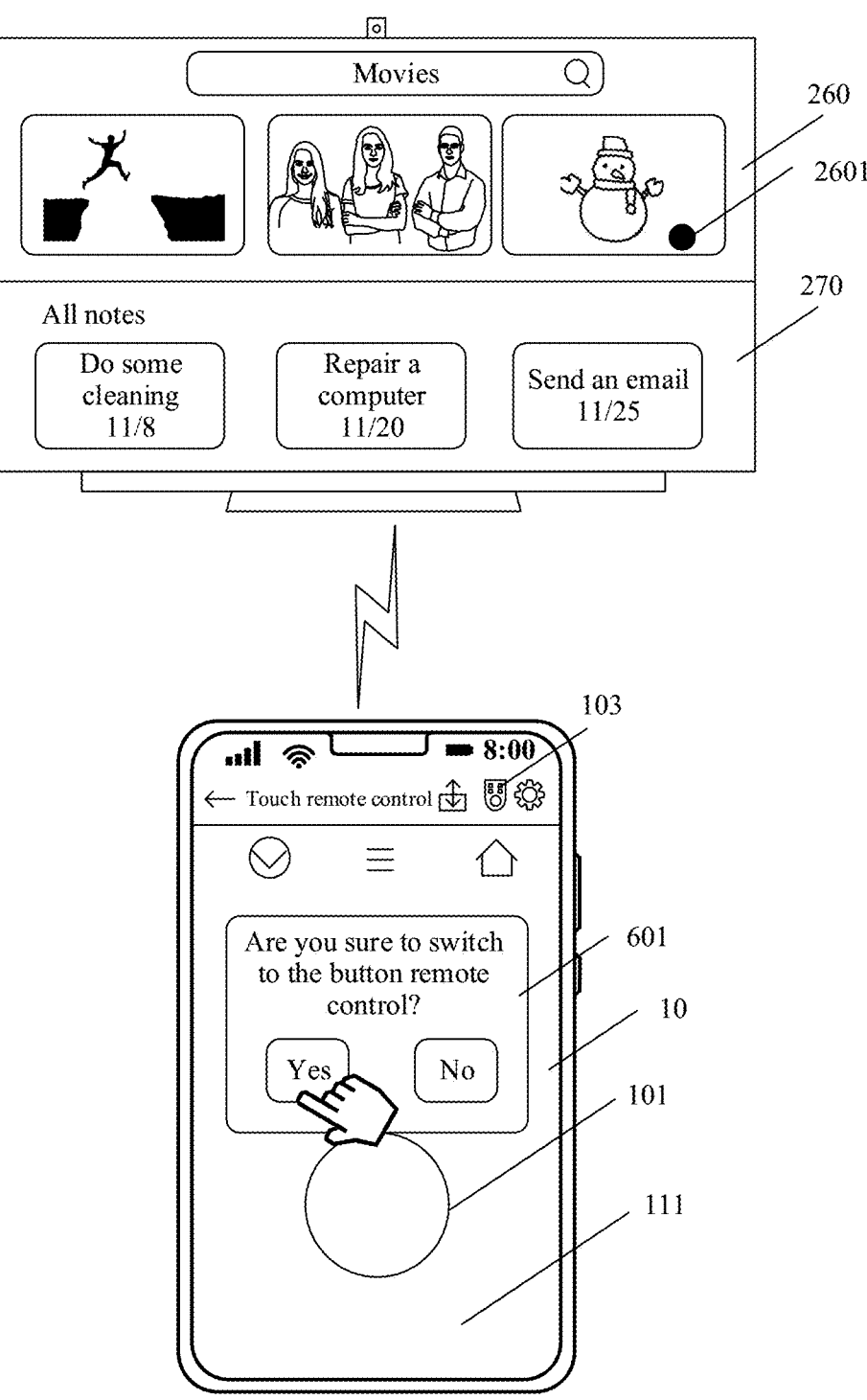
Figure 14D:
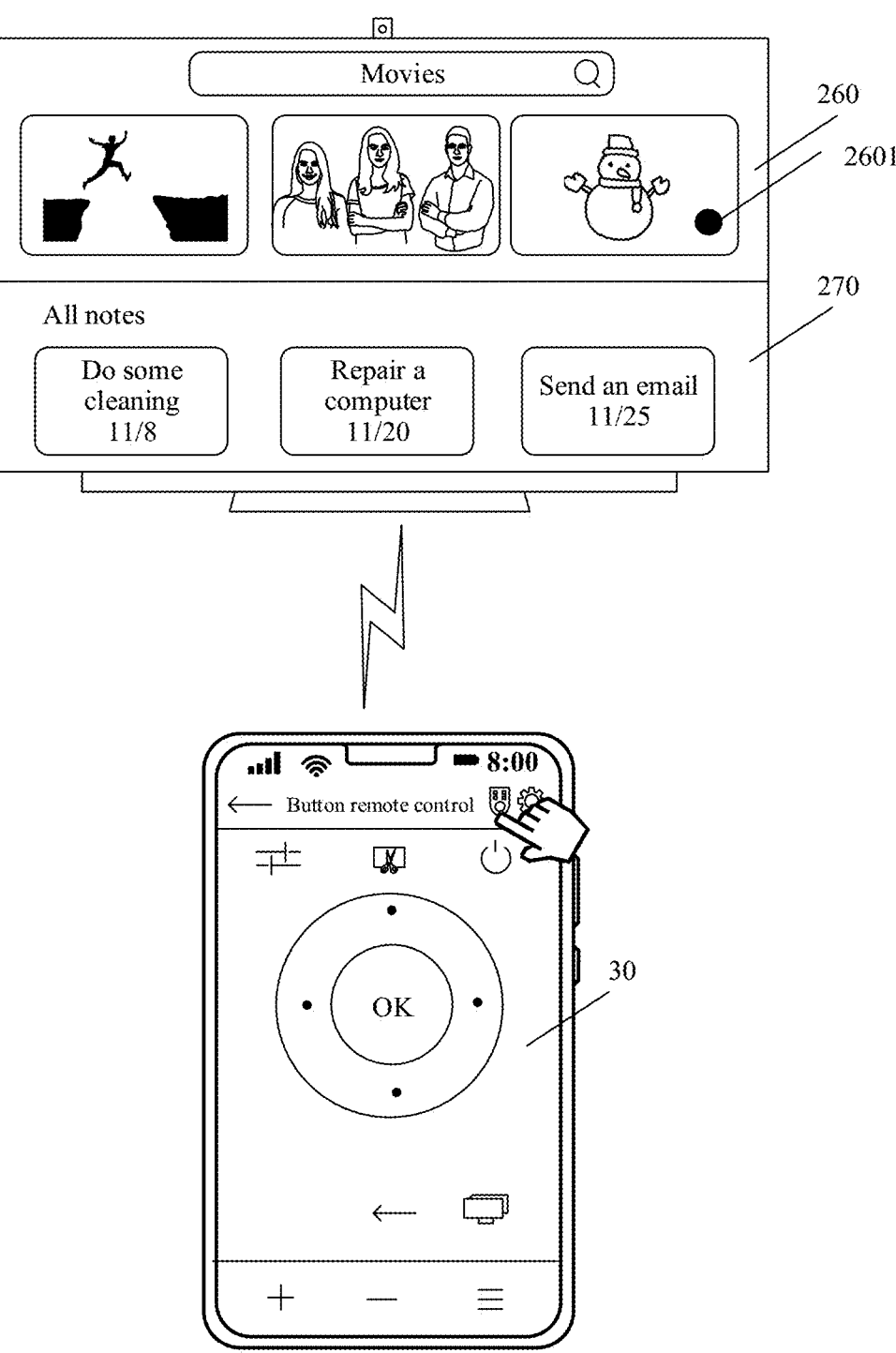

In some other embodiments, before switching the forms of the remote control, the mobile phone may ask the user whether to agree to switch the forms of the remote control. For example, as shown in FIG. 14D(a), if a focus on the television is located on an interface 270 of a note application (it is assumed that the note application is a mobile application), after obtaining a remote control intention of the user, the mobile phone may display the touch remote control interface 10 that matches the interface 270 of the note application. For example, as shown in FIG. 14D(b), if a focus on the television is located on an interface 260 of a video application (it is assumed that the video application is a television application), after obtaining a remote control intention of the user, the mobile phone may display an interface switching prompt 601. The mobile phone obtains a selection operation associated with the prompt 601. For example, if the user taps a "Yes" button, as shown in FIG. 14D(c), the mobile phone may switch from the touch remote control interface 10 to a button remote control interface 30 that matches the television interface 260.

Figure 15A:
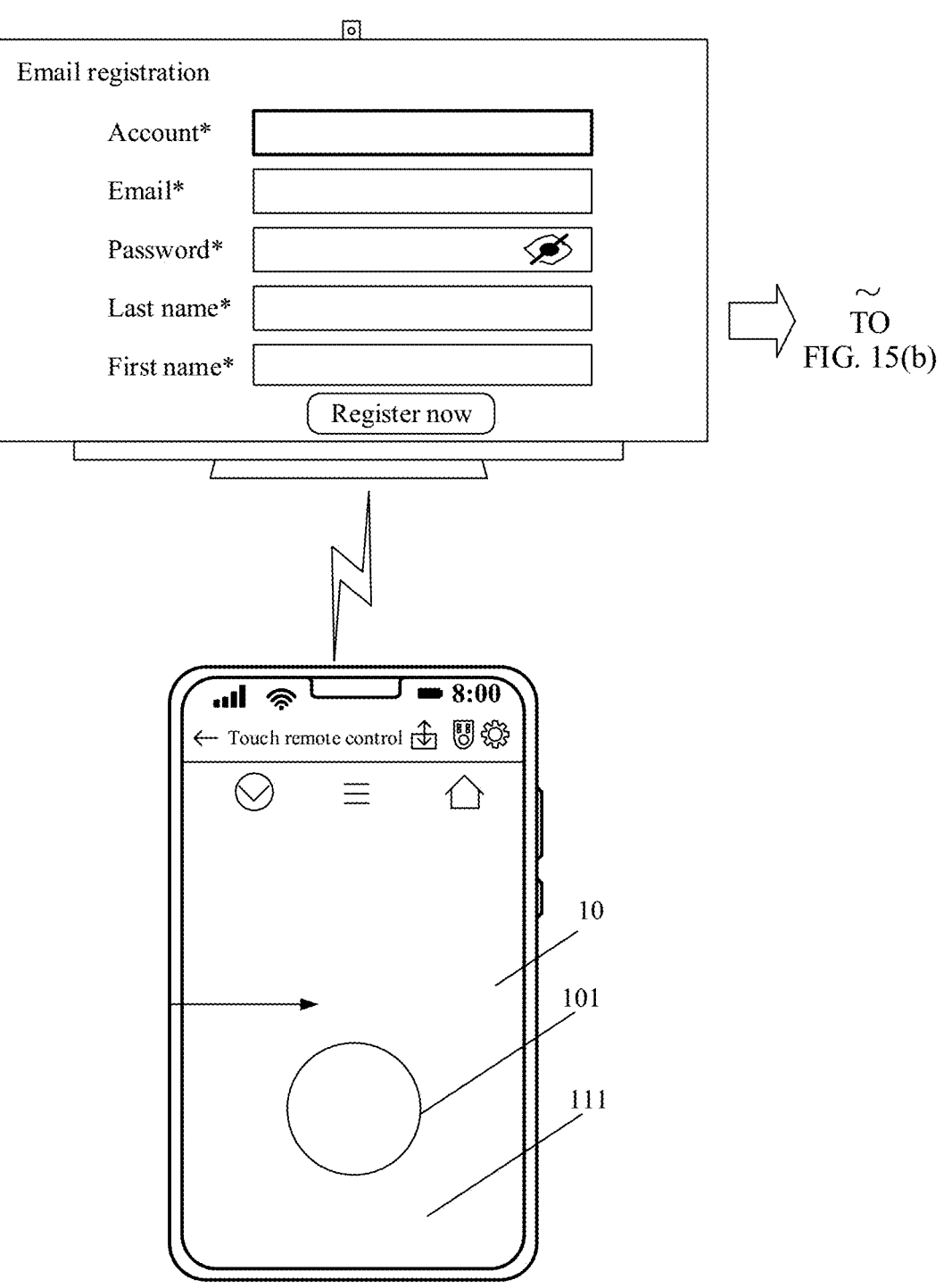
FIG. 15(a) to FIG. 15(c) are a diagram of interfaces according to an embodiment of this application.

In some other examples, the mobile phone may further control switching of the forms of the remote control in another possible application scenario. This application scenario includes but is not limited to a scenario in which the user opens an application. For example, as shown in FIG. 15(a), the user performs an operation on an email application on the television on the mobile phone interface 10. Then, the user may control, on the mobile phone interface 10, the email application on the television to be closed. For example, a finger of the user slides from an edge of the mobile phone screen (for example, from a left edge of a screen) to a middle of the screen, and the mobile phone sends information about this operation to the television, to control the television to exit the currently displayed email application. The television may return to a home screen shown in FIG. 15(b), where the home screen includes an icon of the email application and an icon of a video application A. The user may alternatively control the television to jump back to the home screen in another manner. This is not limited in embodiments of this application.

Figure 15B:
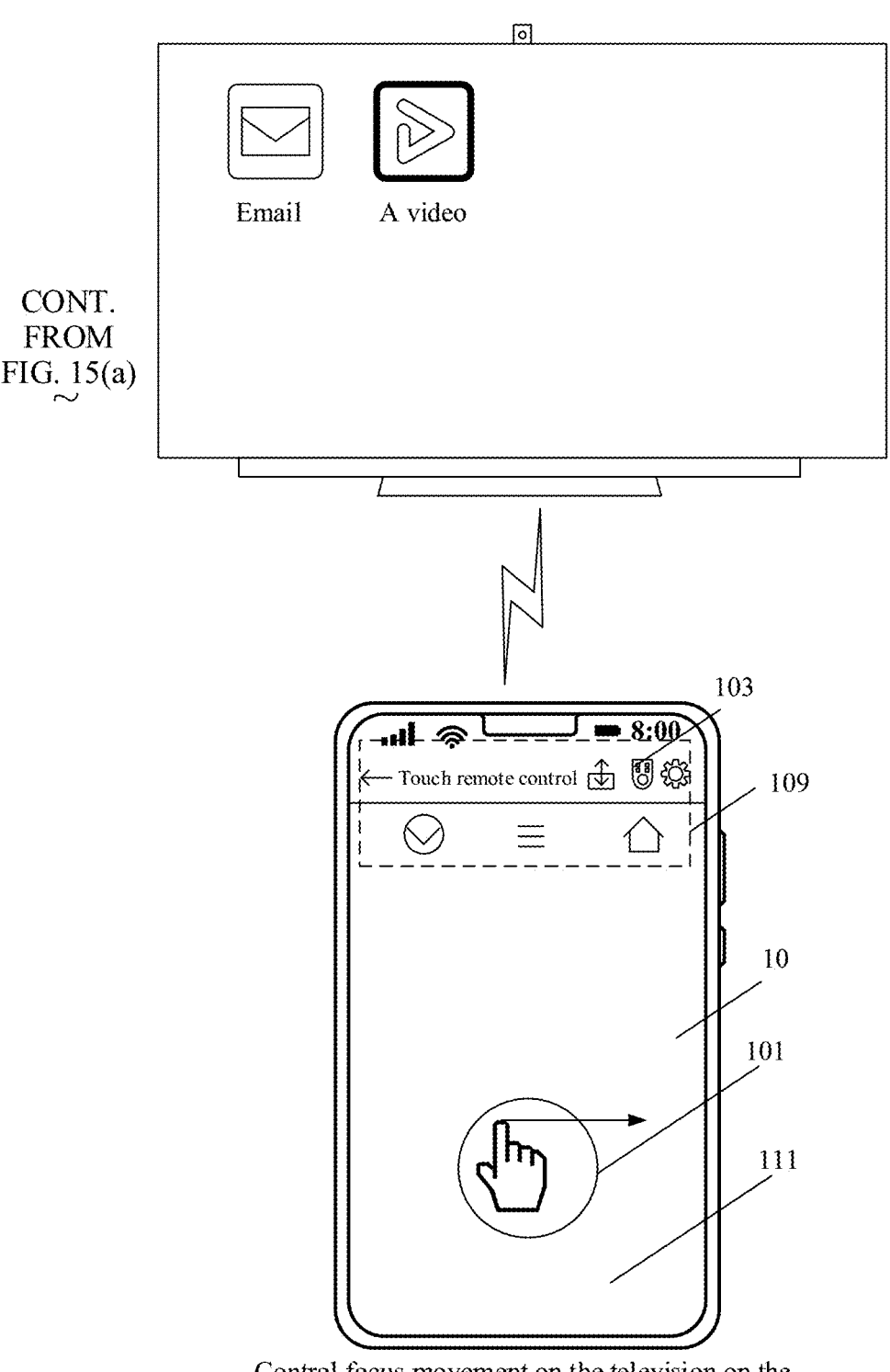

As shown in FIG. 15(b), in a focus movement mode, the user may slide the finger on the mobile phone interface 10, to control a focus on the television to move to the icon of the video application A.

Figure 15C:
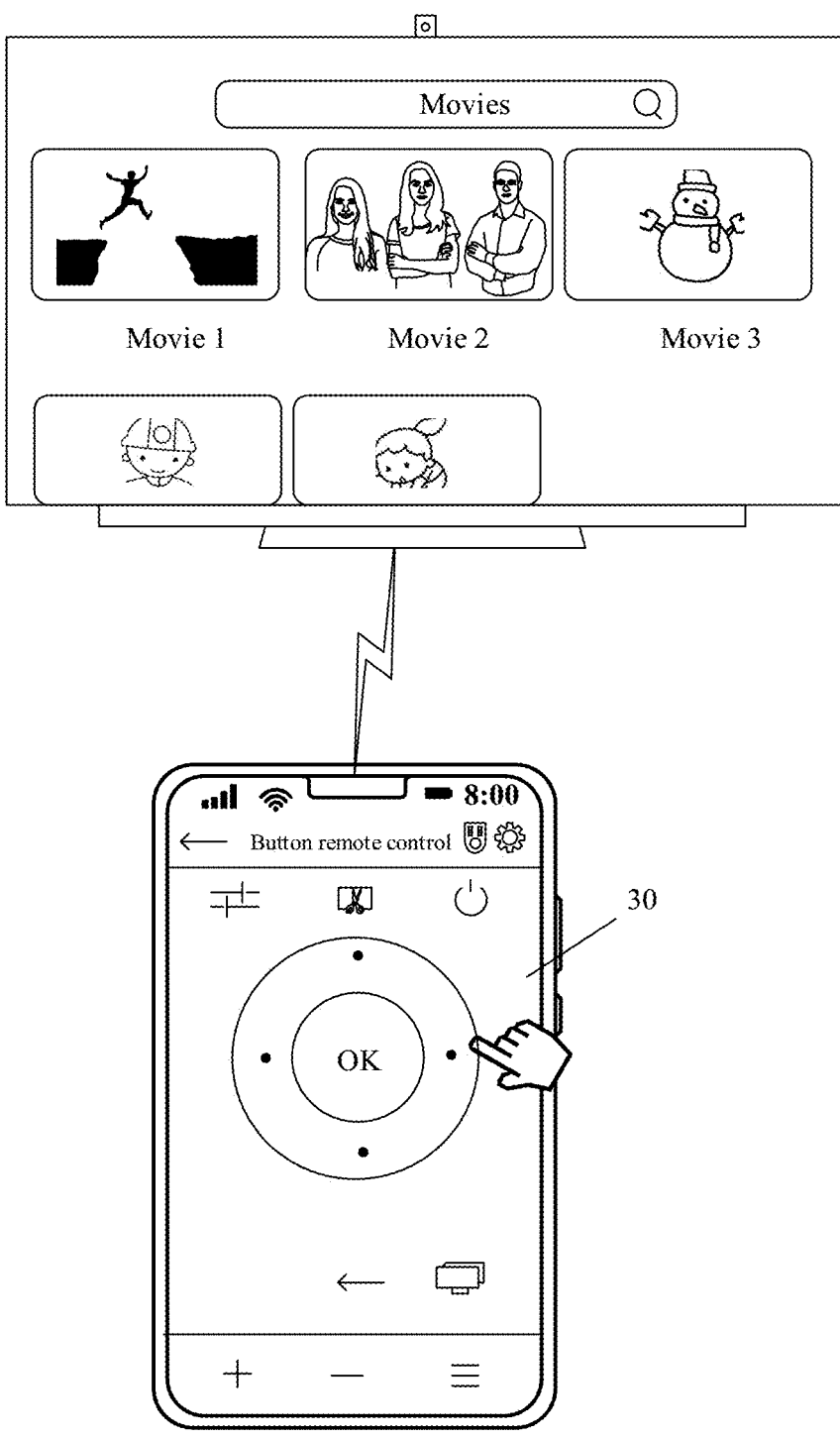

After the focus on the television is moved to the icon of the video application A, the user may lift the finger away from the mobile phone screen, and tap (equivalent to triggering a tap mode) on the interface 10 (for example, an area, on the interface 10, other than a function area 109). In response to a tap operation of the user, the mobile phone determines that the user wants to open the video application A (it is assumed that the video application is a television application) on the television. In this way, as shown in FIG. 15(c), the mobile phone may control the television to open the video application A, and a home application interface of the video application A may be displayed on the television. In addition, the mobile phone may switch the remote control interface to a button remote control interface 30 that matches the video application A. This helps the user perform an operation on a television application (for example, the video application A) on the television on the button remote control interface 30 of the mobile phone. In this solution, the mobile phone may automatically switch, for the user based on an intention of opening an application on the television (for example, selecting an icon for the application on the television on the mobile phone interface), a remote control interface that matches the application. This avoids high operation complexity caused by a case in which the user operates a control like a control 103 to trigger switching of the forms of the remote control.

Optionally, in some examples, when the mobile phone displays the touch remote control interface, some operations performed by the user on the mobile phone may be used to control the television. For example, when the mobile phone displays the interface 10 shown in (b) in FIG. 6A, the user adjusts a volume button of the mobile phone, and the mobile phone may send a volume adjustment operation of the user to the television, to control the television to adjust volume.

For another example, when the mobile phone displays the interface 10 shown in (b) in FIG. 6A, the finger of the user slides from the edge of the mobile phone screen to the middle of the screen, and the mobile phone may send this slide operation of the user to the television, to control the television to return to/exit an application on the television.

It can be learned that, in the foregoing process, the user may conveniently trigger the mobile phone to enter a corresponding remote control mode (for example, the focus movement mode or the gesture mode). After the corresponding remote control mode is triggered, the user may perform an operation like a slide operation on the full screen of the mobile phone, so that the user holds the mobile phone with one hand or operates the mobile phone with a single finger, to control the television (for example, control the television to display corresponding content). This improves efficiency and experience of interaction between the television and the user.

It may be understood that a method flowchart shown in FIG. 13 is applicable to a case in which the mobile phone needs to support a plurality of remote control interfaces of different forms. In some scenarios, for example, all applications installed on the television can support the touch remote control interface, or a function design of the touch remote control interface can implement control on an application installed on the television, an operation of invoking a corresponding remote control interface form based on a type of an application in FIG. 13 may not be performed, but the remote control interface on the mobile phone is directly opened based on a control intention initiated by the user.

Scenario 2

In this scenario, a virtual remote control of a mobile phone is formed as a touch remote control. A remote control interface of the touch remote control may support a plurality of remote control modes, for example, a gesture control mode (which may be referred to as a gesture mode for short), a tap event response mode (which may be referred to as a tap mode for short), and a cursor focus movement mode (which may be referred to as a focus movement mode for short). In a possible implementation, the touch remote control may activate different remote control modes in different time periods. In other words, on the remote control interface, the tap mode is activated in a first time period, the gesture mode is activated in a second time period, and the focus movement mode is activated in a third time period.

Optionally, this embodiment of this application provides the following plurality of methods for switching remote control modes.

(a) Switch the remote control modes by using a single switch control.

(1) The remote control interface includes a specific switch control. A user taps the switch control, to control the touch remote control to switch between the plurality of modes cyclically.

For example, when the user taps the switch control at a time, the touch remote control is switched to the focus movement mode; when the user taps the switch control next time, the touch remote control is switched to the gesture mode; and so on.

Figure 17:
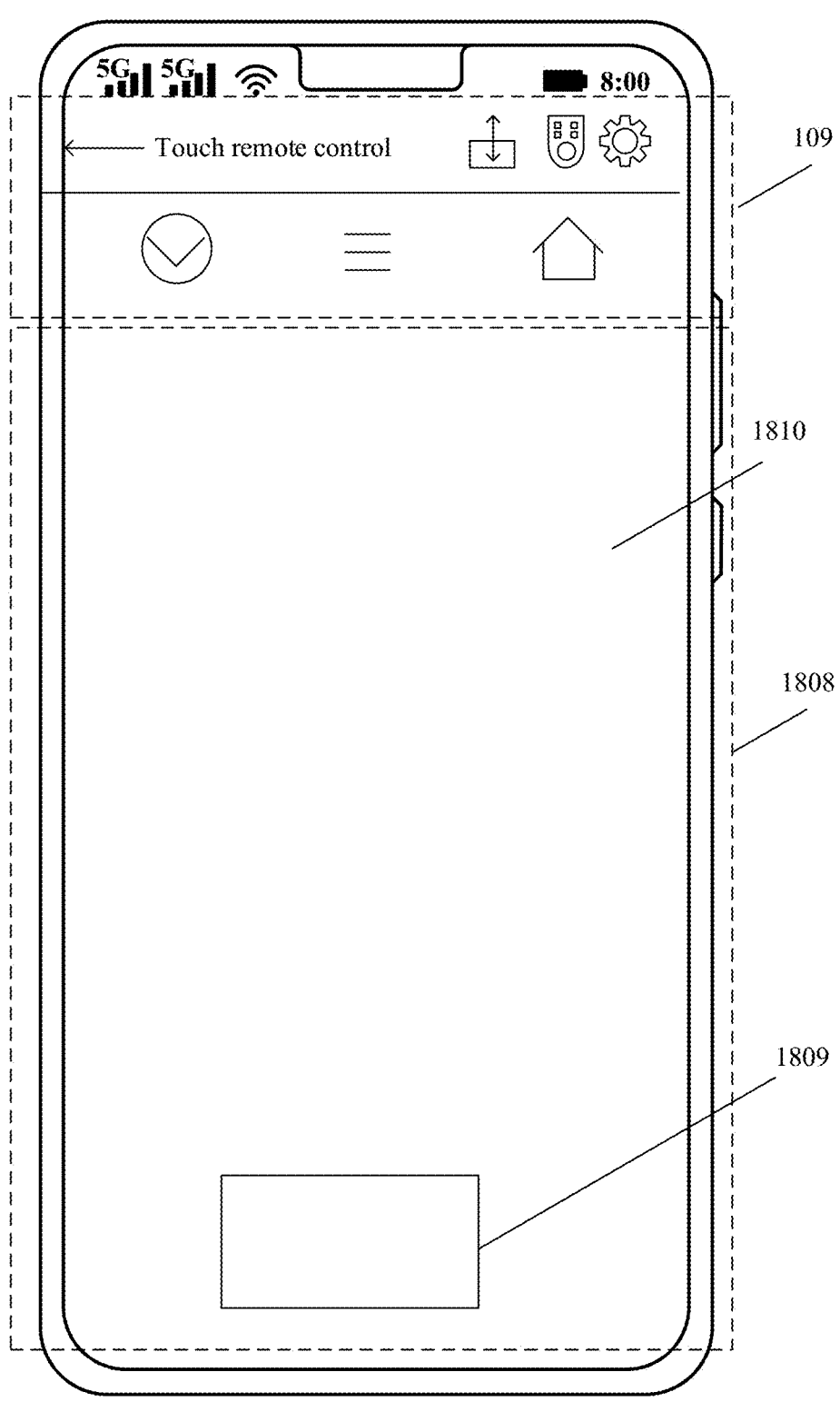
FIG. 17 and FIG. 18(a) and FIG. 18(b) are diagrams of interfaces according to an embodiment of this application.

For another example, as shown on a remote control interface 1810 in FIG. 17, the interface 1810 includes a cyclic switch control 1809. The control 1809 is configured to cyclically switch the touch remote control between the focus movement mode and the gesture mode.

For example, after an operation of tapping the control 1809 by the user is detected, the touch remote control is switched to the focus movement mode, and is kept in the focus movement mode. The user may slide a finger in an area 1808 of a mobile phone screen (or may slide a finger through a function area 109). This means that the finger of the user may perform an operation on the full screen of the mobile phone, to control a focus on a television to move.

When the user taps the control 1809 again, the touch remote control is switched to the gesture mode, and is kept in the gesture mode. The user may slide the finger in the area 1808 of the mobile phone screen (or may slide a finger through the function area 109). This means that the finger of the user may perform an operation like a slide operation on the full screen of the mobile phone, to control an interface on the television to scroll.

It may be understood that, after the user taps the control 1809 for the touch remote control to enter the focus movement mode or the gesture mode, even if the user passes through an area covered by the tap control 1809 in the focus movement mode or the gesture mode, for example, in a continuous slide operation manner, mode switching is not triggered, unless the user stays in the area covered by the tap control 1809 when performing a slide operation, and performs a tap operation again in the area.

Optionally, both the focus movement mode and the gesture mode may be compatible with the tap mode.

(2) The remote control interface includes a specific switch control, and a user may perform different pressing operations on the switch control, to trigger switching of the remote control modes. For example, short pressing on the switch control may trigger the touch remote control to switch to the focus movement mode, and pressing and holding on the switch control may trigger the touch remote control to switch to the gesture mode.

(b) Switch the remote control modes by using a plurality of switch controls.

(1) This switching mode for remote control modes may be referred to as a temporary activation mode. The touch remote control is in the tap mode by default. When a user touches a switch control on the remote control interface, a corresponding remote control mode is temporarily activated. After the remote control mode is activated, a finger of the user may continuously slide on the remote control interface. When the finger of the user is lifted away from a screen, the remote control mode ends, and the touch remote control restores to the tap mode.

Figure 6B:
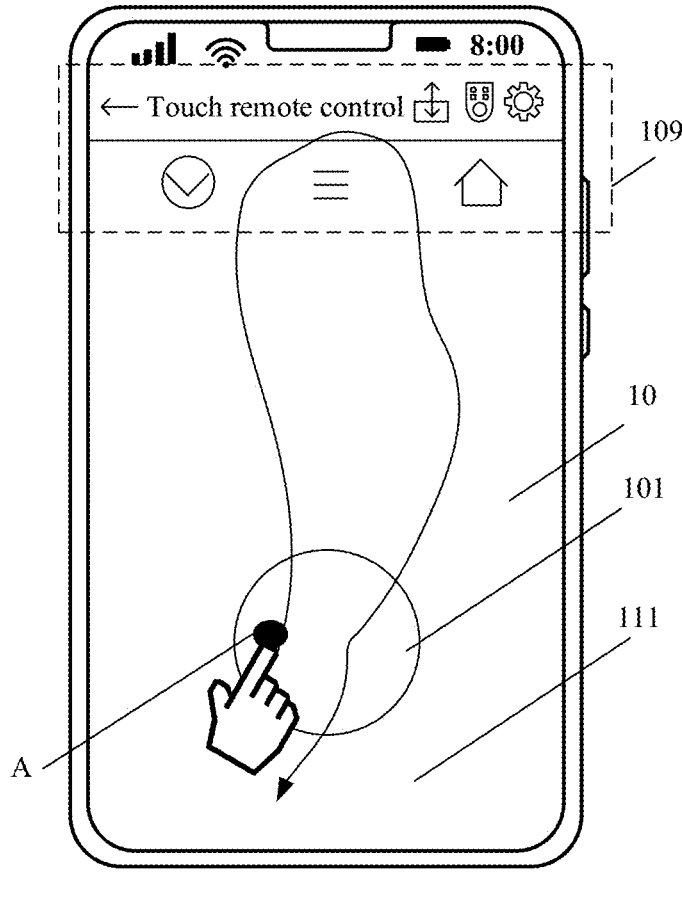
Figure 6C:
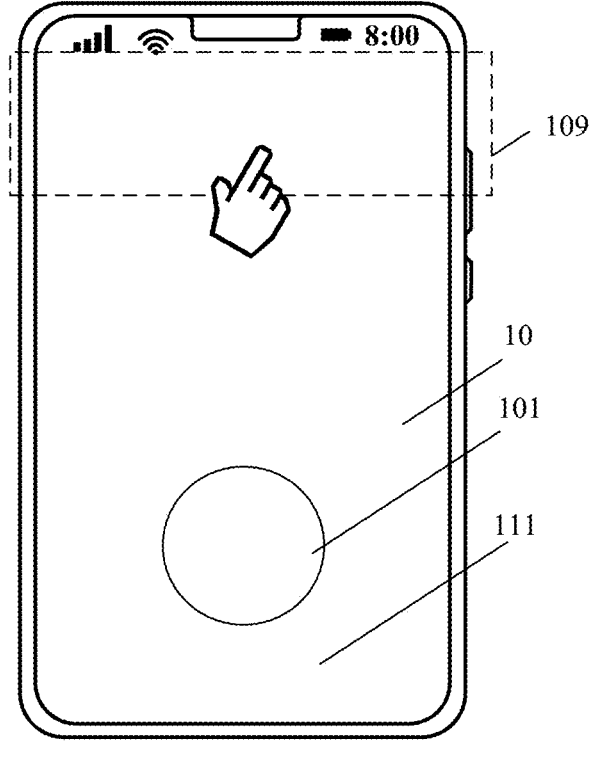

For example, as shown in FIG. 6B, it is assumed that the touch remote control is in the tap mode by default. When the user inputs a slide operation on a remote control interface 10, and a touch start point of the slide operation is located in a focus movement control area 101, the touch remote control is triggered to switch to the focus movement mode. The finger of the user can continue to slide on the mobile phone screen, to control continuous focus movement of a cursor on a television. For example, along a track shown in FIG. 6B, the finger of the user may pass through a function area 109 from bottom to top, pass through the focus movement control area 101 from top to bottom, and then pass through a gesture control area 111. During this period, as long as the finger of the user is not lifted away from the screen, the touch remote control is kept in the focus movement mode. It can be learned that, after the focus movement mode is triggered, the finger of the user may slide back and forth on the full screen of the mobile phone for a plurality of times, and slide tracks are not limited. This improves continuity of an interaction operation between the user and a device, and further improves interaction efficiency and interaction experience.

Then, when the finger of the user is lifted away from the mobile phone screen, the touch remote control automatically restores to the default tap mode.

Then, the user may tap the gesture control area 111 on the remote control interface 10 shown in FIG. 6B, to trigger the touch remote control to switch to the gesture mode. The finger of the user can slide on the mobile phone screen, to control scrolling of an interface on the television. When the finger of the user is lifted away from the mobile phone screen, the touch remote control automatically restores to the default tap mode. In this example, the focus movement control area 101 and the gesture control area 111 correspond to two switch controls.

Figure 16A:
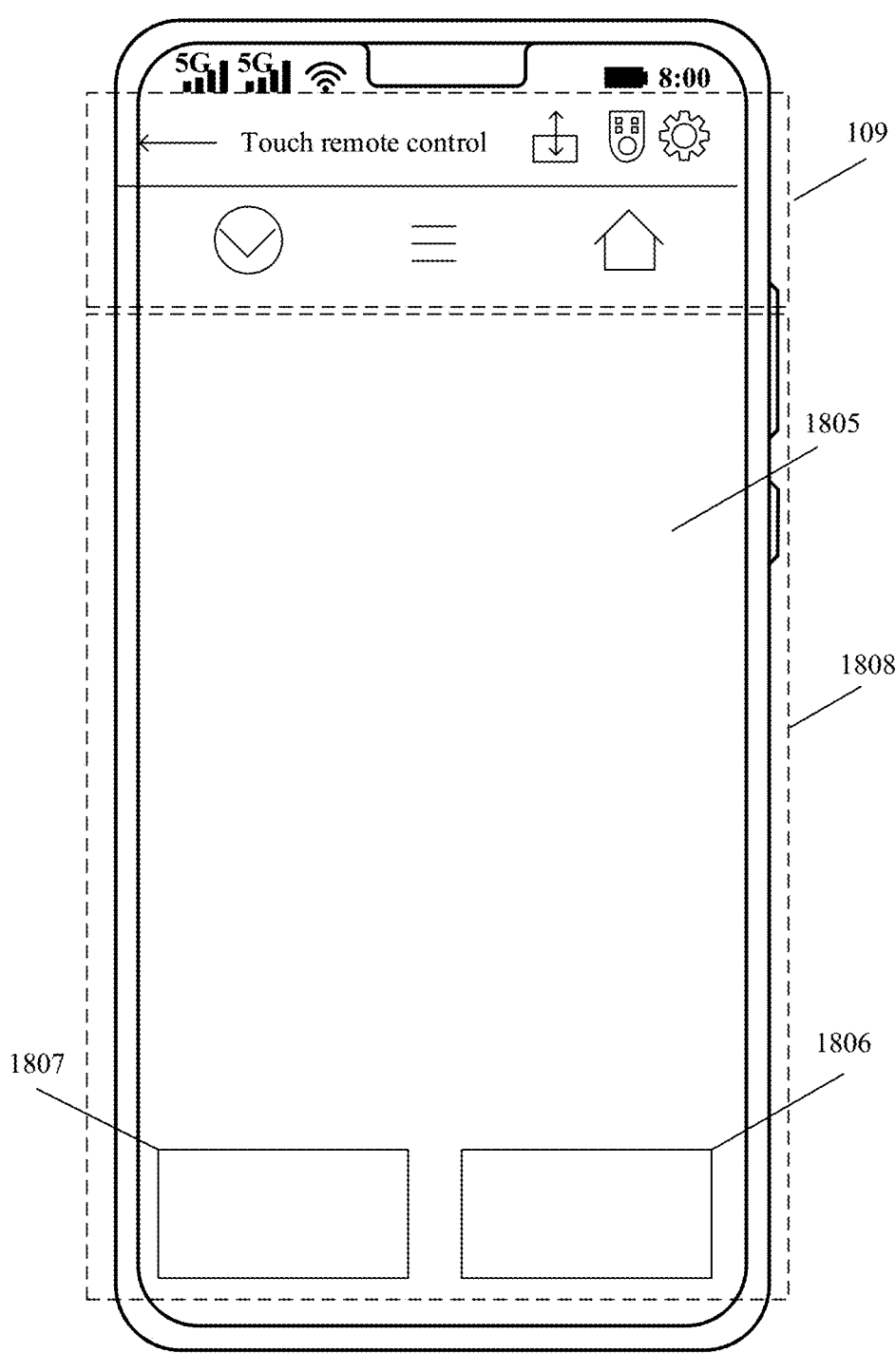
FIG. 16A, FIG. 16B(a) and FIG. 16B(b), and FIG. 16C(a) and FIG. 16C(b) are diagrams of interfaces according to an embodiment of this application.
Figure 16B:
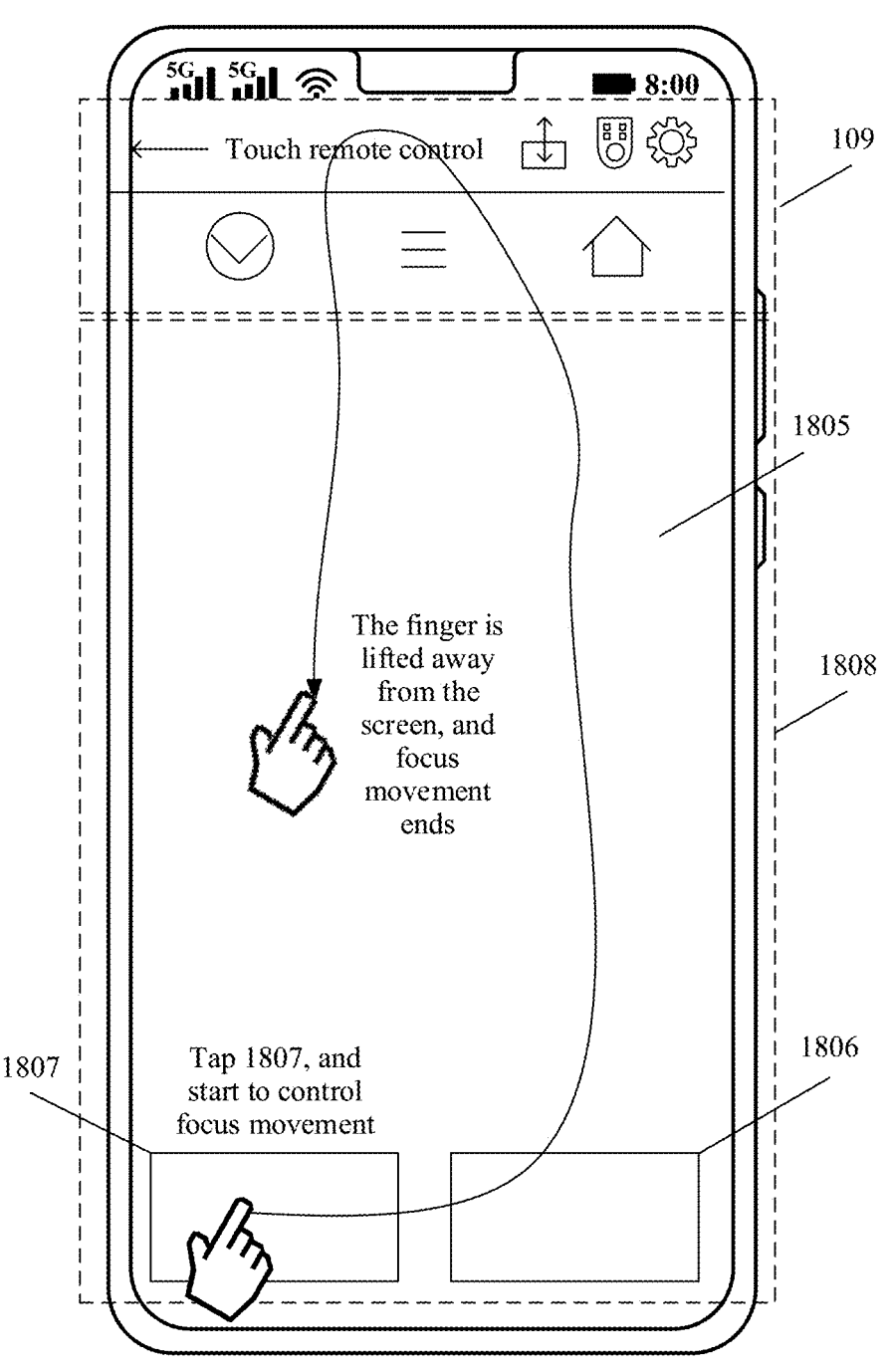
Figure 16B:
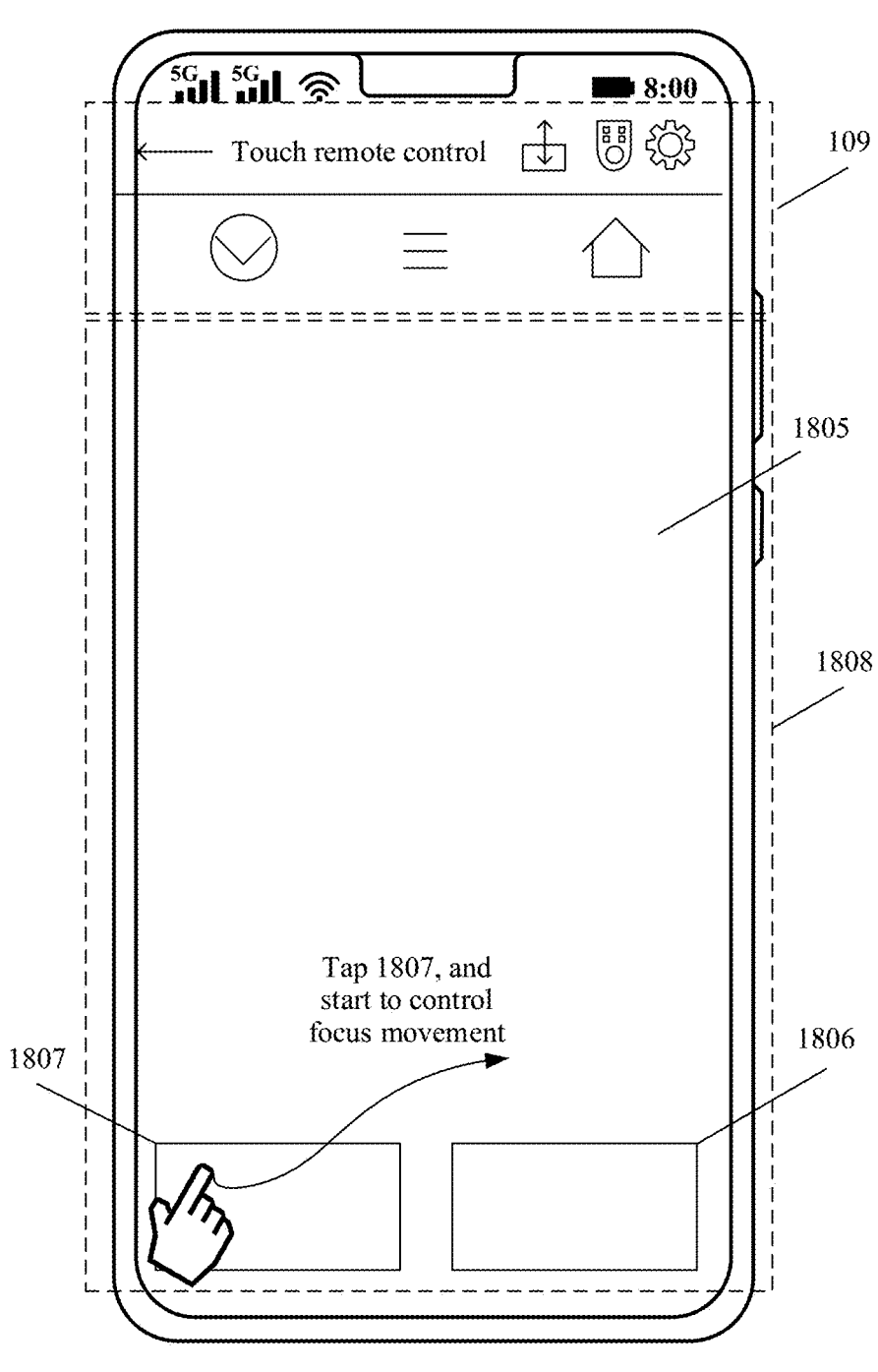

For another example, as shown in FIG. 16B(a), a touch remote control interface 1805 includes a focus movement control area 1807 and a gesture control area 1806. The focus movement control area 1807 is used to trigger the touch remote control interface to enter the focus movement mode, and the gesture control area 1806 is used to trigger the touch remote control to enter the gesture mode. It is assumed that the touch remote control is in the tap mode by default. When the user taps the focus movement control area 1807 on the remote control interface 1805, the touch remote control is triggered to switch to the focus movement mode. The user can slide on the mobile phone screen. For example, along a track shown in FIG. 16B(a), the finger of the user may pass through the gesture control area 1806 from left to right, pass through an area 1808 from bottom to top, and then pass through a function area 109. Then, the finger of the user may further arrive at the area 1808 from top to bottom. During this period, the finger of the user may slide continuously, and as long as the finger of the user is not lifted away from the screen, the touch remote control is kept in the focus movement mode. When the finger of the user is lifted away from the screen, the focus movement mode ends. Then, when the user wants to control focus movement of the cursor on the television, as shown in FIG. 16B(b), the user needs to tap the focus movement control area 1807 again, to trigger the focus movement mode. In this example, the focus movement control area 1807 and the gesture control area 1806 correspond to two switch controls.

(2) This switching mode for remote control modes may be referred to as a persistent activation mode. After a user performs an operation (for example, tap or single-finger touch operation) on a switch control, the touch remote control is kept in a remote control mode corresponding to the switch control. In the remote control mode, a finger of the user may be lifted away from a screen, and that the finger of the user is lifted away from the screen does not cause ending of the current remote control mode. When the user taps another switch control, the mobile phone ends the current remote control mode, and switches the touch remote control from the current remote control mode to a corresponding remote control mode.

Figure 16C:
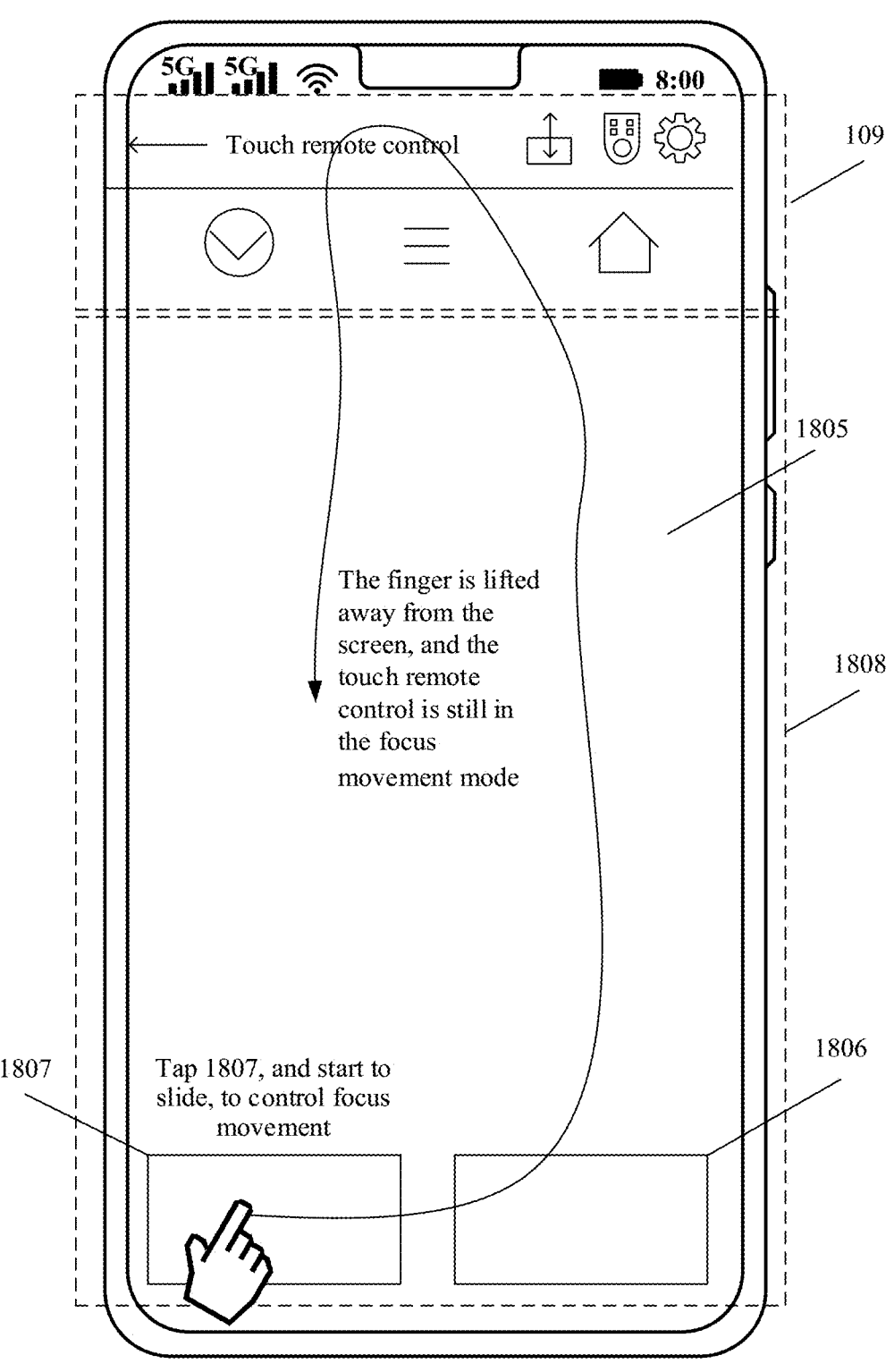
Figure 16C:
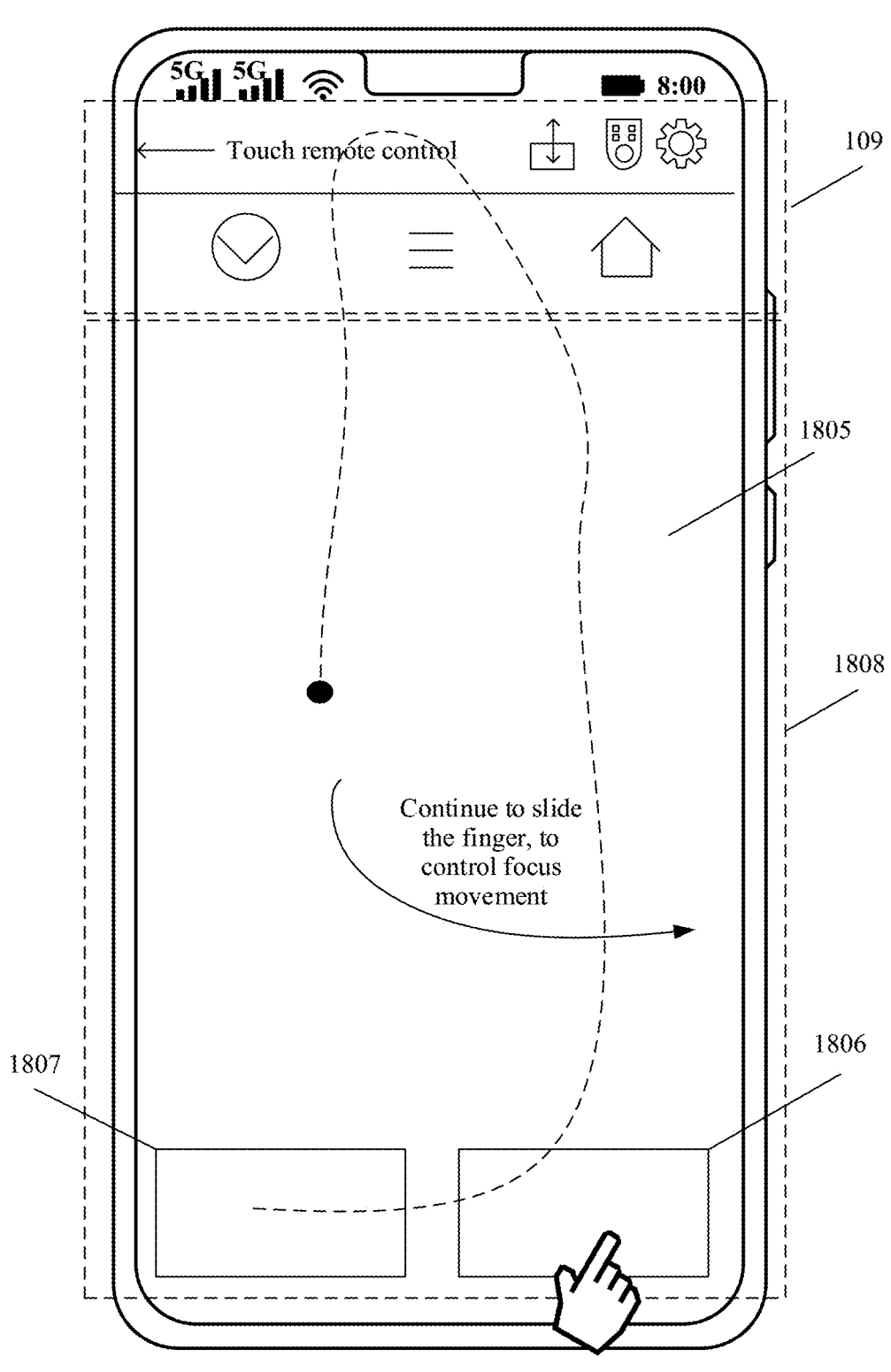

For example, as shown on a remote control interface 1805 in FIG. 16C(a), the remote control interface 1805 includes a focus movement control area 1807 and a gesture control area 1806. Optionally, the touch remote control is in the tap mode by default. In response to that the user inputs a slide operation on the remote control interface 1805 shown in FIG. 16C(a), and a touch start point of the slide operation is located in the focus movement control area 1807, the mobile phone triggers the touch remote control to switch to the focus movement mode, and the touch remote control is kept in the focus movement mode. The user may continue to slide the finger on the mobile phone screen (for example, any position of a function area 109 and an area 1808 (that is, the full screen)), to control movement of a cursor on a television. For example, along a track shown in FIG. 16C(a), the finger of the user may pass through the gesture control area 1806 from left to right, pass through the area 1808 from bottom to top, and then pass through the function area 109. Then, the finger of the user may further arrive at the area 1808 from top to bottom.

In this implementation, the finger of the user may be lifted away from the screen, and the touch remote control is still kept in the focus movement mode. The user does not need to tap the focus movement control area 1807 again to trigger the focus movement mode. As shown in FIG. 16C(b), after the user lifts the finger away from the mobile phone screen, the finger may continue to slide on the mobile phone screen, and the touch remote control is still in the focus movement mode. When the user taps the gesture control area 1806, the mobile phone switches the touch remote control from the current remote control mode to the gesture mode. In the gesture mode, the finger of the user may slide on the mobile phone screen for a plurality of times, to perform continuous gesture control on the television. During this period, even if the finger is lifted away from the mobile phone screen for the plurality of times, the touch remote control is still in the gesture mode.

In a possible implementation, the focus movement mode may be compatible with the tap mode. In other words, when the touch remote control is in the focus movement mode, the mobile phone may respond to a focus movement operation (for example, a slide operation) of the user, and control the television to perform focus movement based on the focus movement operation of the user. The mobile phone may further respond to a tap operation of the user, and control the television to perform an operation (for example, selecting an icon for an application) corresponding to a tap event. Similarly, the gesture mode may be compatible with the tap mode.

It should be noted that, in this manner, an operation used to trigger the focus movement mode or the gesture mode may be a slide operation or another operation (for example, a tap or a touch operation). For example, as shown in FIG.

16A, the user may use a touch point in a range of the focus movement control area 1807 as a start point and input the start point of the slide operation, and the slide operation may trigger the focus movement mode. Alternatively, the user may tap the focus movement control area 1807, to trigger the focus movement mode. Then, the finger is lifted away from the mobile phone screen, and inputs the slide operation in an area like an area other than the focus movement control area 1807.

(c) Switch the remote control modes by using a single physical button.

(1) A user may tap a physical button of a control device like the mobile phone. For example, when the mobile phone is used as a touchpad, the user taps a power button of the mobile phone, to control the touch remote control of the mobile phone to cyclically switch between a plurality of modes. When a hardware device of another form is used as the touchpad, there may be a physical button of another type.

(2) A user may perform different pressing operations on a same physical button, to control the touch remote control to switch the remote control modes. For example, short pressing on a power button triggers the focus movement mode, and pressing and holding on the power button or a plurality of times of quick tapping on the power button triggers/trigger a remote control mode different from the focus movement mode.

(d) Switch the remote control modes by using a plurality of physical buttons.

(1) A user may press different physical buttons, to trigger the touch remote control to temporarily activate corresponding remote control modes. For example, the user taps a volume-up button, to trigger the touch remote control to temporarily switch to the focus movement mode. The user taps a volume-down button, to trigger the touch remote control to temporarily switch to the gesture mode. This switching mode for remote control modes may be referred to as a temporary activation mode. For detailed description of the temporary activation mode, refer to the foregoing embodiments, and details are not described again.

(2) A user may press different physical buttons, to trigger the touch remote control to activate a corresponding remote control mode, and when a button corresponding to another remote control mode is pressed, the mobile phone switches to another remote control mode. For example, the user taps a volume-up button, to trigger the touch remote control to switch to the focus movement mode and keep the touch remote control in the focus movement mode, and when the user taps a volume-down button, the touch remote control is triggered to switch to and is kept in the gesture mode. This switching mode for remote control modes may be referred to as a persistent activation mode. For detailed description of the persistent activation mode, refer to the foregoing embodiments, and details are not described again.

Figure 24A:
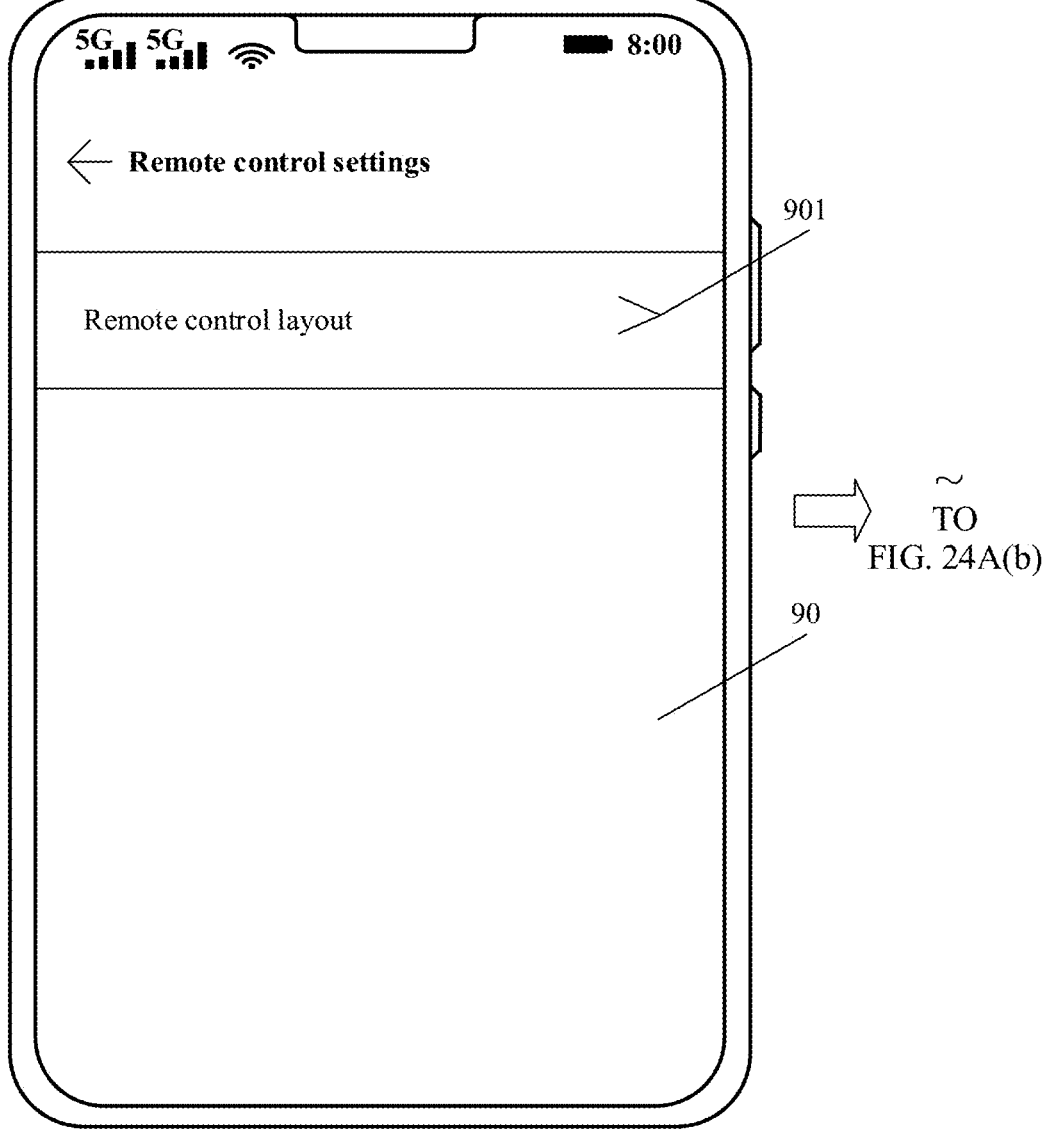
FIG. 24A(a) to FIG. 24A(c) and FIG. 24B are diagrams of interfaces according to an embodiment of this application.
Figure 24A:
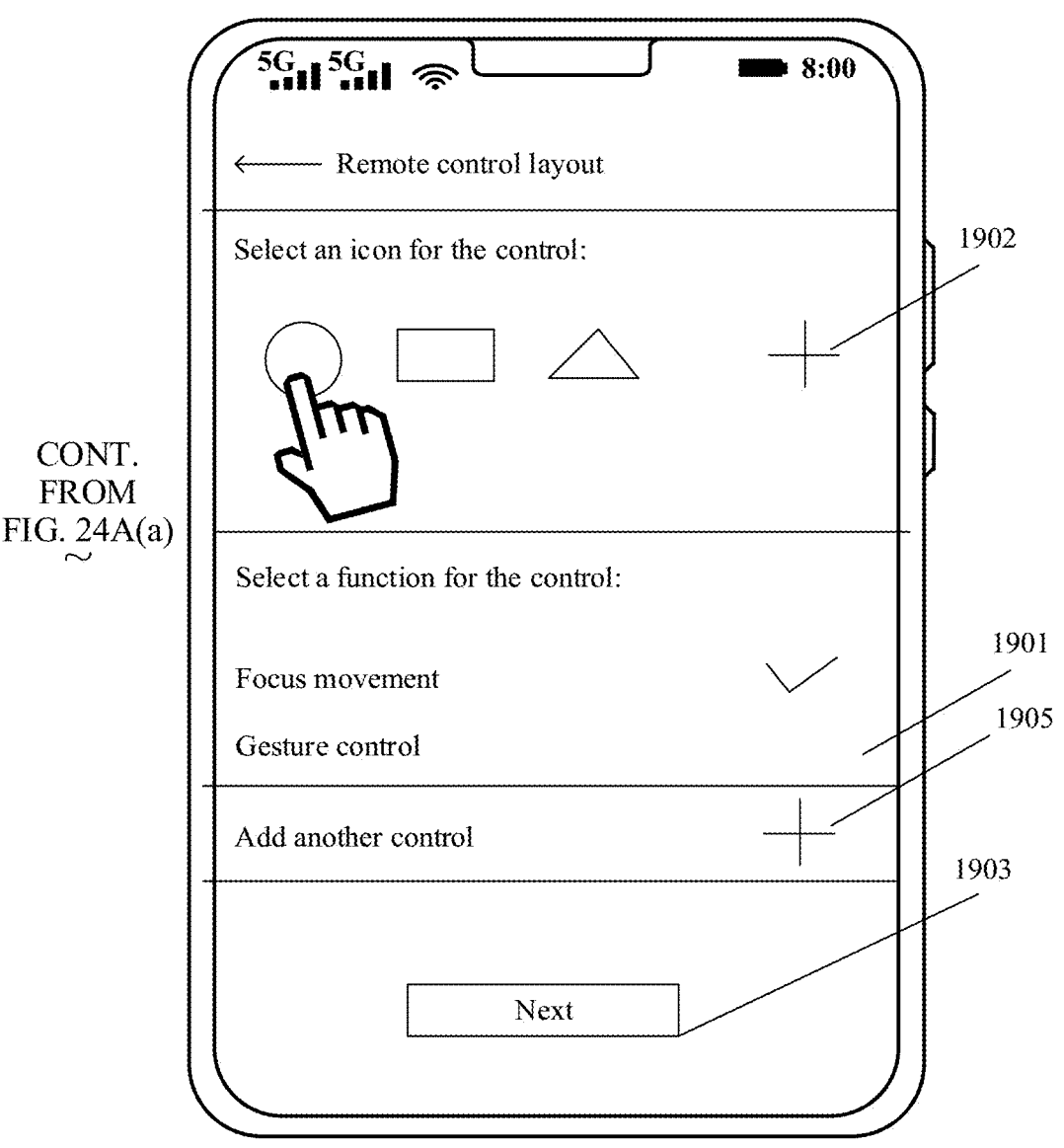
Figure 24A:
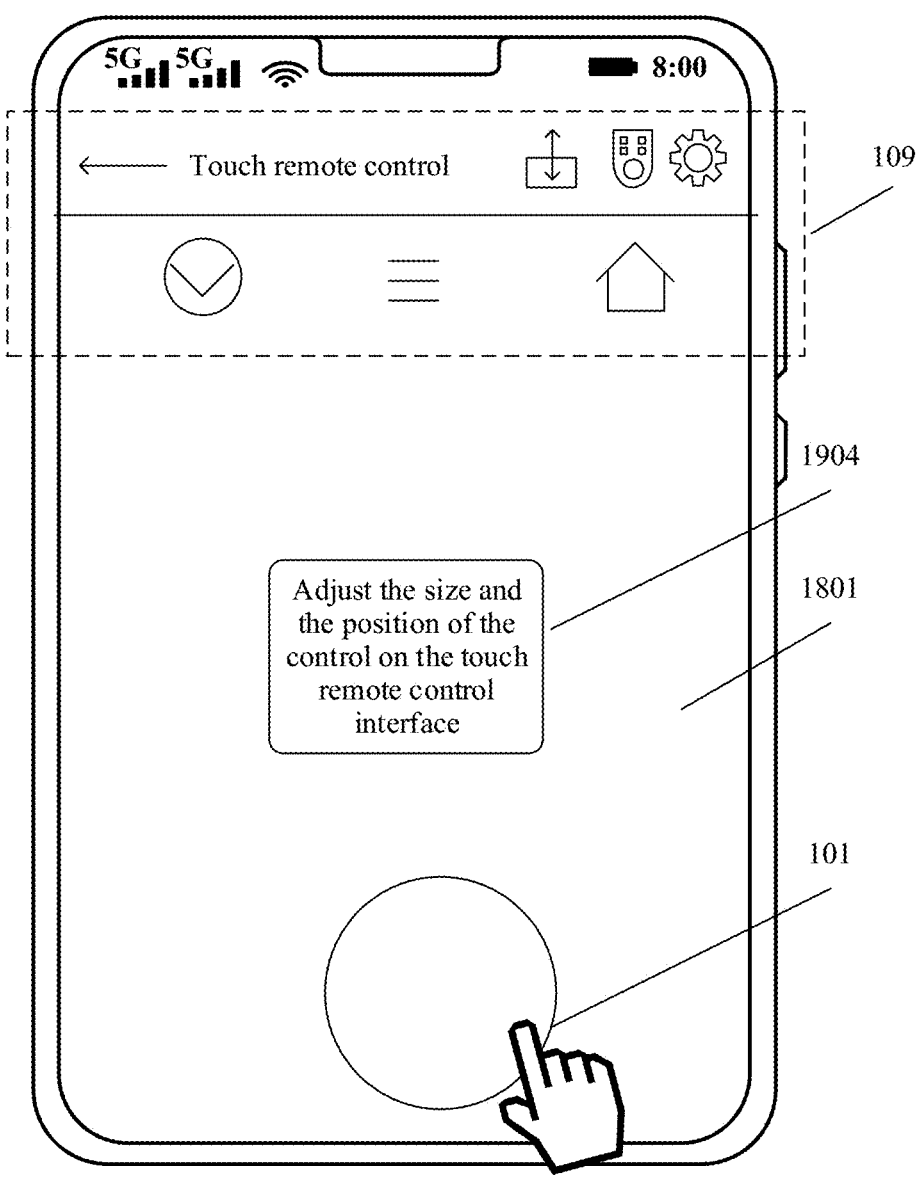

Optionally, in a scenario in which switching of the remote control modes is triggered by using a physical button, the foregoing mentioned gesture control area may not have an icon corresponding to a control. For example, as shown in FIG. 24A(c), a remote control interface 1801 includes an icon (circle) of a focus movement control area 101. In an example, an area, on the interface 1801, other than the focus movement control area 101 and a function area 109 (as shown in a dashed-line box in FIG. 24A(c)) may be considered as a gesture control area.

Alternatively, optionally, in some scenarios, for example, in a case in which switching of the remote control modes is triggered by using a specific gesture, a physical button, or the like, a focus movement control area may also have no icon corresponding to a control.

(e) Switch the remote control modes by using a button combination: A user may switch the modes by using a combination of a plurality of mode buttons (for example, a virtual button on an interface) or physical buttons of a control device like the mobile phone. For example, the user may press a power button and a volume-up button, to trigger the touch remote control to switch to the focus movement mode, and the user may press the power button and a volume-down button, to trigger the touch remote control to switch to the gesture mode.

(f) Switch the remote control modes by using one or more touch gestures: For example, a gesture that a user makes an "8" on a touch remote control interface of the mobile phone with a single finger implements cyclic switching between a plurality of remote control modes of the touch remote control. Alternatively, a plurality of specific gestures may be set, where the plurality of gestures are in a one-to-one correspondence with the plurality of remote control modes of the touch remote control. In this way, a gesture can be used to control the touch remote control to switch to a corresponding remote control mode.

(g) Identify a gesture by using a camera and control switching of the remote control modes: A gesture of a user is intelligently identified by using the camera of a control device or a controlled device, to trigger switching of the remote control modes. For example, the user poses the gesture toward the camera, to trigger cyclic switching of the touch remote control between a plurality of modes. For another example, different gestures may be in a one-to-one correspondence with the plurality of remote control modes of the touch remote control, and the user may control quick switching of the remote control modes by using a corresponding gesture.

(h) Control switching of the remote control modes by using a motion posture that can be sensed by a control device: A user holds the control device (for example, the mobile phone), and triggers the touch remote control to switch the remote control modes by shaking or swinging, making a specific symbol, or the like.

For example, the user triggers cyclic switching of the touch remote control between a plurality of remote control modes by using a "shake" gesture. For another example, different gestures may be in a one-to-one correspondence with the plurality of remote control modes of the touch remote control, and the user may control quick switching of the remote control modes by using a corresponding motion posture.

(i) Control switching of the remote control modes through voice: A control device or a controlled device is used to control the touch remote control to switch the remote control modes through voice.

The foregoing is merely several examples of how to switch the remote control modes. The remote control modes may be switched otherwise. This is not limited in embodiments of this application.

Figure 19:
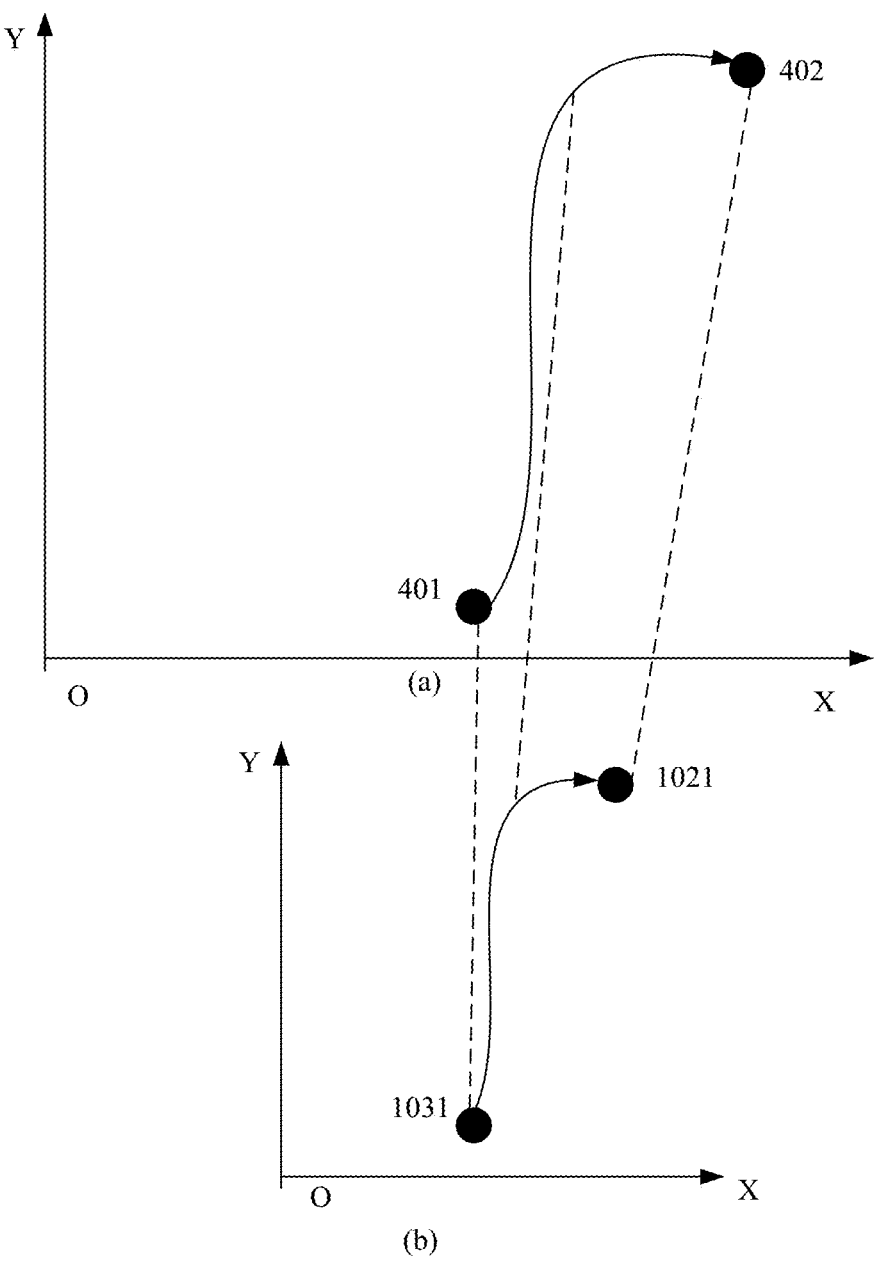
FIG. 19 is a diagram of coordinate mapping between a mobile phone screen and a television screen according to an embodiment of this application.

In a possible implementation, an association relationship may be established between a point on the mobile phone screen and a point on a television screen. In this way, after receiving information about the slide track from the mobile phone, the television may determine, based on the information about the slide track and the association relationship, a position corresponding to the slide track on the television screen. For example, (a) in FIG. 19 shows a coordinate system of the television screen, and (b) in FIG. 19 shows a coordinate system of the mobile phone screen (for example, in a portrait state). A point 1021 on the mobile phone screen corresponds to a point 402 on the television screen, and a point 1031 on the mobile phone screen corresponds to a point 401 on the television screen. In this way, after receiving the information about the slide track from the mobile phone, the television may move, based on the information about the slide track and an association relationship between coordinates on the mobile phone screen and coordinates on the television screen, the cursor from the position 401 shown in FIG. 18(*a*) to the position 402 shown in FIG. 18(*b*).

It should be understood that FIG. 19 shows only an association relationship between coordinates on the mobile phone screen in a state (for example, portrait mode) and coordinates on the television screen, and an association relationship between coordinates on the mobile phone screen in another state (for example, landscape mode) and coordinates on the television screen may further be determined.

In a manner in which the television is controlled by using a button remote control, the focus on the television can be moved to a target position only after an up button, a right button, and the like are pressed for a plurality of times. This results in high operation complexity of the user. In a technical solution in this embodiment of this application, the user may perform a simple slide operation on the mobile phone, to trigger the mobile phone to move the focus on the television. This reduces operation complexity of implementing a focus movement intention, and can improve interaction efficiency.

Figure 20A:
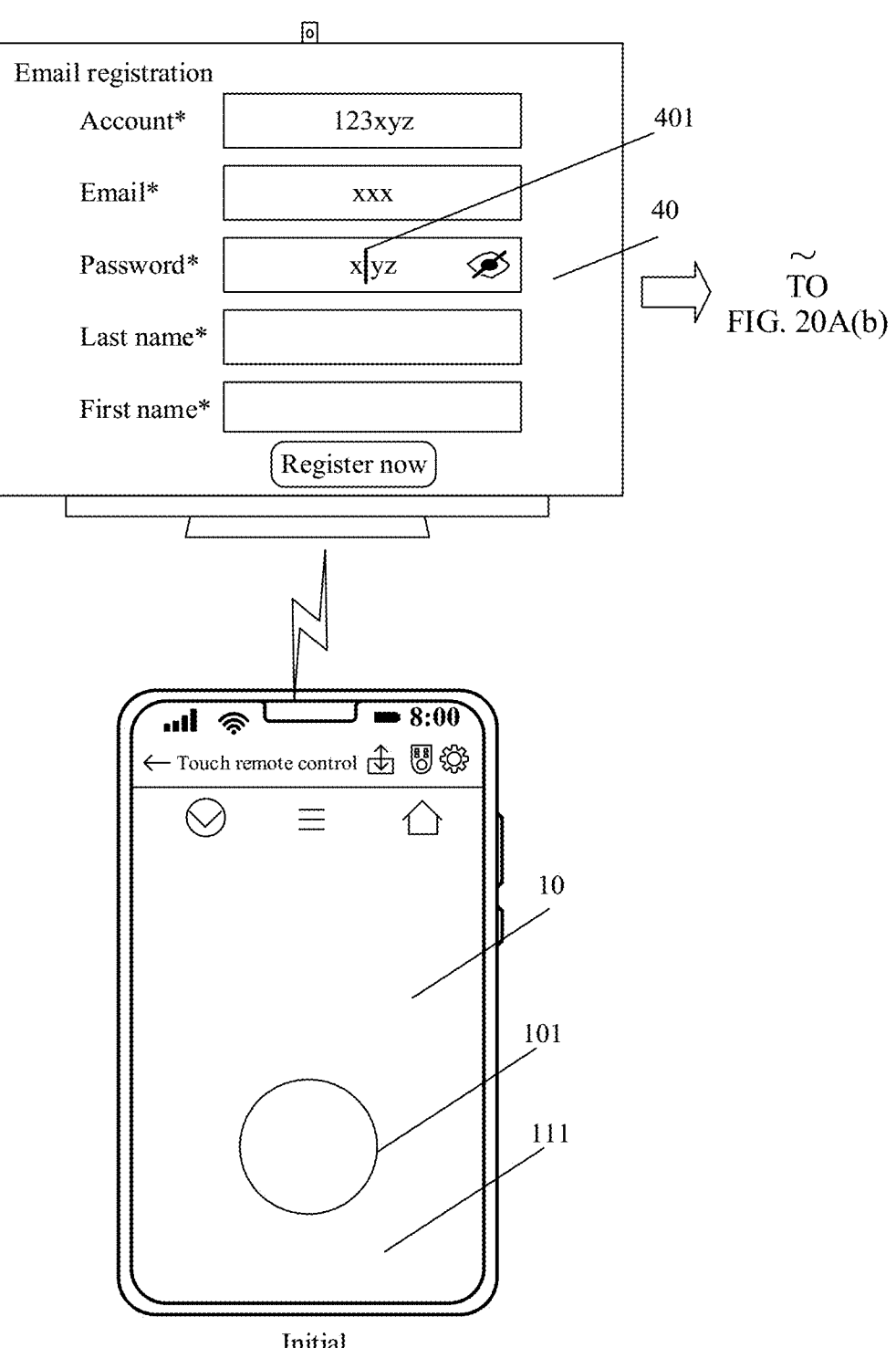
FIG. 20A(a) to FIG. 20A(c) and FIG. 20B(a) and FIG. 20B(b) are diagrams of interfaces according to an embodiment of this application.
Figure 20A:
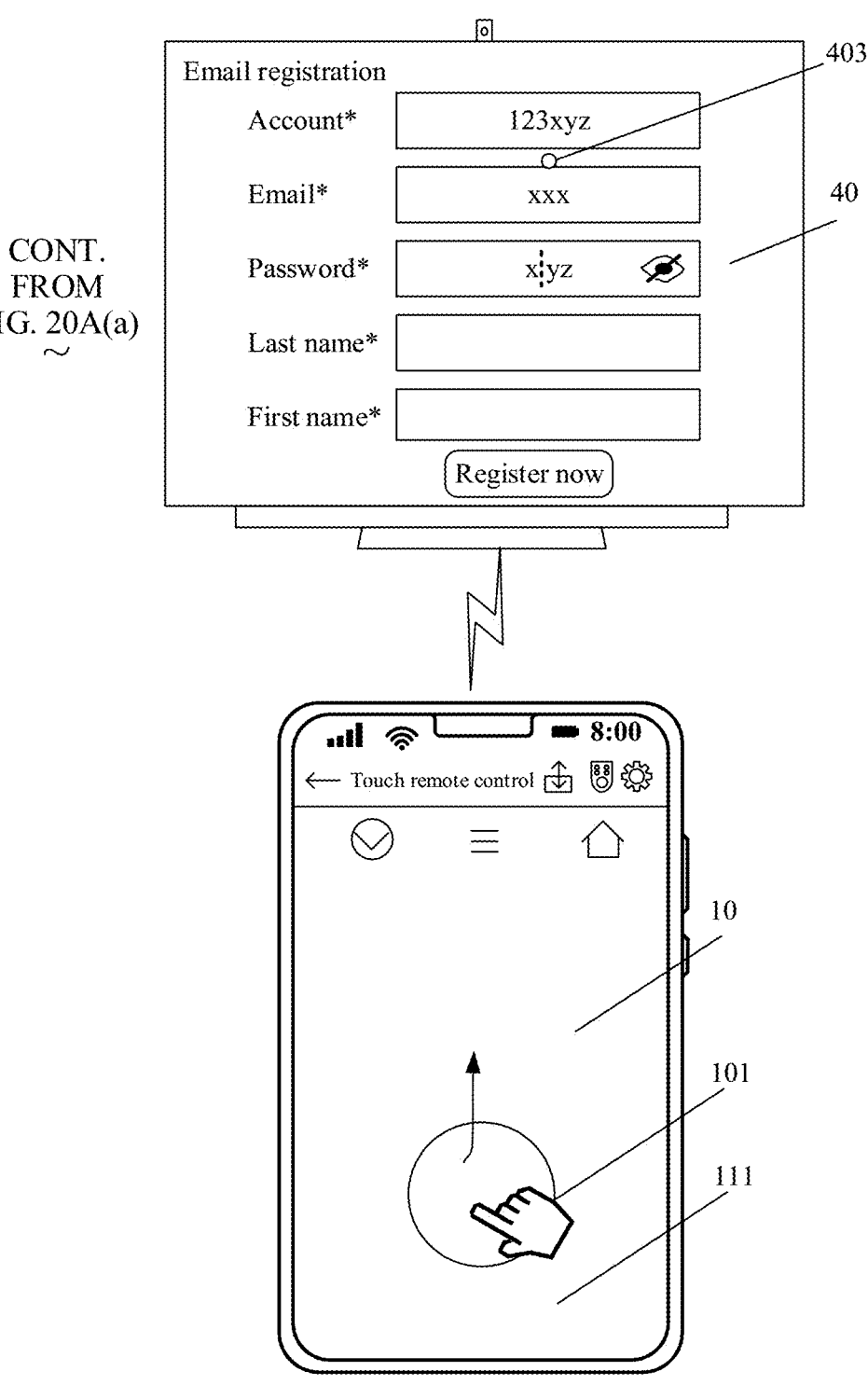
Figure 20A:
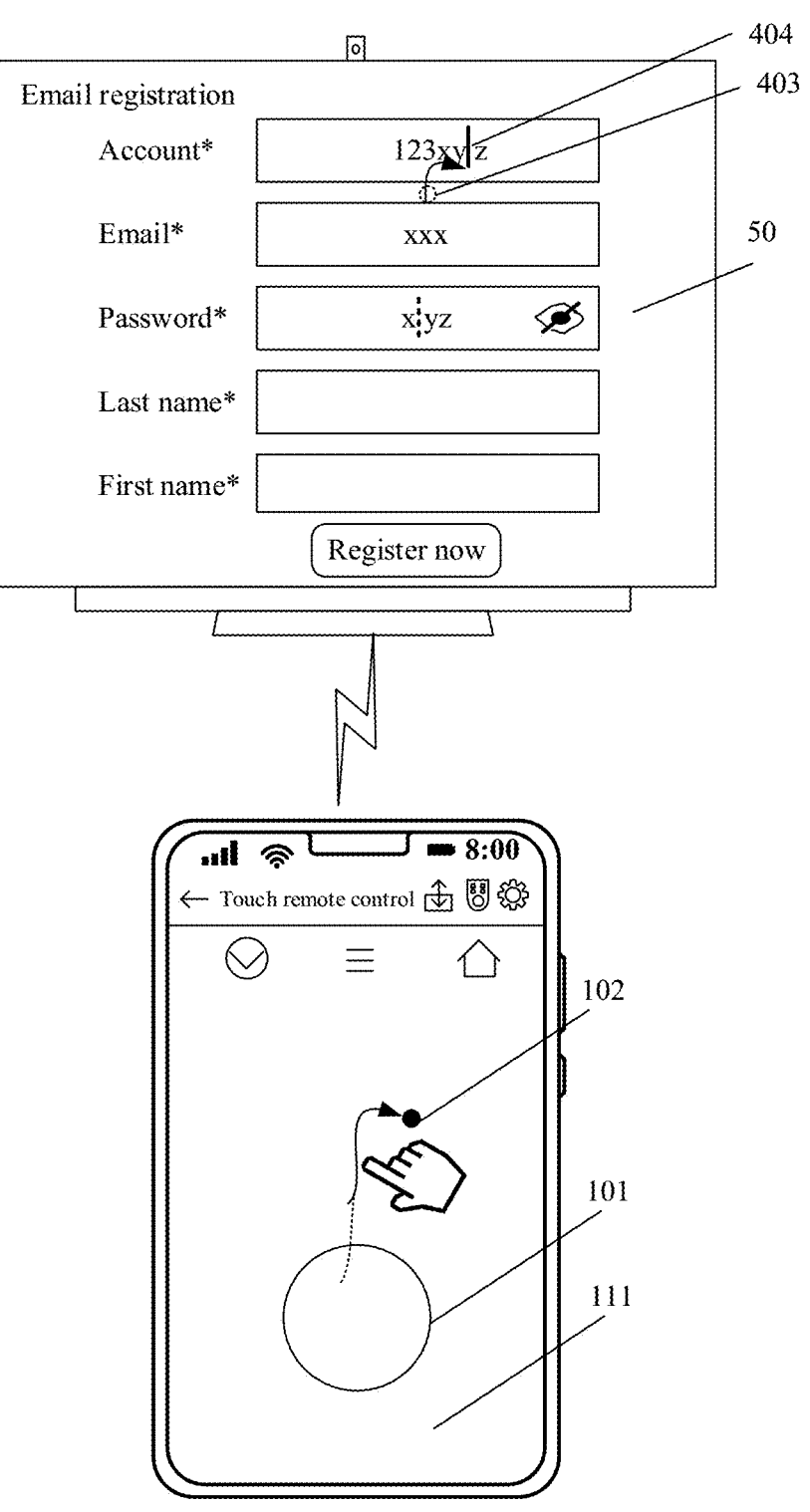

In a possible implementation, the mobile phone may send real-time information about slide track to the television, and the television updates a position of the focus in real time based on the information about the slide track. For example, as shown in FIG. 20A(a), an interface 40 of an email application (a mobile application) is displayed on the television, and a position of the cursor on the television is shown by a mark 401. The touch remote control interface 10 that matches the mobile application is displayed on the mobile phone.

It is assumed that the user wants to move the focus on the television from the position 401 shown in FIG. 20A(a) to a position after a letter y in an input box after "Account*". As shown in FIG. 20A(b), the finger of the user touches the focus movement control area 101 on the mobile phone interface 10, to trigger the interface 10 to enter the focus movement mode. In the focus movement mode, the user may slide the finger along a track shown in the figure on the mobile phone interface 10, and the mobile phone may send information about the slide track to the television. The television displays a real-time position of the cursor based on the information about the slide track of the user. For example, in FIG. 20A(b), the television displays a real-time position 403 of the cursor on the interface 40.

The user may view the real-time position of the cursor on the television, to know whether the cursor on the television is moved to the target position. As shown on the television interface 40 in FIG. 20A(b), if the cursor (located at the position 403) on the television does not move to the target position (a position after a letter y in an input box after "Account*"), as shown in FIG. 20A(c), the user may continue to slide on the mobile phone interface 10 and observe a position change of the focus on the television. When the cursor on the television is moved to a target position 404, this focus movement operation ends.

Optionally, at different positions of the interface 40, styles of the cursor on the user interface (UI) may be different. For example, as shown in FIG. 20A(a), the cursor at the position 401 is presented in a vertical line form, and as shown in FIG. 20A(b), the cursor at the position 403 is presented in a dot form.

Figure 20B:
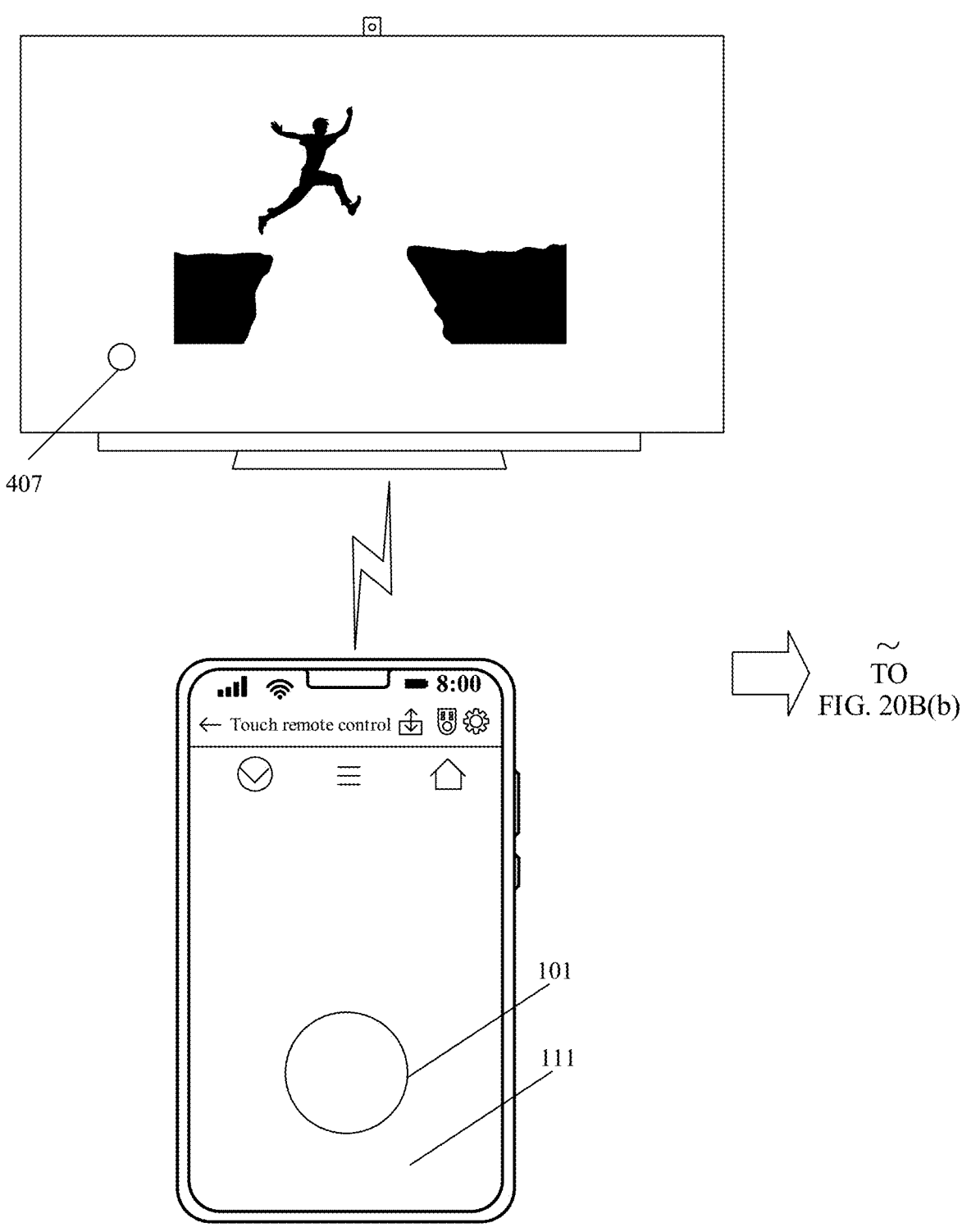
Figure 20B:
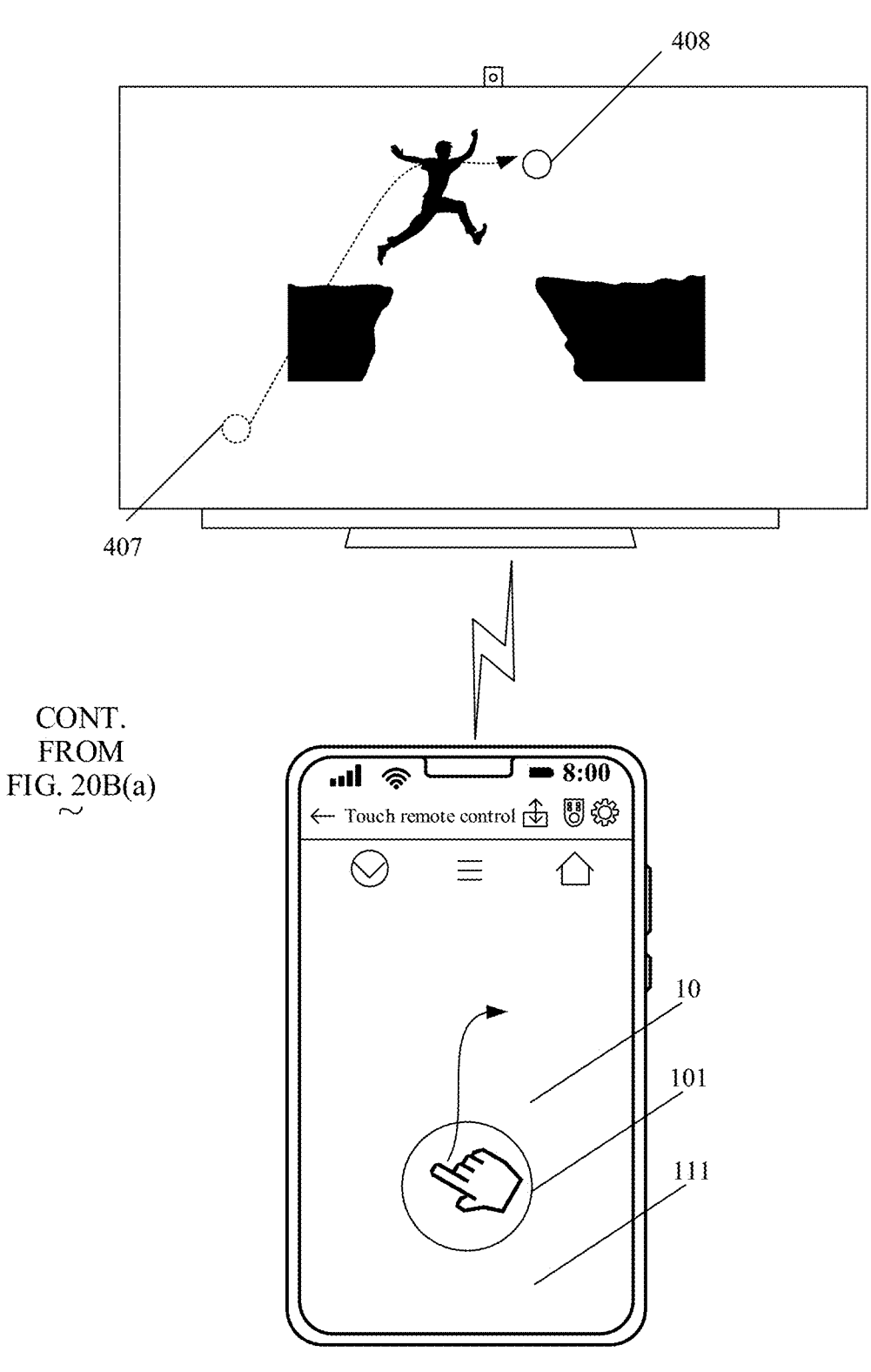

For another example, as shown in FIG. 20B(a), the position of the cursor on the television is shown by a mark 407. As shown in FIG. 20B(b), in the focus movement mode, in response to the slide operation of the finger of the user on the mobile phone interface 10, the focus on the television is moved from the position 407 to a position 408.

According to the technical solution in this embodiment of this application, the user may randomly perform an operation like slide on the mobile phone screen, and the user may watch the television screen with eyes. In other words, in the foregoing solution, a blind operation of hand-eye separation can be implemented. This improves operation convenience.

Figure 21A:
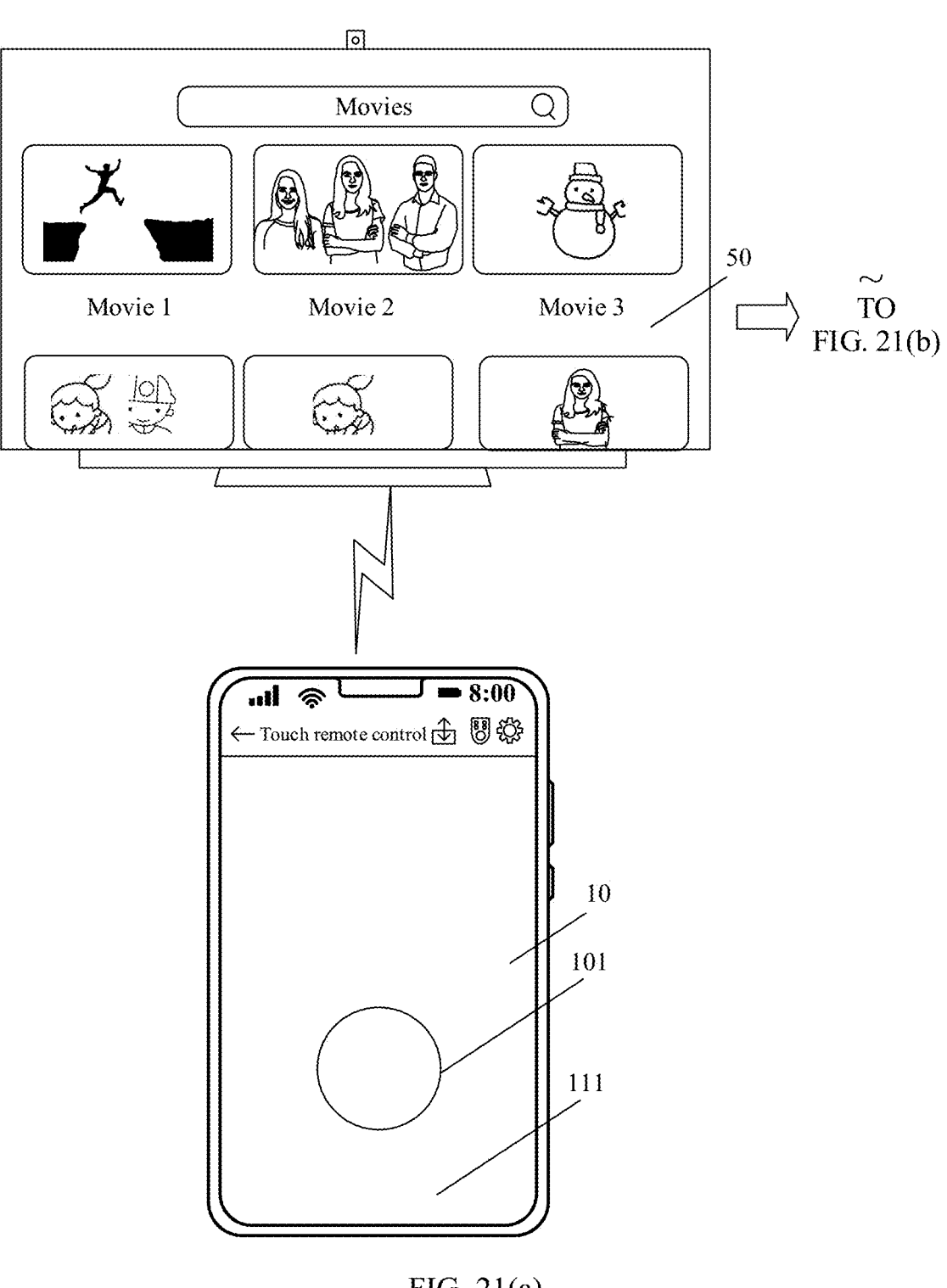
Figures 21A, 21B:
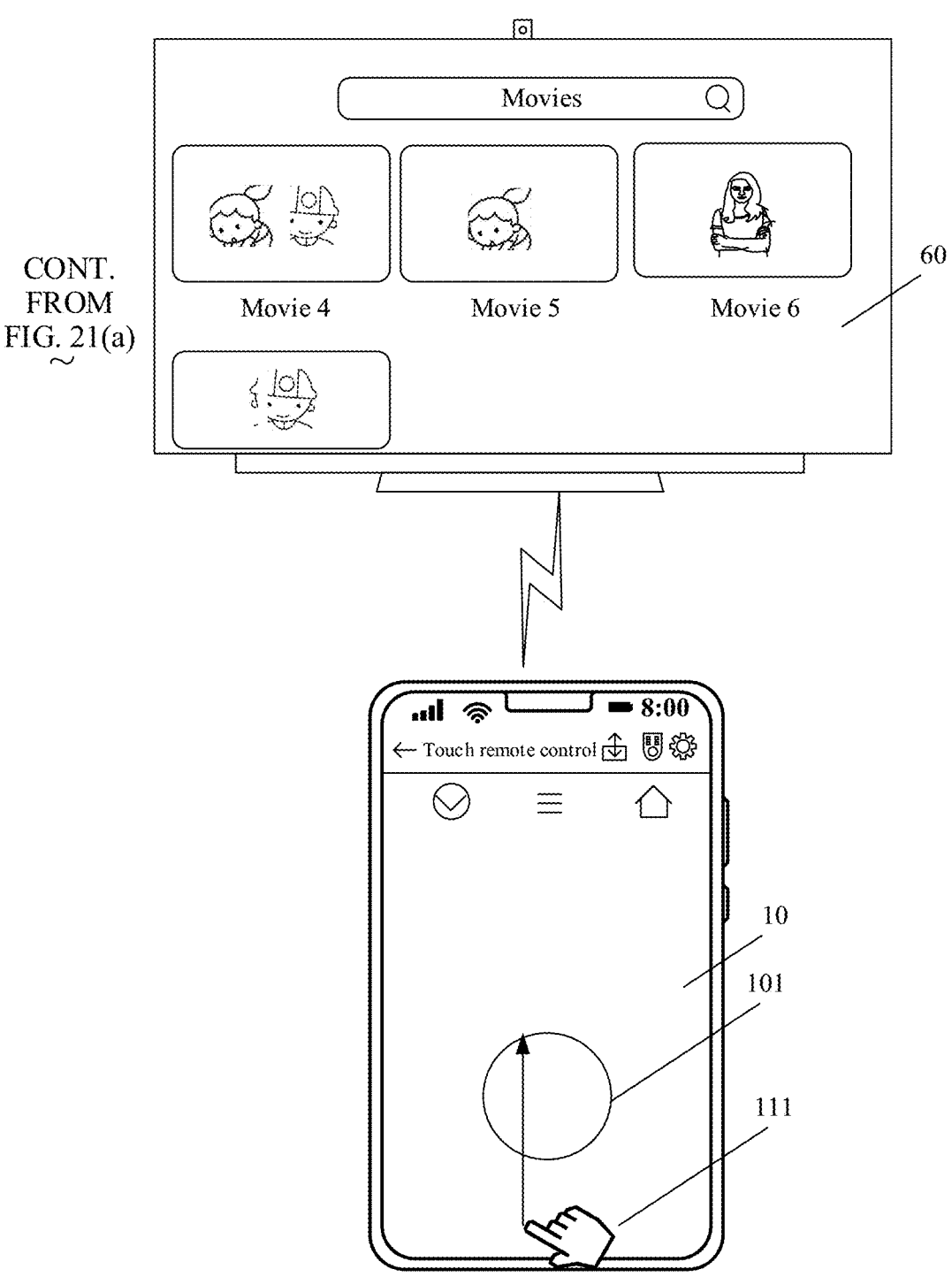

For another example, as shown in FIG. 21(*a*), the television displays an interface 50 of a video application B (it is assumed that the video application is a mobile application), and the mobile phone displays the touch remote control interface 10 that matches the mobile application. As shown in FIG. 21(*b*), an operation of touching the gesture control area 111 by the user is detected, and the mobile phone controls the touch remote control to enter the gesture mode. When the touch remote control is in the gesture mode, as shown in FIG. 21(*b*), the finger of the user may slide up on the mobile phone interface 10, and the mobile phone may send track information of a slide-up operation of the user to the television. The television controls, based on the track information of the slide-up operation, the interface to scroll up, and displays an interface 60 obtained after scrolling up.

Figures 22A, 22B:
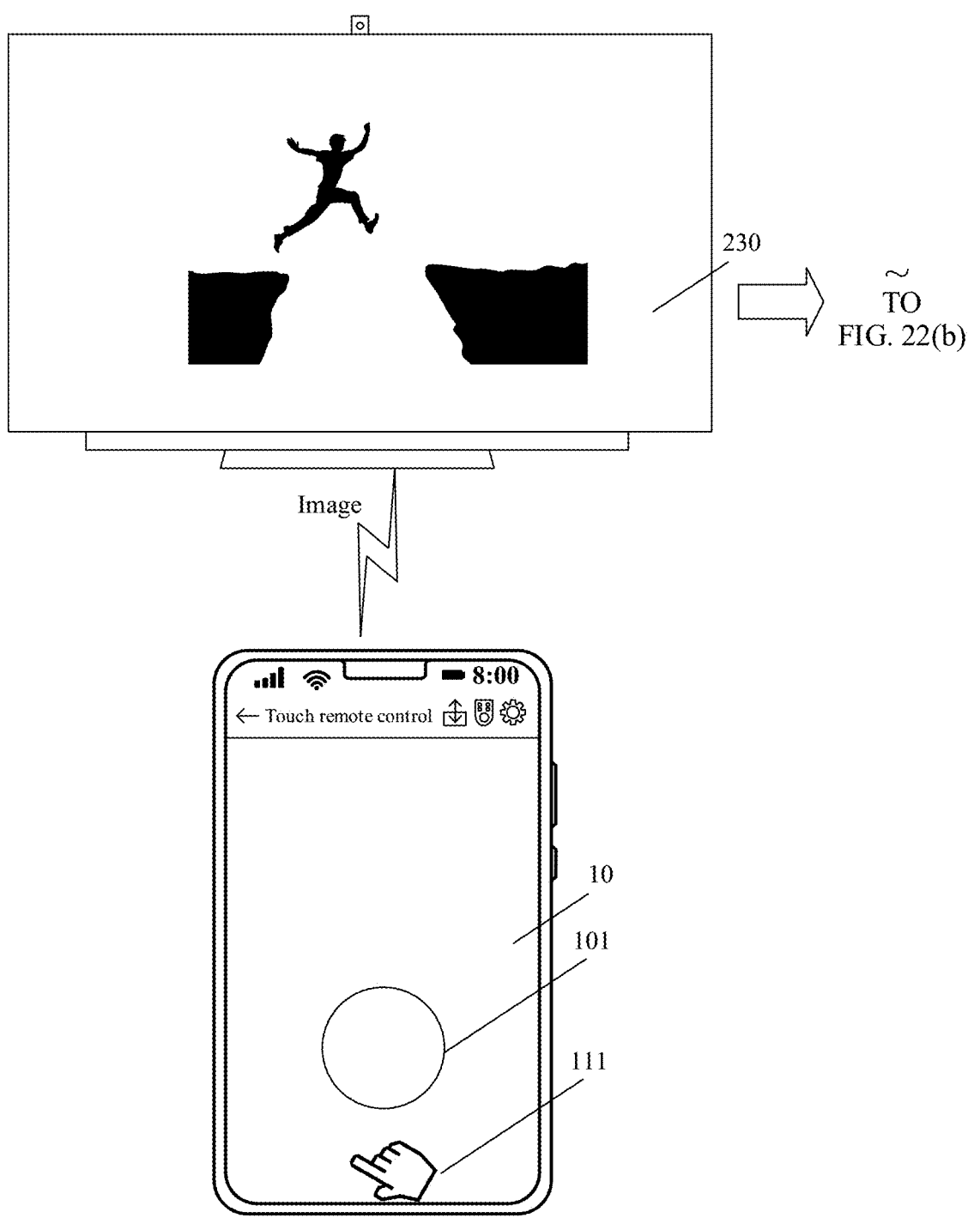
Figures 22A, 22B:
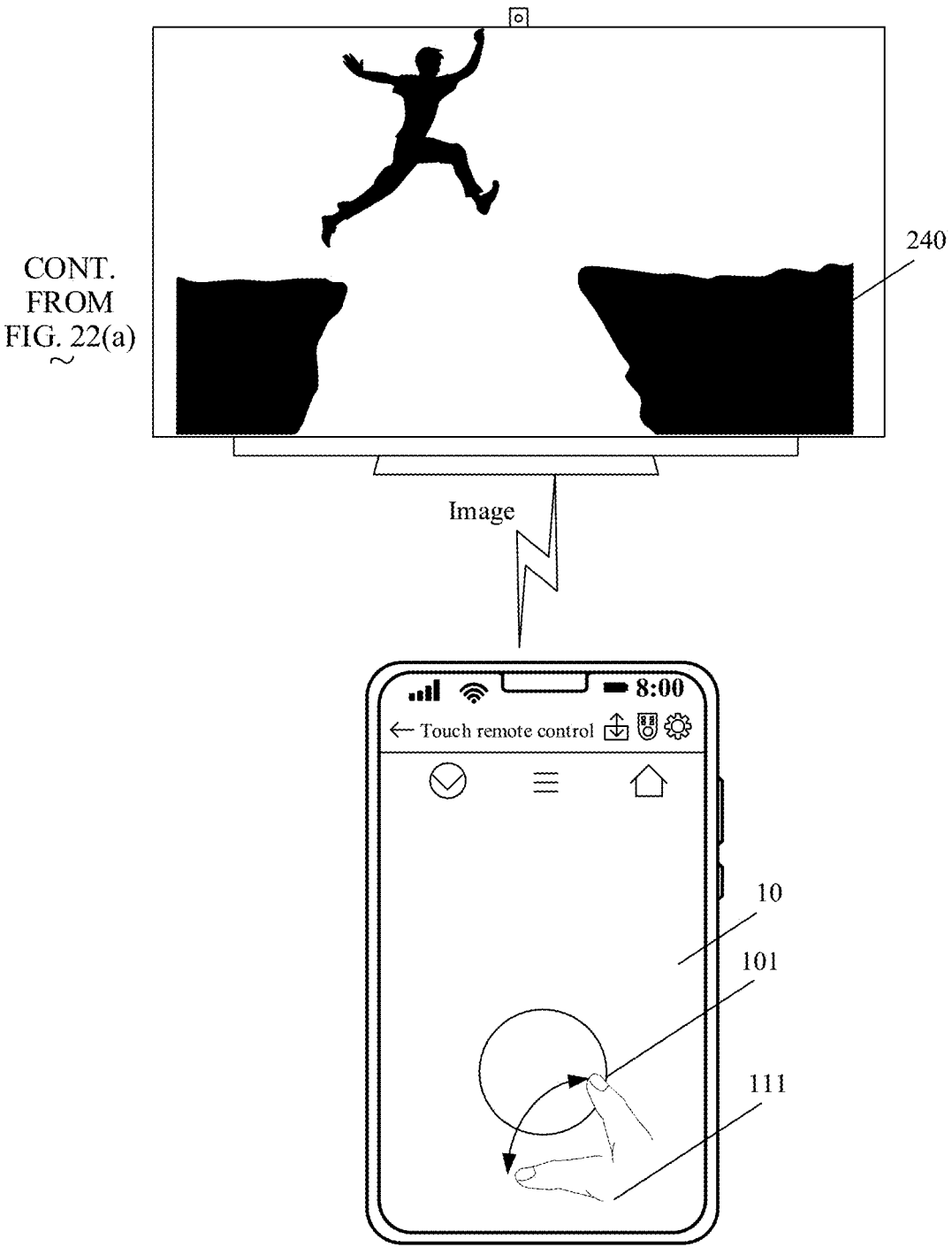

For another example, as shown in FIG. 22(*a*), the television displays an image 230 of a gallery application (it is assumed that the gallery application is a mobile application), and the mobile phone displays the touch remote control interface 10 that matches the mobile application. If it is detected that a touch start point of the slide operation of the user is within a range of the gesture control area 111, the mobile phone may control the touch remote control to enter the gesture mode. When the touch remote control is in the gesture mode, as shown in FIG. 22(*b*), the finger of the user may perform a zooming in or out operation (for example, two fingers pinch and stretch to zoom in an image) on the mobile phone interface 10, and the mobile phone may send information about the zooming in or out operation of the user to the television. The television controls, based on the information about the zooming in or out operation, an image on the television to be zoomed in or out, and displays an image 240 obtain after zooming in or out.

Figure 23A:
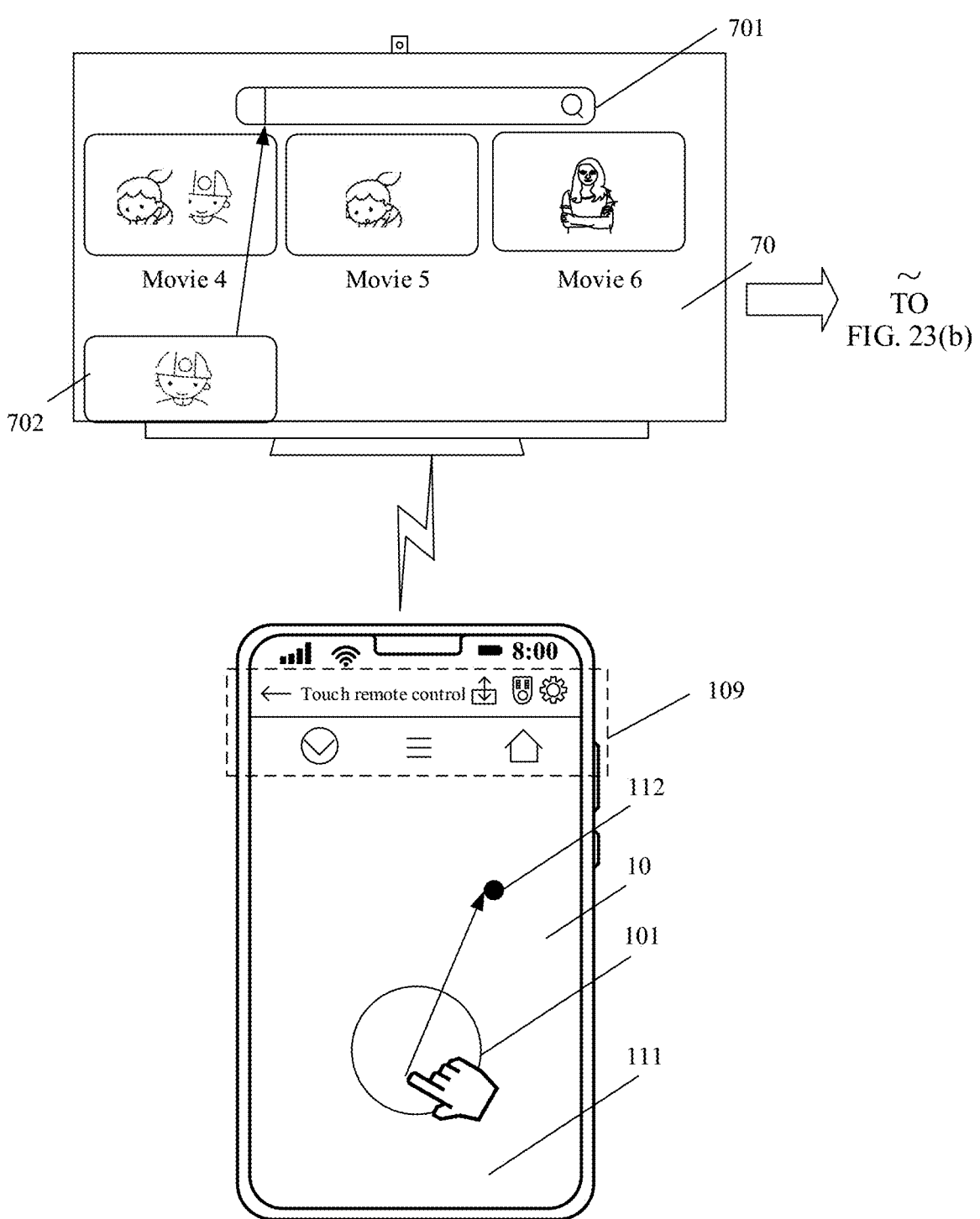
Figures 23A, 23B:
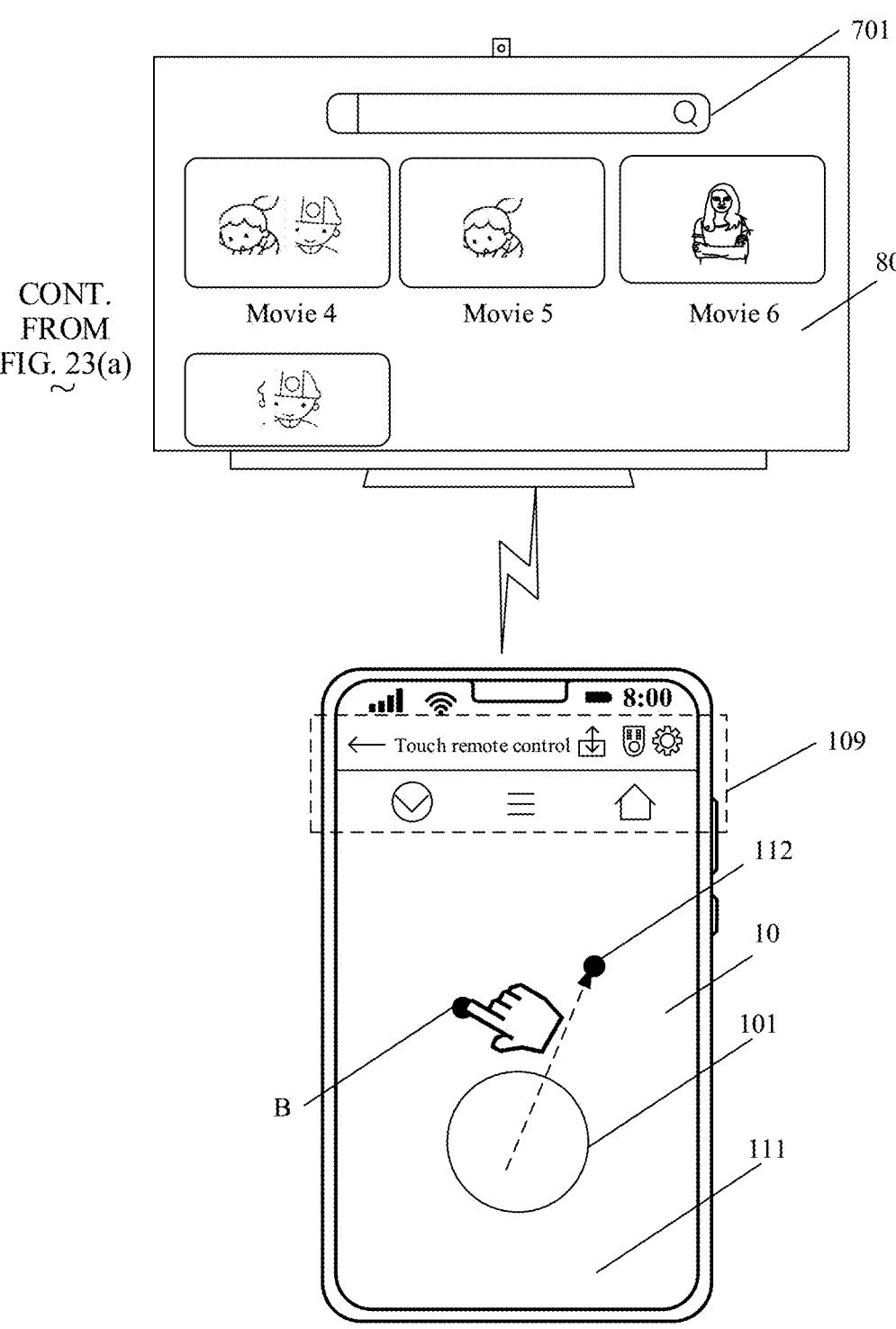
Figure 23C:
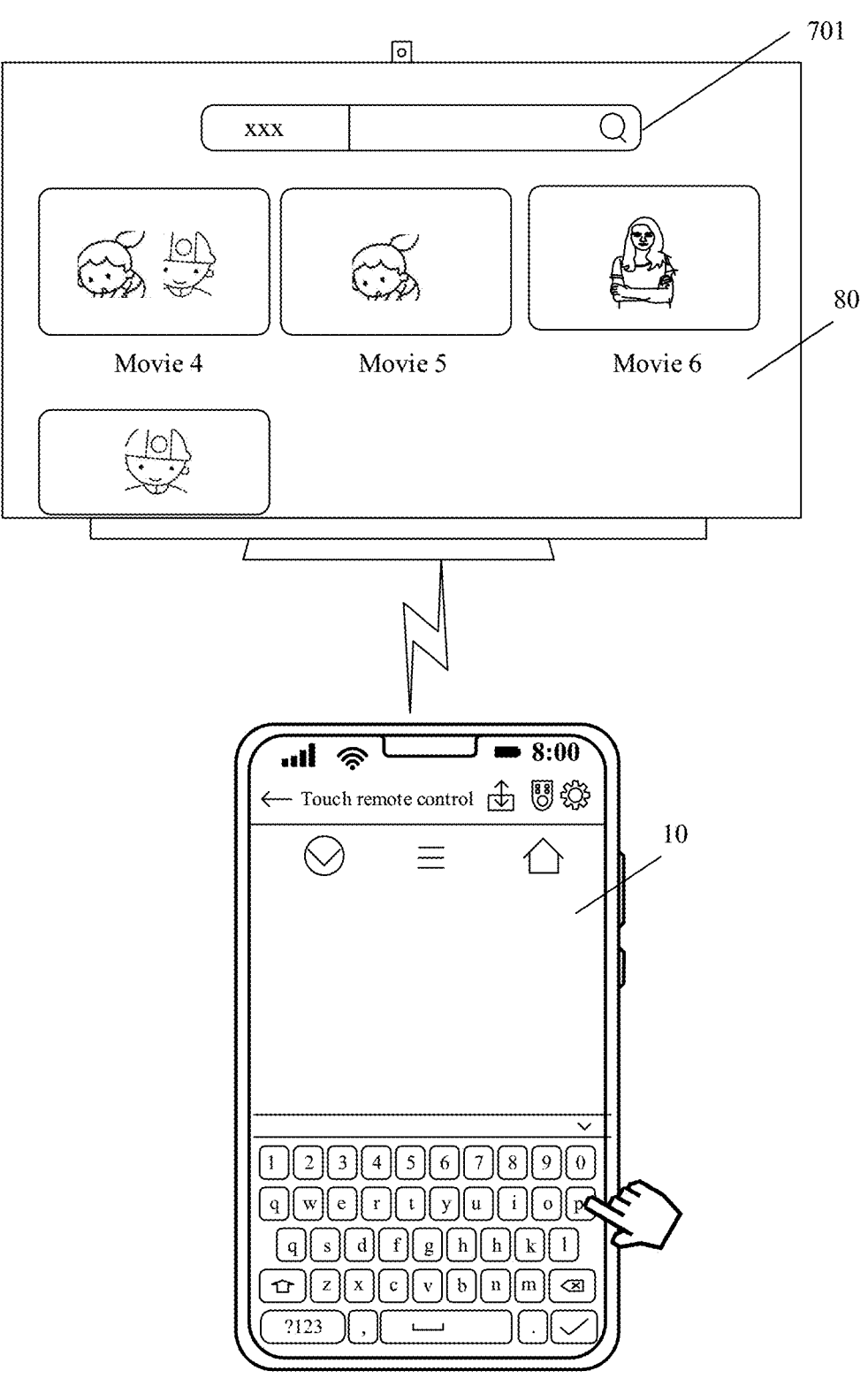

In some embodiments, the user may further input content such as a text to the television by using a virtual keyboard on the mobile phone interface. For example, as shown in FIG. 23(*a*), when the touch remote control is in the focus movement mode, the user slides up on the mobile phone interface 10 (an end position of a slide-up operation is shown by a mark 112), to control the focus on the television interface 70 to move from a movie identifier shown by a mark 702 to an input box 701. In an example, the user may lift the finger, to trigger the touch remote control to switch to the tap mode. As shown in FIG. 23(*b*), in the tap mode, the user taps any position (for example, taps a point B on the mobile phone screen) that is on the interface 10 and that is not in the function area 109. In response to a tap operation of the user, as shown in FIG. 23(*c*), the input box 701 on the interface 10 obtains the focus, the mobile phone may invoke the virtual keyboard, and the user may input the content in the input box 701 on a television interface 80 by using the virtual keyboard. That the mobile phone invokes the virtual keyboard may be that the mobile phone automatically pops up the virtual keyboard, or the mobile phone sends a notification message, and the mobile phone invokes the virtual keyboard in response to an operation of tapping the notification message by the user. A specific implementation of invoking the virtual keyboard by the mobile phone is not limited in embodiments of this application.

Scenario 3

In this scenario, a user may customize a control and/or an interface layout of a touch remote control via an entry provided by a mobile phone. For example, one or more focus movement control areas are customized, or one or more gesture control areas may be customized. This is convenient for the user to perform touch interaction by using a gesture that is most familiar to the user, to implement better inter-action experience of a blind operation of hand-eye separa-tion, for example, a one-hand holding or single-finger opera-tion.

For example, as shown in FIG. 24A(a), the mobile phone displays a setting interface 90, where the interface 90 includes a selection menu 901. After detecting an operation of tapping the selection menu 901 by the user, the mobile phone may jump to an interface 1901 shown in FIG. 24A(b).

The user may select a function (for example, a focus movement function) for a control and an icon for the control on the interface 1901. Optionally, the interface 1901 may further include an add button 1902, and the add button 1902 is used to add another shape. The another shape may be a shape in a mobile phone album, or may be a shape from another source. For example, the add button 1902 is used to upload a control shape made by the user.

After selecting the function and the icon for the control, the user may tap a "Next" button, to trigger the mobile phone to jump to an interface 1801 shown in FIG. 24A(c).

Optionally, as shown in FIG. 24A(c), the interface 1801 includes prompt information 1904, used to prompt the user to adjust a size, a shape, a position, and the like of a focus movement control area 101. The user may perform an operation on the control 101, for example, drag the control 101 to a position on a screen. After the user lifts a finger away from the screen, the control 101 is fastened to a new position.

Figure 24B:
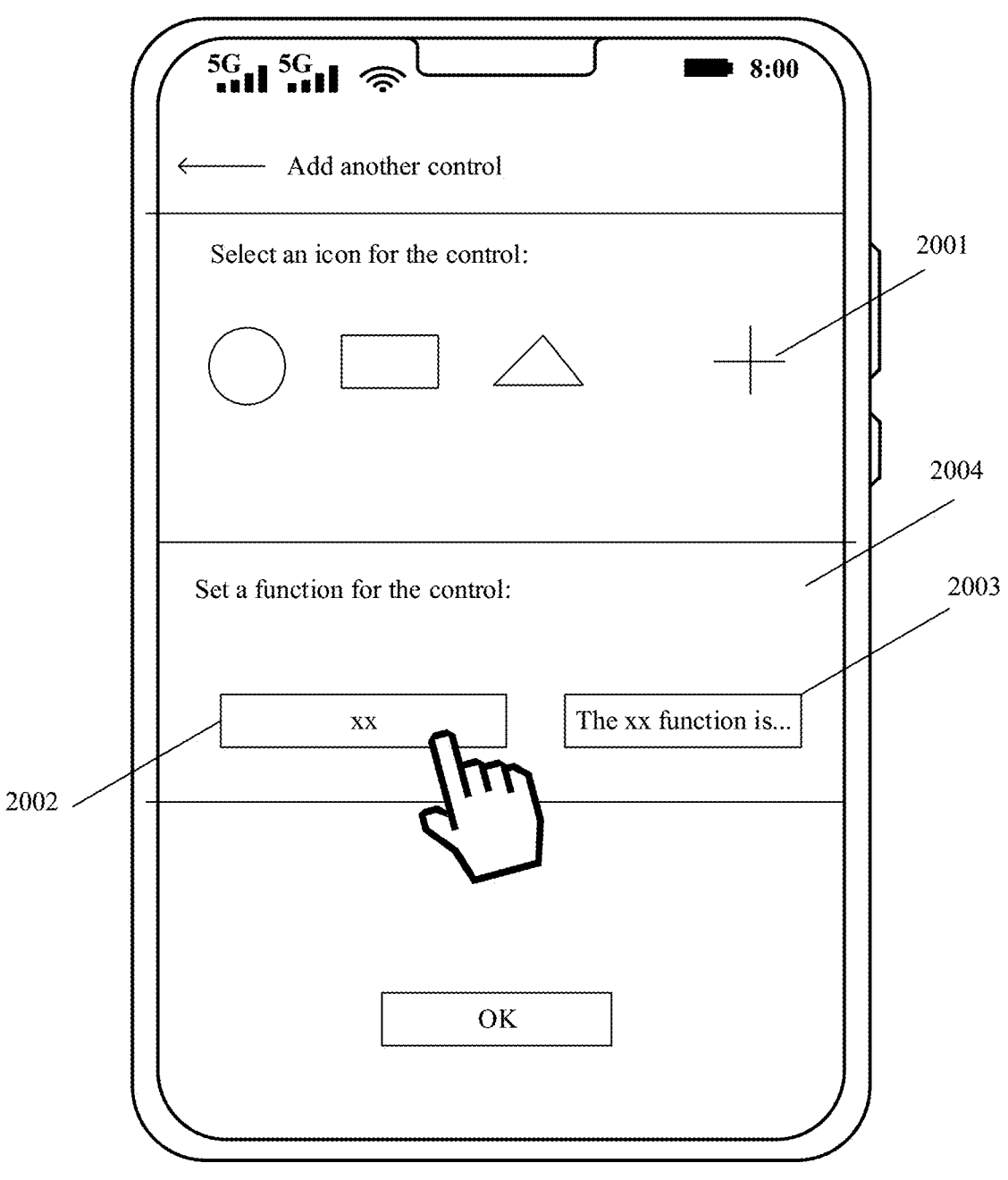

Optionally, the interface 1901 may further include an add button 1905. The user may tap the add button 1905, to newly add a control, and may define a position, a shape, a size, a function, and the like of the control. Optionally, in some examples, the add button 1905 may be used to define a new control and a corresponding new function/mode. For example, in response to an operation of tapping the add button 1905 by the user, the mobile phone may jump to an interface 2004 shown in FIG. 24B. The interface 2004 may include an input box 2002, and the user may input the function of the new control in the input box 2002. Option-ally, the interface 2004 may further include an input box 2003, and the user may input note information of the new function in the input box 2003, for example, input a brief introduction of the new function. The user may further set the shape of the new control on the interface 2004. Optionally, the user may tap a control 2001 on the interface 2004, to upload another shape as the shape of the new control.

Optionally, the mobile phone may analyze a shape that matches each control at each position. For example, when the control is moved to a lower left corner of the screen, a shape matching the control is a ¼ circle. In this case, when the mobile phone detects that the user drags the control to the lower left corner, the control is automatically displayed as a ¼ circle. When the control is moved to an edge of the screen, a shape matching the control is a semicircle. When the control is moved to a position far away from an edge of the screen, a shape matching the control is circle by default.

Optionally, the mobile phone may prompt the user whether to switch the control from the current shape to another shape that the system considers more appropriate. If the user agrees to switch the shapes of the control, the mobile phone switches the control from the current shape to a shape matching a corresponding screen position. Other-wise, if the user does not agree to switch the shapes of the control, the shape of the control set by the user is retained.

Optionally, based on operation habits of the user for different types of controls in different scenarios, the mobile phone may determine a screen operation area that is habitual to the user, and determine a screen layout position matching each control. For example, when using a remote control function, the user is used to holding the mobile phone with a right hand and operating in a lower right area of the mobile phone screen. In this case, when the user subsequently defines the interface layout of the remote control, the mobile phone may recommend the user to set a switch control (for example, the focus movement control area or the gesture control area) in the lower right area of the screen.

Figure 25:
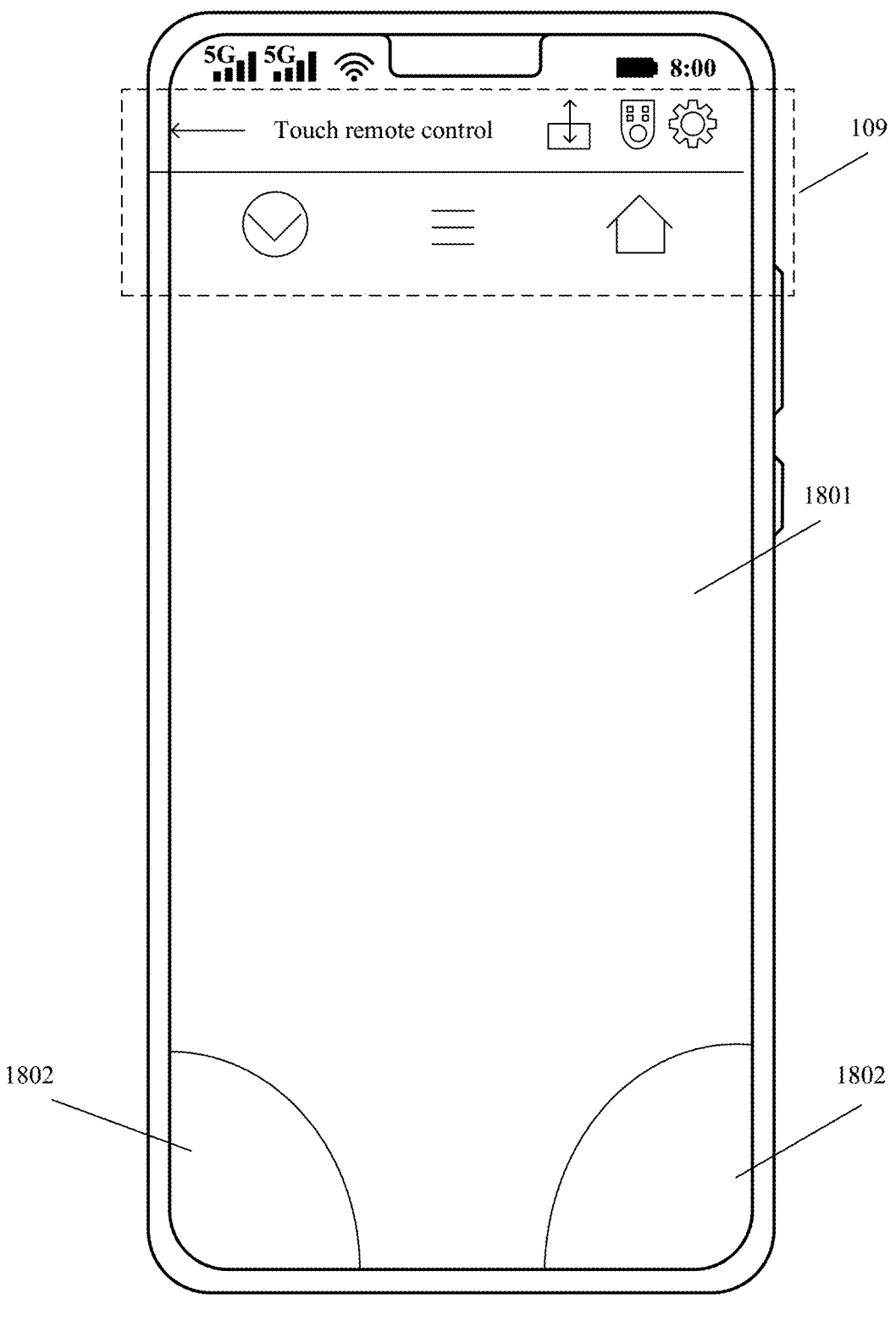
FIG. 25 to FIG. 27 are diagrams of interfaces according to an embodiment of this application.

For another example, FIG. 25 shows an example of a layout of a touch remote control customized by the user. Areas covered by two ¼ circle controls 1802 in the lower left corner and a lower right corner of the mobile phone screen are focus movement control areas, and an area, on the remote control interface 1801, other than a function area 109 and controls 1802 is considered as the gesture control area.

Figure 26:
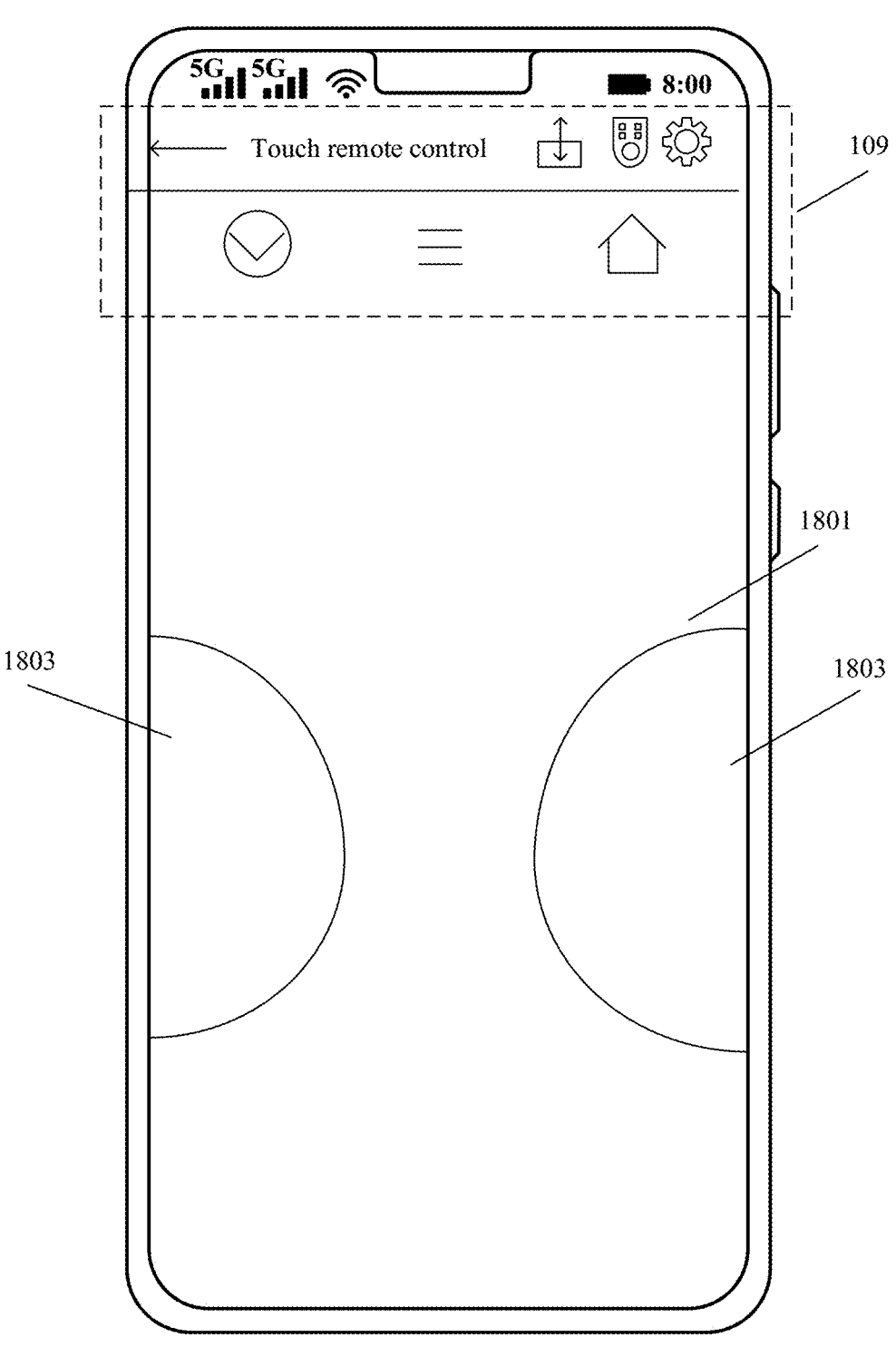

For another example, FIG. 26 shows another example of a layout of a touch remote control customized by the user. Areas covered by a semicircular control 1803 at a center of a left edge of the screen and a semicircular control 1803 at a center of a right edge of the screen are focus movement control areas.

Figure 27:
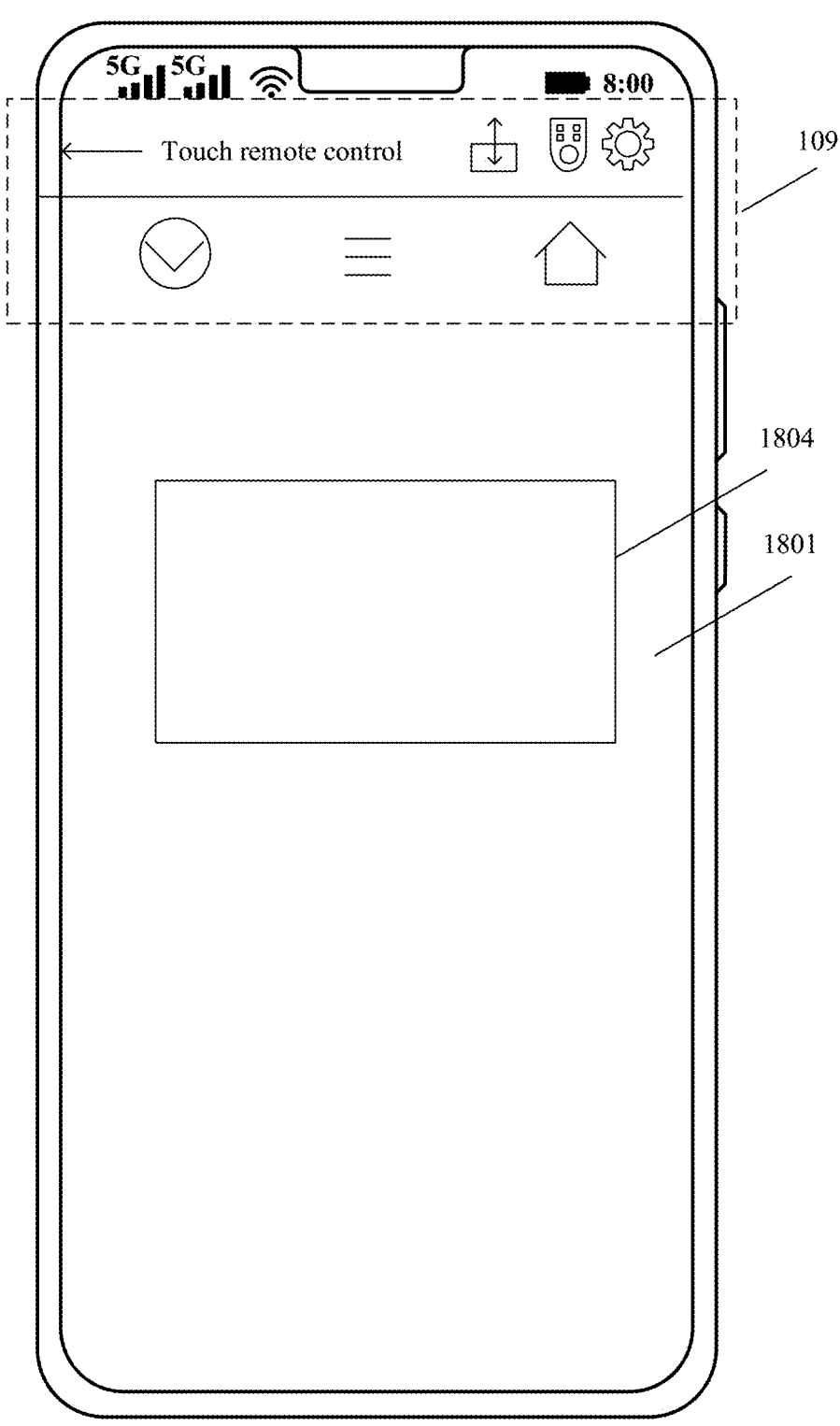

For another example, FIG. 27 shows another example of a layout of a touch remote control customized by the user. An area covered by a quadrilateral control 1804 on the screen is the focus movement control area.

For another example, the layout of the touch remote control customized by the user may alternatively be shown in FIG. 16A or FIG. 17. For description of interface elements in FIG. 16A and FIG. 17, refer to the foregoing description of FIG. 16A and FIG. 17.

The foregoing used the setting interface 90 as an entry for editing the touch remote control. In some other embodi-ments, the mobile phone may further provide another entry for editing the touch remote control. This is not limited in embodiments of this application. For example, an edit control is added to an interface 10 shown in (b) in FIG. 6A. When the user selects (for example, taps) the edit control, a virtual remote control enters an edit mode. In the edit mode, the user may edit and adjust the switch control and/or the layout of the touch remote control. For example, in the edit mode, after touching and holding to select the control 101 shown in (b) in FIG. 6A, the user may adjust a parameter (including but not limited to a size, a shape, a position, and a function (for example, used for focus movement or gesture control)) of the control 101.

Scenario 4

In this scenario, a mobile phone may obtain authorized user information, and display a remote control interface based on the user information. A layout of each switch control on the remote control interface is determined based on the user information.

The user information includes but is not limited to a posture in which a user holds a first electronic device. A holding posture of the user includes: left-hand holding, right-hand holding, and two-hand holding.

Figure 28A:
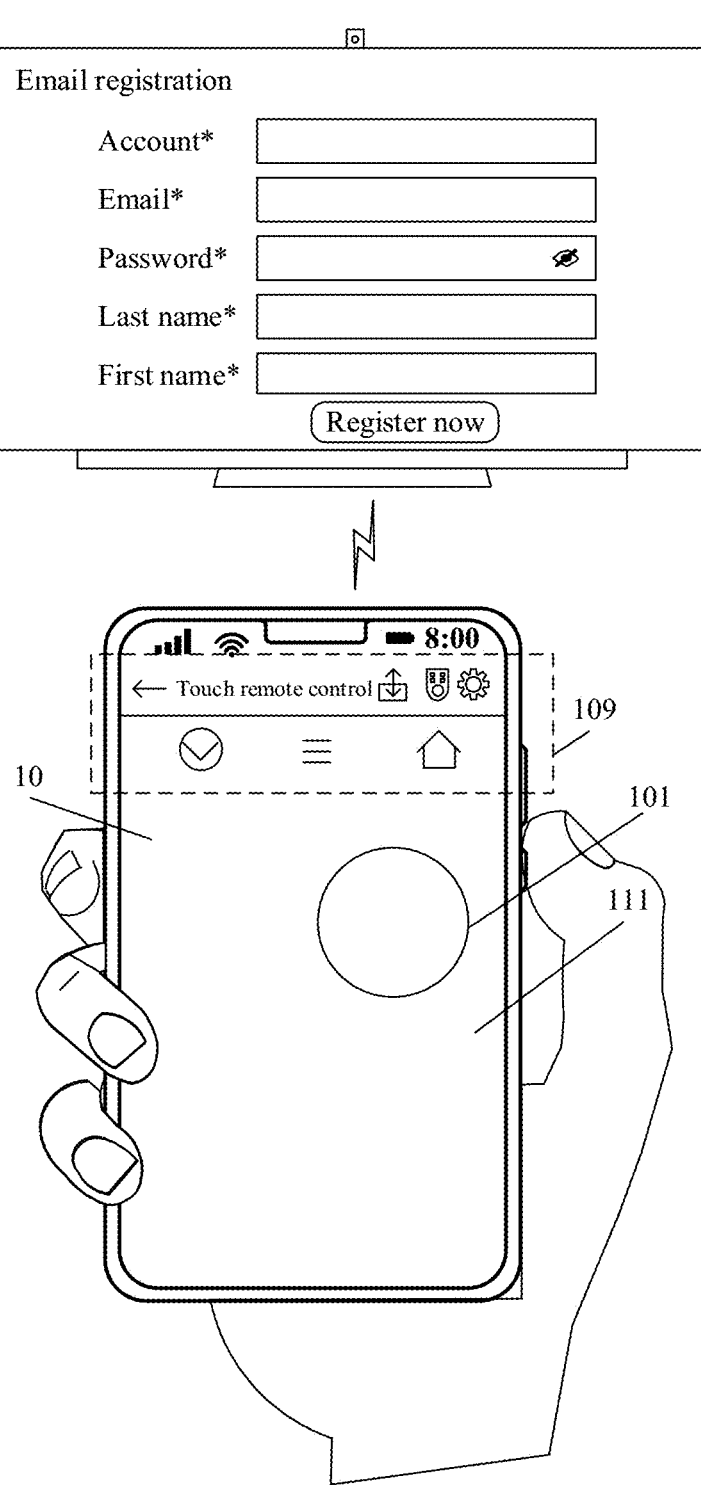
FIG. 28A and FIG. 28B are diagrams of interfaces according to an embodiment of this application.

For example, as shown in FIG. 28A, the user holds the mobile phone with a right hand. When detecting an intention (for example, tapping an icon of a remote control application) of the user to open a remote control application, the mobile phone may display a remote control interface 10, where a right half area of the remote control interface 10 includes a focus movement control area 101 (for example, a circle icon is used to indicate a range of the focus movement control area 101), and an area other than a function area 109 and the focus movement control 101 may be considered as a gesture control area 111. Optionally, the focus movement control area 101 and the gesture control area 111 may be displayed near a thumb operation area. In this way, the user can conveniently control a television by performing a one-hand operation.

Alternatively, optionally, the mobile phone may display a gesture control area 111 (for example, a range of the gesture control area 111 is prompted by using an icon of a specific shape) in a right half area, and an area other than the gesture control area 111 and a function area 109 may be considered as a focus movement control area 101.

Figure 28B:
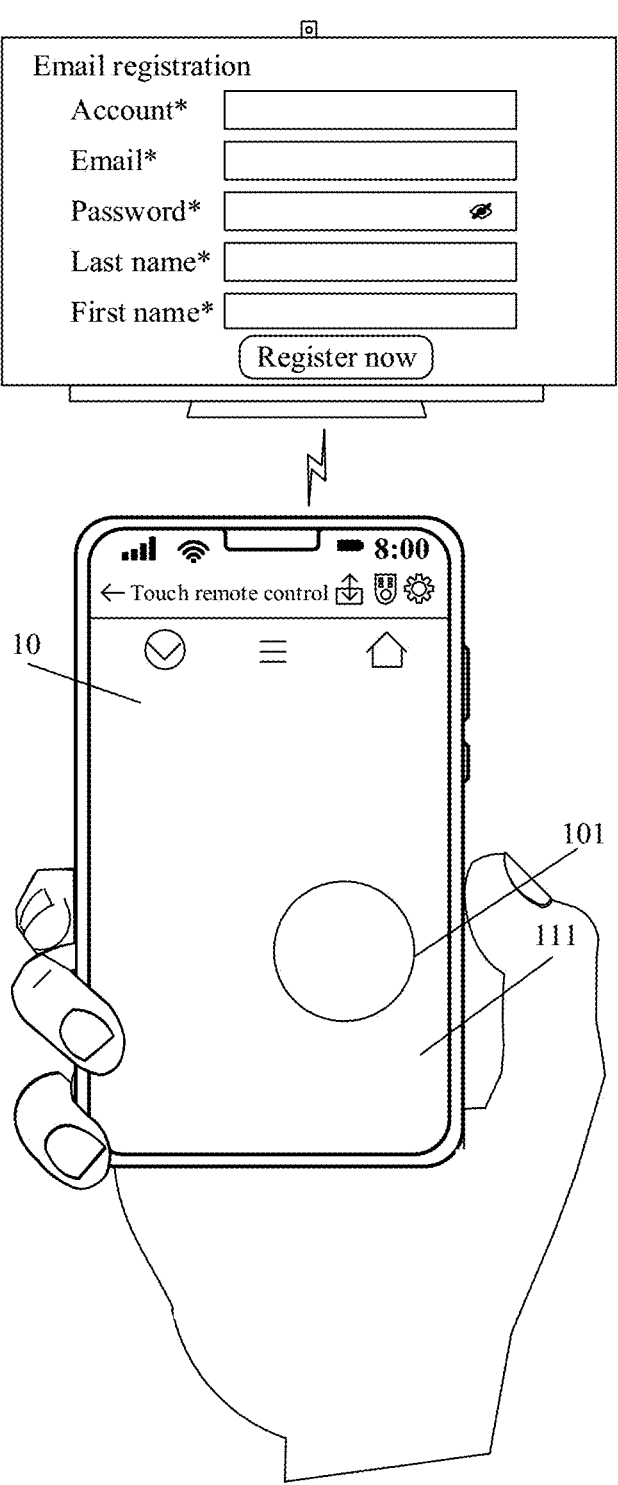

In a possible implementation, the mobile phone may determine a position and a size of a switch control (a focus movement control area, a gesture control area, or the like) on a screen based on an operation habit of the user. For example, when using the remote control function, the user is used to holding the mobile phone with the right hand and operating in a lower right area of the mobile phone screen. In this case, when the user subsequently opens the remote control application, as shown in FIG. 28B, the mobile phone may display the switch control (for example, the focus movement control area 101) in the lower right area of the screen.

Scenario 5

In this scenario, a mobile phone may intelligently control, based on behavior information of a user, a television to perform a corresponding operation, where the behavior information of the user includes but is not limited to a speed and a distance at which a finger slides on a mobile phone screen.

A focus movement scenario is used as an example. In a possible implementation, behavior information generated when a plurality of users use the mobile phone to interact with the television may be obtained based on big data and user authorization, and/or display-control ratios of a control device (for example, the mobile phone) to a controlled device (for example, the television) in different scenarios may be obtained, to define a reference value of the display-control ratio.

The display-control ratio may represent a ratio of a distance at which a cursor is moved on a controlled display (a display of the controlled device) to a distance at which a finger of the user moves on a control display (a display of the control device).

Figure 29:
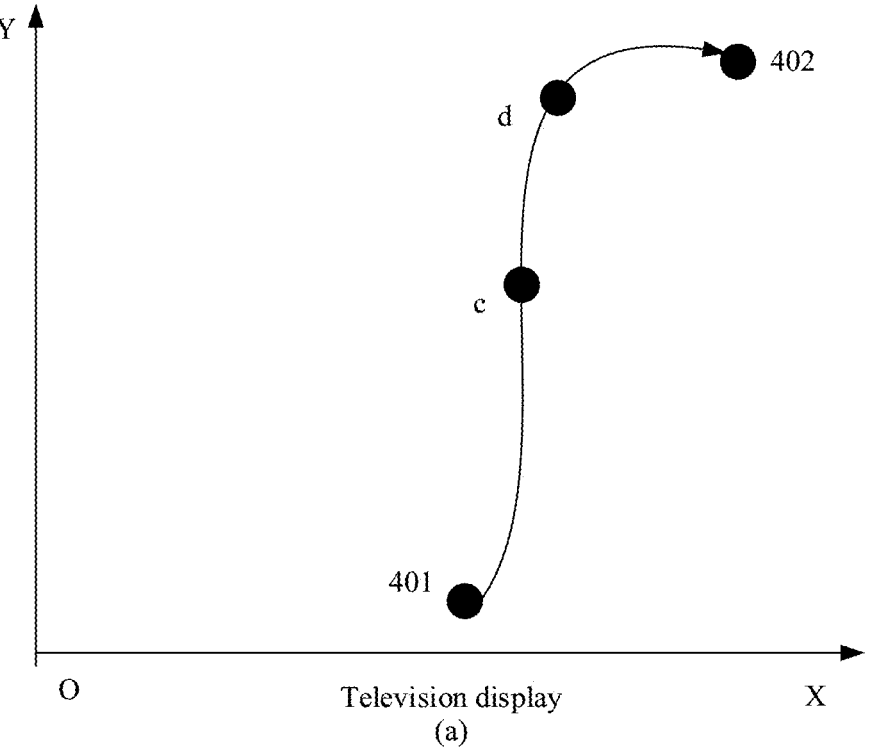
FIG. 29 is a diagram of coordinate mapping between a mobile phone screen and a television screen according to an embodiment of this application.
Figure 29:
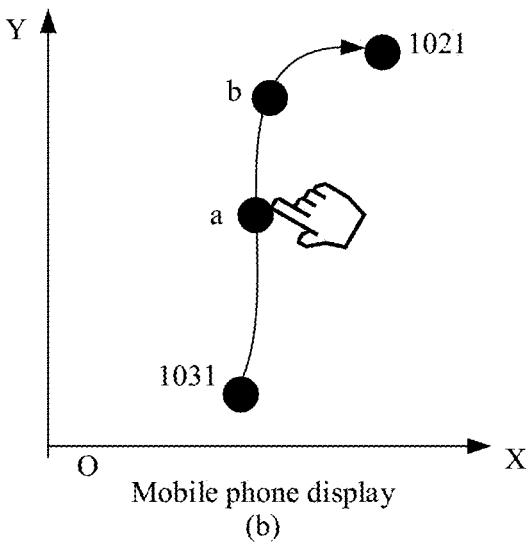

For example, as shown in (b) in FIG. 29, in response to that the finger of the user slides from a point a to a point b on the mobile phone screen, the mobile phone controls a focus on the television to move from a point c to a point d shown in (a) in FIG. 29. A ratio $(d_{cd}/d_{ab})$ of a distance $(d_{cd})$ between the point c and the point d to a distance $(d_{ab})$ between the point a and the point b is the display-control ratio.

In this embodiment of this application, display-control ratios generated when different users use the mobile phone to interact with the television may be collected based on the big data. For a user, there may be a plurality of control scenarios. For example, the user may use the mobile phone to control the television to perform focus movement, or use another control device (for example, a tablet) to control the television to perform focus movement.

It may be understood that, for a same user, because sizes of control devices and controlled devices are different in different scenarios, or operation habits (for example, a speed at which the finger slides on the mobile phone screen) of the user are different in different scenarios, display-control ratios may be different in different scenarios. For example, in a scenario in which the user uses a small-screen device like the mobile phone to control the television to perform focus movement, a size difference between the mobile phone and the television is large, and the display-control ratio is correspondingly large, that is, if the finger of the user slides on the mobile phone screen for a small distance, the focus on the television can be controlled to move for a large distance. Compared with a scenario in which the mobile phone is used to control the television, in a scenario in which the user controls the television by using a large-screen device like the tablet, a size difference between the tablet and the television is small, and the display-control ratio is correspondingly small.

In this embodiment of this application, a reference value of a display-control ratio of a target user may be determined based on display-control ratios generated when different users use control devices (for example, the mobile phone and the tablet) to interact with controlled devices (for example, the television) in different scenarios.

For example, the display-control ratios corresponding to a plurality of users in different scenarios are weighted based on the big data, and an obtained weighted result may be used as the reference value of the display-control ratio of the target user. Alternatively, the reference value of the display-control ratio may be determined in another method. A method for determining the reference value of the display-control ratio is not limited in embodiments of this application.

Figure 30A:
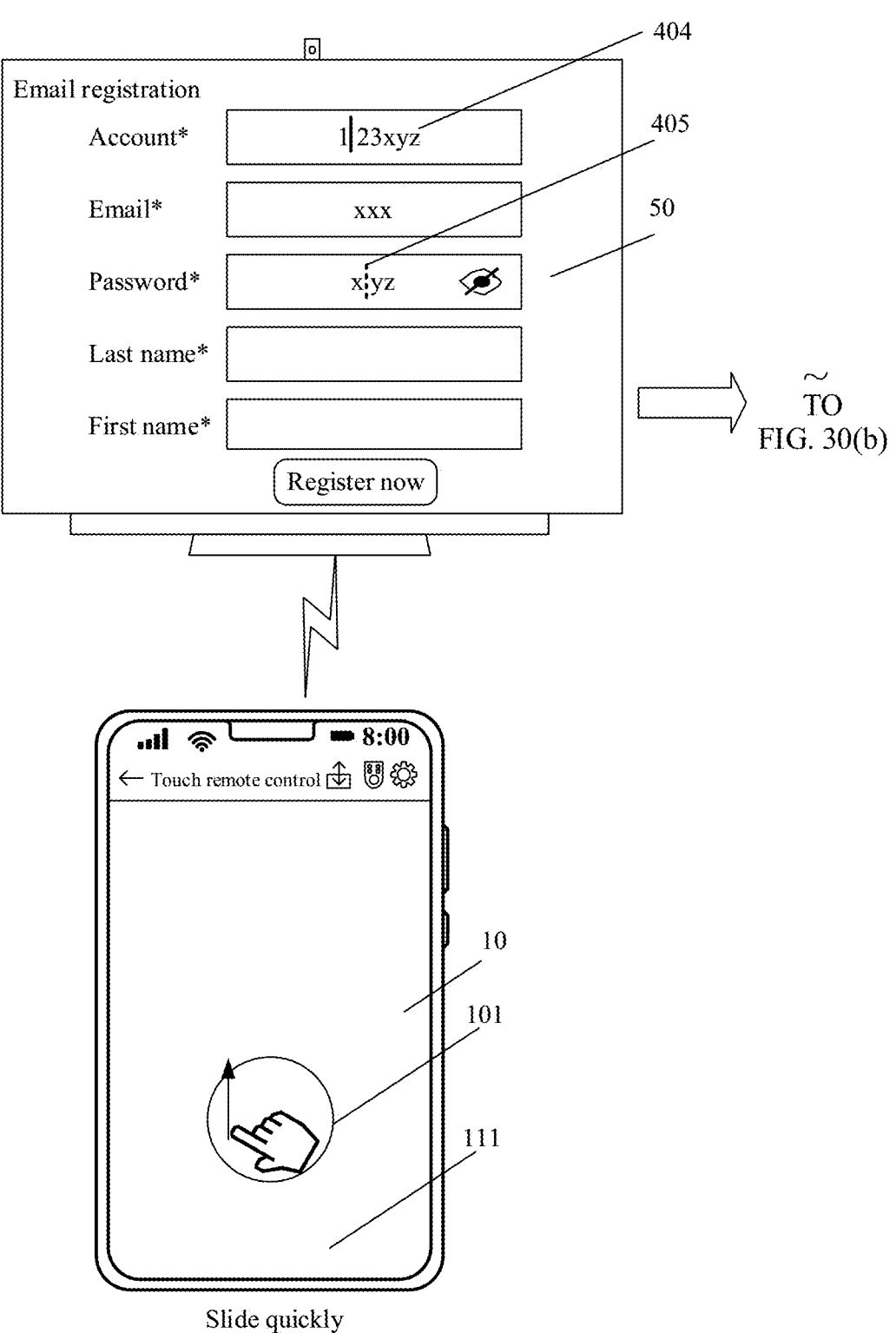

Then, the reference value of the display-control ratio may be adjusted based on the reference value of the display-control ratio of the target user and behavior information generated when the target user uses the control device to interact with the controlled device, to obtain a personalized display-control ratio that more fits with a behavior habit of the target user. For example, as shown in FIG. 30(a), when the finger of the target user slides quickly and for a long distance on the mobile phone screen, the mobile phone may increase the display-control ratio, so that the mobile phone can control the cursor on the television to move quickly for a long distance (for example, move from a position 405 to a position 404 on a television interface 50). In this way, the user can slide the finger on the mobile phone screen for a single time, to control the cursor on the television to move quickly and efficiently for a long distance.

Figures 30A, 30B:
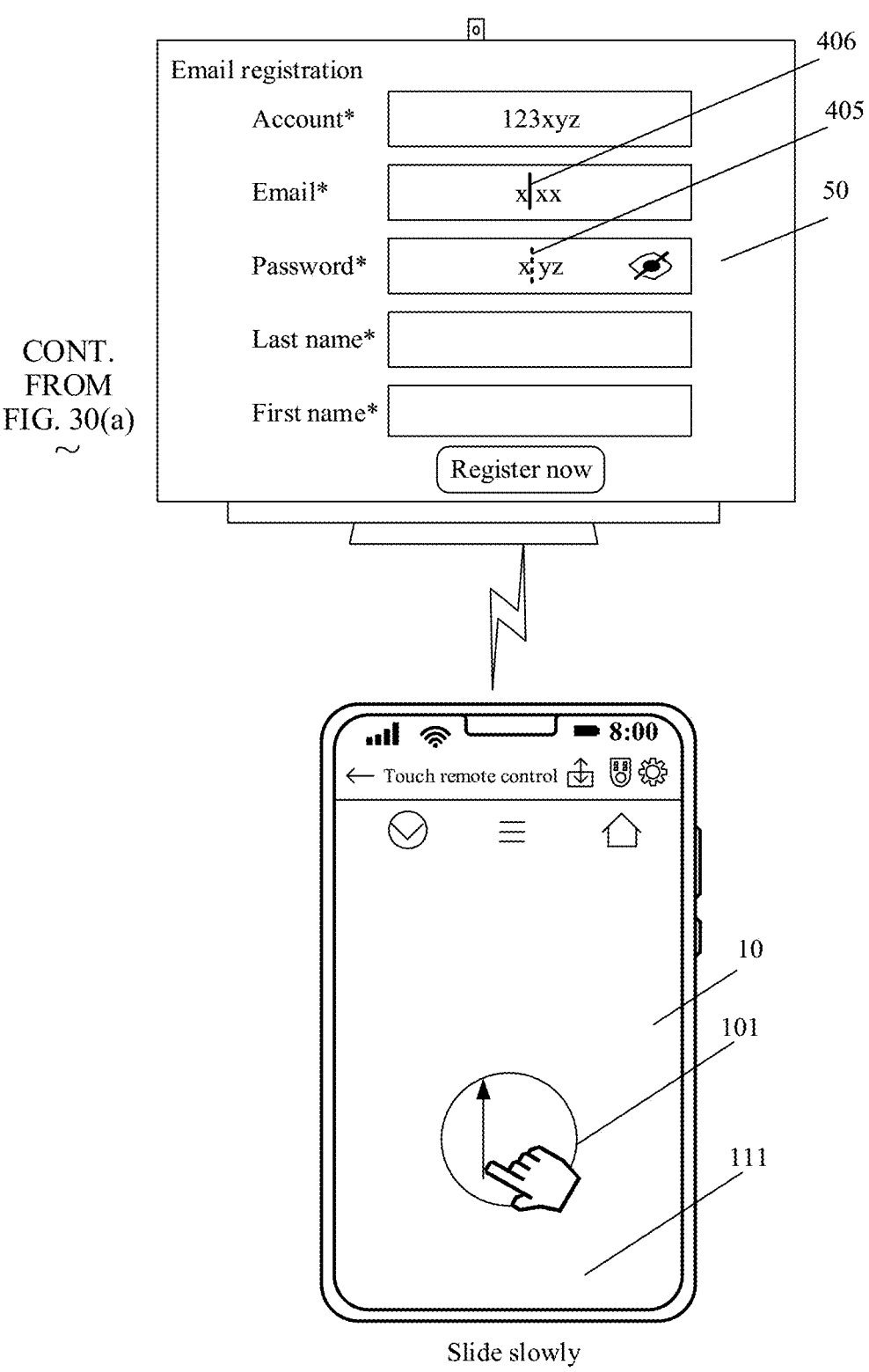

For another example, as shown in FIG. 30(*b*), when the finger of the target user slides slowly and for a short distance on the mobile phone screen, the mobile phone may reduce the display-control ratio, so that the mobile phone can control the cursor on the television to move slowly and precisely in a small range (for example, move from the position 405 to a position 406 on the television interface 50), to implement fine control.

Optionally, the technical solution in this embodiment is also applicable to a scenario in which the controlled device is controlled by using a gesture. For example, the solution may be applied to a scenario of reading news or a book on the television.

Figure 31A:
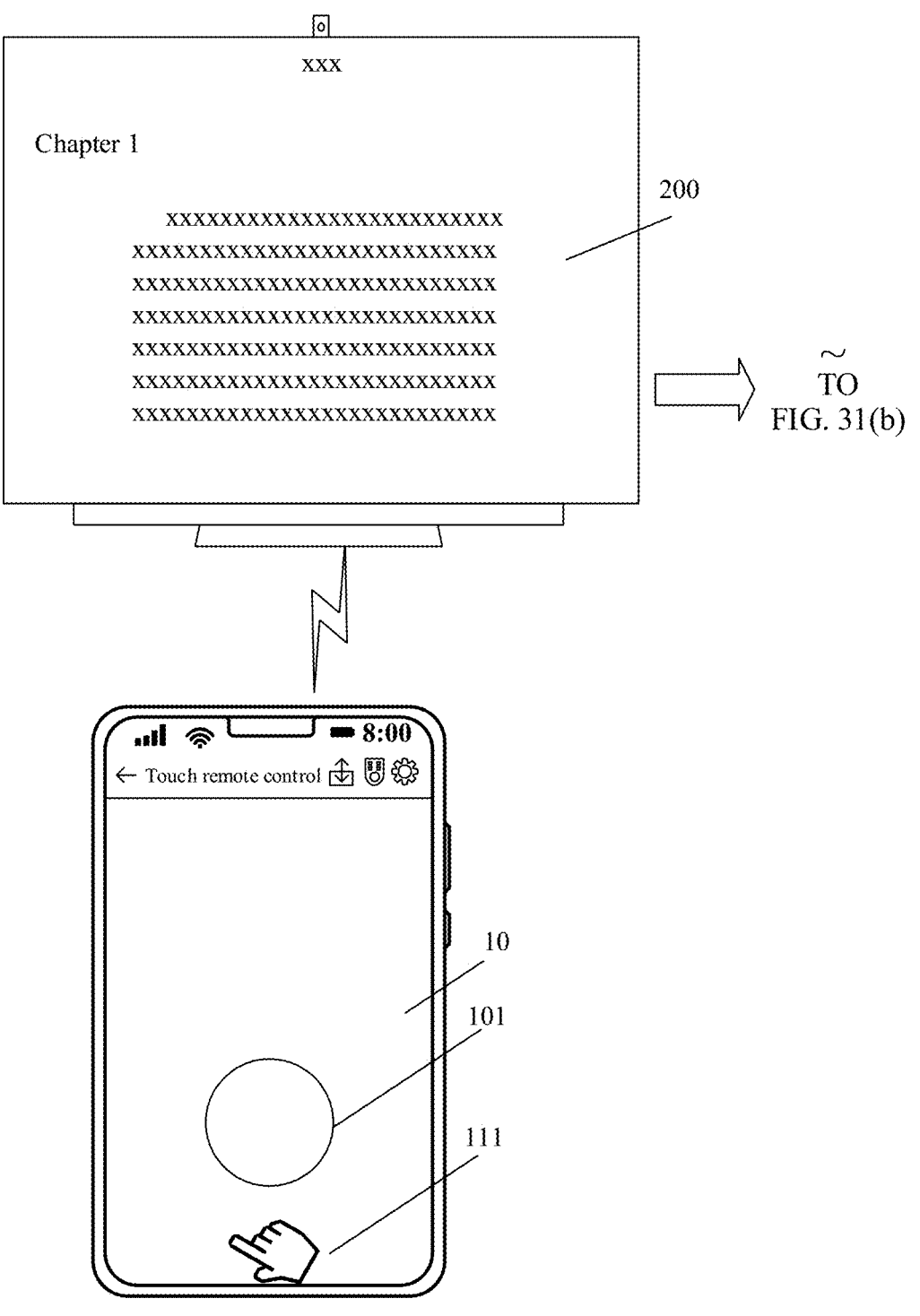
Figure 31B:
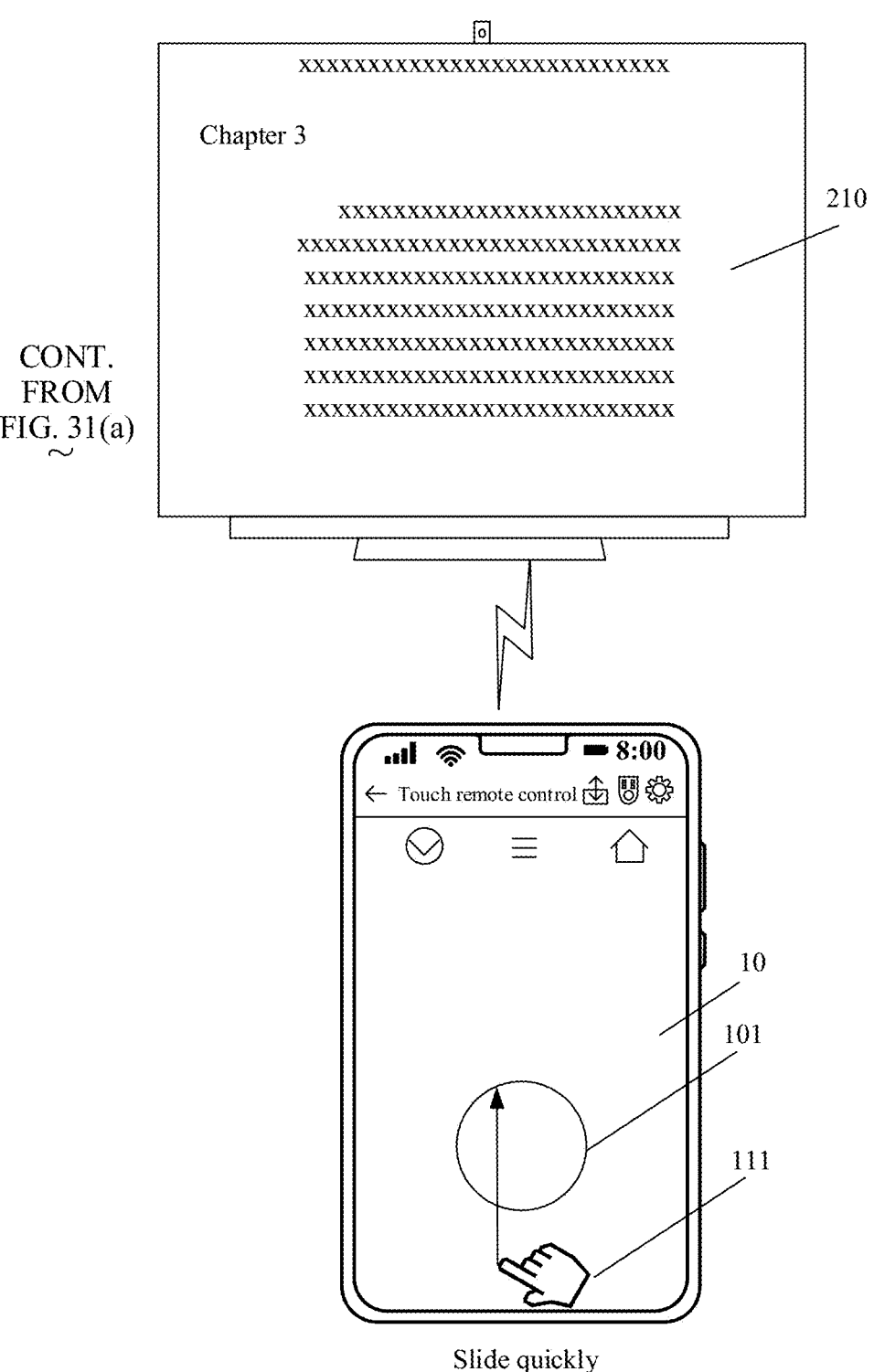

For example, as shown in FIG. 31(*a*), in a scenario of reading a book, the television displays an interface 200. When detecting an operation of tapping a gesture control area 111 on a mobile phone interface 10 by the user, the mobile phone switches a touch remote control from a current remote control mode to a gesture mode. As shown in FIG. 31(*b*), the user may slide the finger quickly and for a long distance on the mobile phone interface 10. The mobile phone may send information (for example, but not limited to a slide track and a slide speed) about a slide operation of the user to the television, and the television controls, based on the information about the slide operation, an interface on the television to accelerate and scroll, so as to display more interface content. For example, a television interface scrolls up from the interface 200 (displaying content of Chapter 1 of the book) shown in FIG. 31(*a*) to an interface 210 (displaying content of Chapter 3 of the book) shown in FIG. 31(*b*). In this way, the user can control, by using the mobile phone, the television to quickly refresh an interface, to provide more smooth reading experience for the user.

Figure 32A:
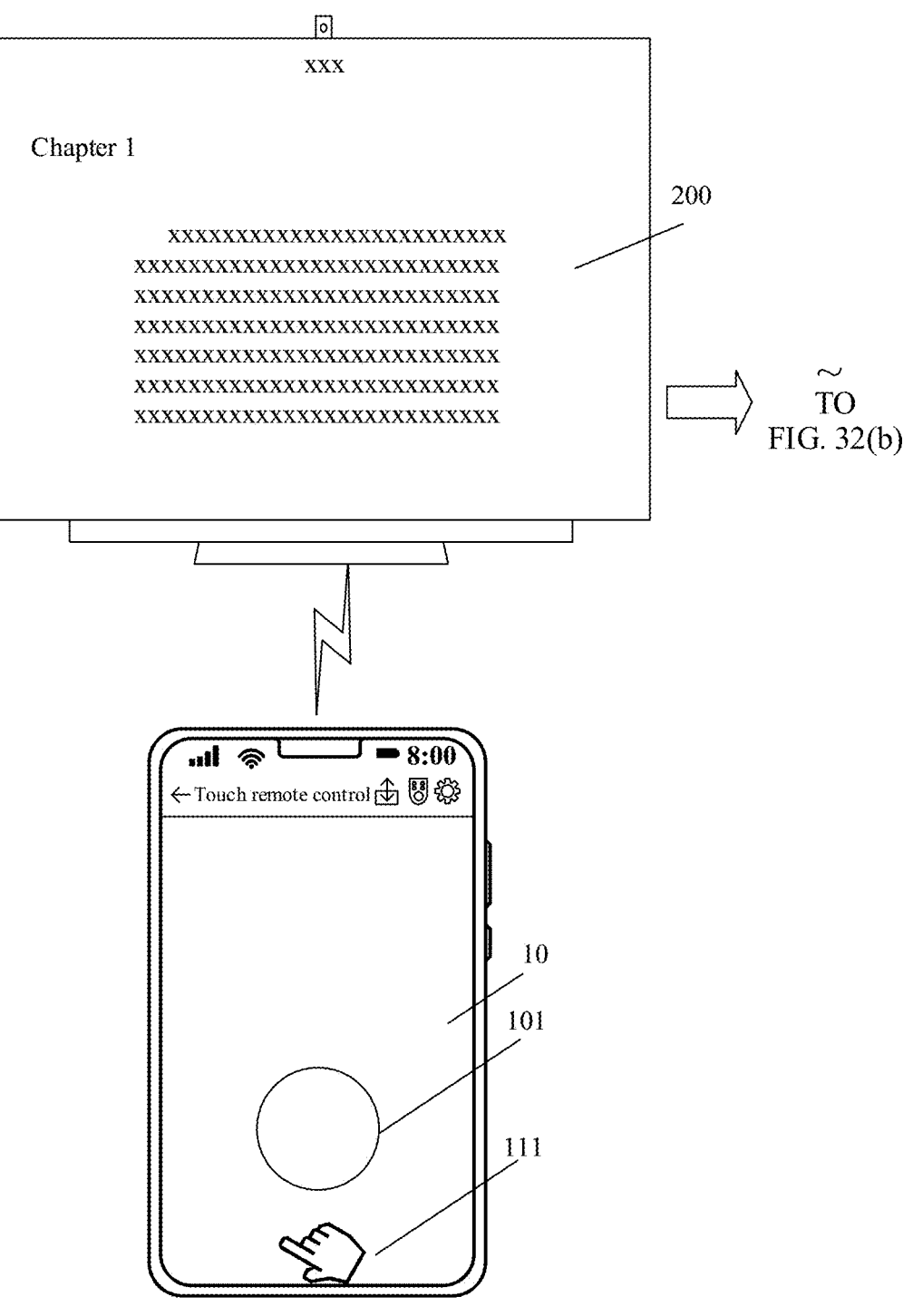
Figures 32A, 32B:
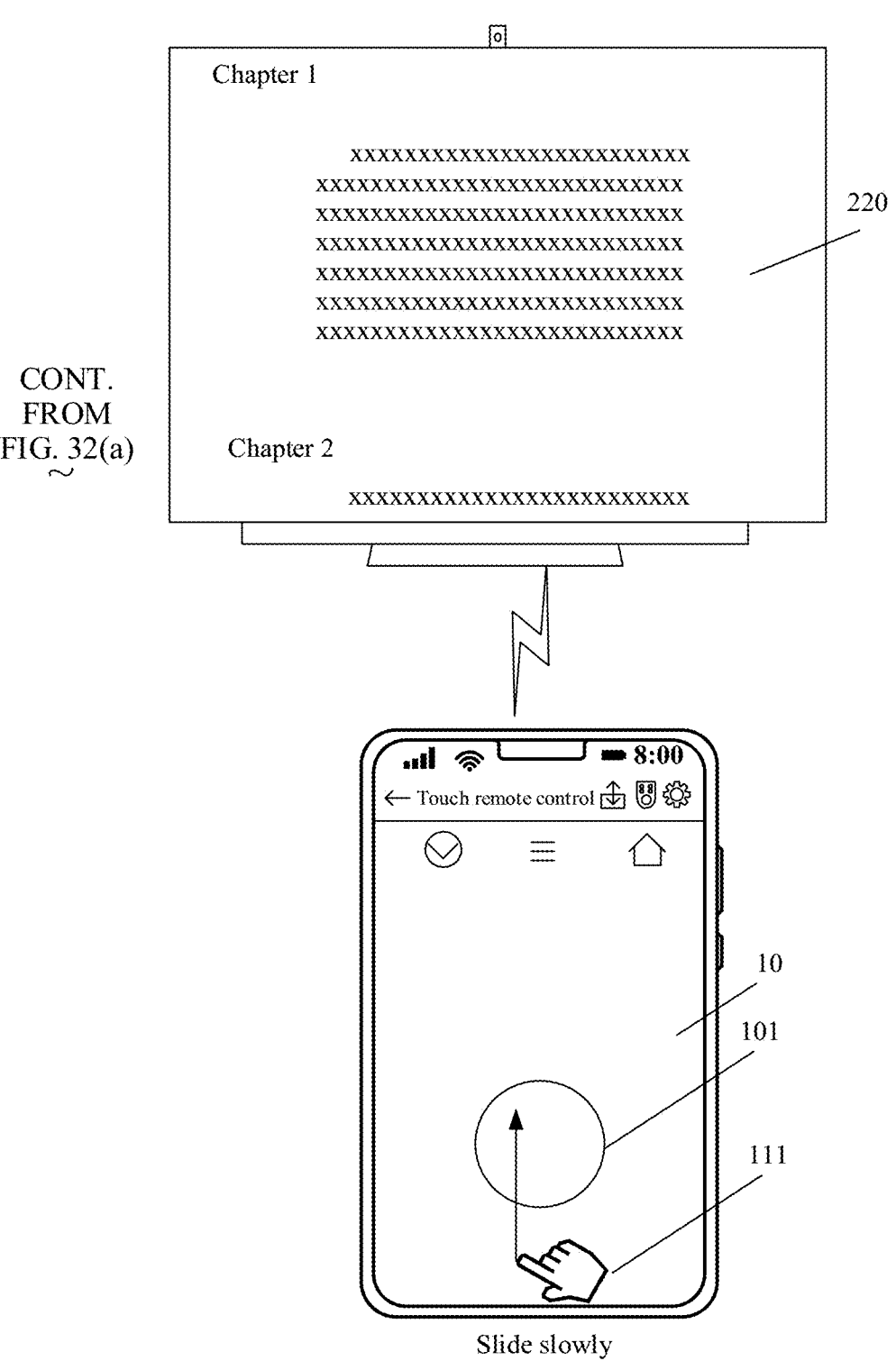

For another example, as shown in FIG. 32(*a*), the television displays an interface 200. When detecting an operation of tapping a gesture control area 111 on a mobile phone interface 10 by the user, the mobile phone switches a touch remote control from a current remote control mode to a gesture mode. As shown in FIG. 32(*b*), the user may slide the finger slowly and for a short distance on the mobile phone interface 10. The mobile phone may send information about a slide operation of the user to the television, and the television controls, based on the information about the slide operation, an interface on the television to slowly scroll. For example, a television interface scrolls up from the interface 200 (displaying content of Chapter 1 of the book) shown in FIG. 32(*a*) to an interface 220 (displaying the content of Chapter 1 and partial content of Chapter 2 of the book) shown in FIG. 32(*b*). In this way, the user may control, by using the mobile phone, the television to slowly refresh an interface, so that the user can see more details clearly, to implement careful and refined reading.

It should be noted that, because the cursor on the television may have different movement accelerations and/or speeds corresponding to different slide speeds of the finger of the user on the mobile phone screen, a movement track of the cursor on the television may be inconsistent with a slide track of the finger on the mobile phone. As shown in FIG. 29, a track from a position 401 to a position 402 on the television are not completely the same as a track of a position 1031 to a position 1021 on the mobile phone.

In a possible implementation, the display-control ratio of the target user may be determined by using a machine learning method. The machine learning method includes but is not limited to a self-learning machine learning method, for example, building a machine learning model. A training sample of the machine learning model includes but is not limited to one or more of the following: a screen size of the control device in different scenarios, a screen size of the controlled device in different scenarios, and interaction behavior information of different users. Optionally, the interaction behavior information of the user includes but is not limited to a speed, a distance, a track, and the like of an operation (for example, slide) performed by the user on a screen of the control device.

It may be understood that, after the machine learning model is constructed, the display-control ratio generated when the target user uses the control device (for example, the mobile phone) to control the controlled device (for example, the television) may be adjusted by using the machine learning model. For example, when detecting that the user slides the finger on the remote control interface of the mobile phone, the mobile phone inputs information (such as the slide speed, distance, and track) about a slide operation of the target user into the machine learning model, and the machine learning model outputs the display-control ratio. The mobile phone may perform corresponding control on the television based on the display-control ratio output by the machine learning model.

In this embodiment of this application, the machine learning model may be further updated. For example, after the machine learning model is constructed, the machine learning model may be trained by using more training samples (for example, historical interaction behavior information of the target user) periodically or based on another condition, to improve accuracy of the machine learning model. In this way, as a quantity of times of interaction of the user increases, and time of interaction increases, a personalized machine learning model that increasingly matches the target user can be obtained, so that the target user can obtain increasingly convenient control experience.

An embodiment of this application further provides a device control method. When detecting a remote control intention, a mobile phone may switch, by default, to a touch remote control interface that can support operations on a plurality of types of applications. Subsequently, when detecting a switching intention of the user, the mobile phone may switch from the touch remote control interface to a button remote control interface.

The foregoing one or more interfaces are all examples. In some other embodiments, there may be another interface design. For example, a focus movement control area 1807 and a gesture control area 1806 in FIG. 16A may be of a same shape or different shapes. Optionally, a layout of the focus movement control area 1807 and the gesture control area 1806 on a screen may be another layout. For example, the focus movement control area 1807 is located above the gesture control area 1806. For another example, a shape, a position, a size, and the like of each control on a remote control interface are not limited. For another example, when the remote control interface includes a plurality of controls (for example, a focus movement control area and a gesture control area), whether the controls have a same position relationship and shape is not limited.

It should be noted that some operations in procedures of the foregoing method embodiments are randomly combined, and/or a sequence of some operations is randomly changed. In addition, an execution sequence between steps of each process is merely an example, and does not constitute a limitation on the execution sequence between the steps. The steps may alternatively be performed in another execution sequence. It is not intended to indicate that the execution sequence is the only sequence in which these operations can be performed. A person of ordinary skill in the art may learn various manners of permutating the operations described in this specification. In addition, it should be noted that process details related to an embodiment in this specification are also applicable to another embodiment in a similar manner, or different embodiments may be used in combination.

In addition, some steps in the method embodiments may be equivalently replaced with other possible steps. Alternatively, some steps in the method embodiments may be optional, and may be deleted in some use scenarios. Alternatively, another possible step may be added to the method embodiments.

In addition, the foregoing method embodiments may be implemented separately or in combination.

Some other embodiments of this application provide an apparatus. The apparatus may be the foregoing second electronic device, the foregoing first electronic device, a component in the first electronic device, or a component (for example, a chip system) in the second electronic device. The apparatus may include a display, a memory, and one or more processors. The display and the memory are coupled to the processor. The memory is configured to store computer program code. The computer program code includes computer instructions. When the processor executes computer instructions, the electronic device may perform functions or steps performed by the mobile phone in the foregoing method embodiments. For a structure of the electronic device, refer to the structure of the electronic device 100 shown in FIG. 2 or the electronic device shown in FIG. 4.

Figure 33:
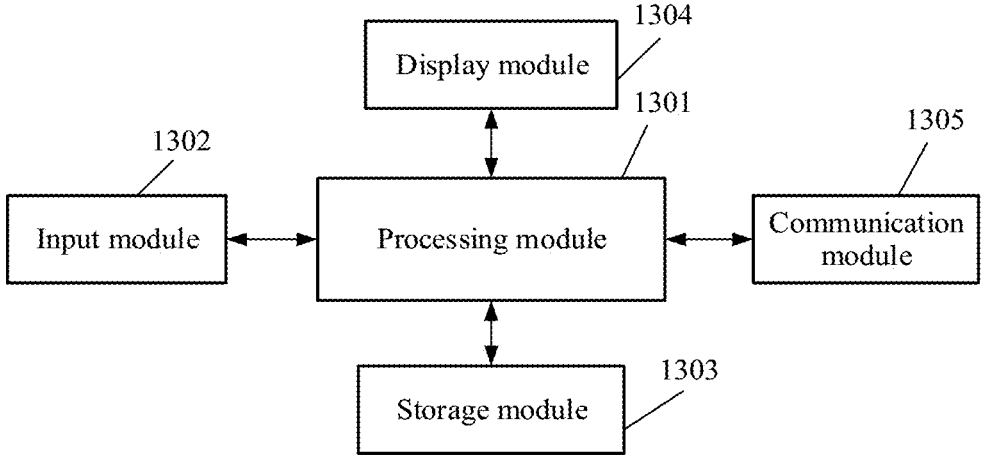
FIG. 33 is a diagram of a structure of a device control apparatus according to an embodiment of this application.

A core structure of the electronic device may be represented as a structure shown in FIG. 33. The electronic device includes a processing module 1301, an input module 1302, a storage module 1303, a display module 1304, and a communication module 1305.

The processing module 1301 may include at least one of a central processing unit (CPU), an application processor (AP), or a communication processor (CP). The processing module 1301 may perform an operation or data processing related to control and/or communication of at least one of other elements of a user electronic device. Specifically, the processing module 1301 may be configured to: control, based on a specific trigger condition, content displayed on a primary screen; or determine, according to a preset rule, the content displayed on the screen. The processing module 1301 is further configured to: process input instructions or data, and determine a display style based on processed data.

The input module 1302 is configured to obtain instructions or data inputted by a user, and transmit the obtained instructions or data to another module of the electronic device. Specifically, an input mode of the input module 1302 may include touch, gesture, proximity to a screen, voice, or the like. For example, the input module may be a screen of the electronic device, and may obtain an input operation of the user, generate an input signal based on the obtained input operation, and transmit the input signal to the processing module 1301.

The storage module 1303 may include a volatile memory and/or a nonvolatile memory. The storage module is configured to store instructions or data related to at least one of other modules of a user terminal device.

The display module 1304 may include, for example, a liquid crystal display (LCD), a light emitting diode (LED) display, an organic light-emitting diode (OLED) display, a micro-electro-mechanical system (MEMS) display, or an electronic paper display, and is configured to display content (for example, a text, an image, a video, an icon, and a symbol) that can be viewed by the user.

The communication module 1305 is configured to support communication (through a communication network) between a personal terminal and another personal terminal. For example, the communication module may be connected to a network through wireless communication or wired communication, to communicate with another personal terminal or a network server. The wireless communication may use at least one of cellular communication protocols, such as long term evolution (LTE), long term evolution advanced (LTE-A), code division multiple access (CDMA), wideband code division multiple access (WCDMA), universal mobile telecommunications system (UMTS), wireless broadband (WiBro), or a global system for mobile communications (GSM). The wireless communication may include, for example, short-range communication. The short-range communication may include at least one of wireless fidelity (Wi-Fi), Bluetooth, near field communication (NFC), magnetic stripe transmission (MST), or GNSS.

The apparatus shown in FIG. 33 may further include more or fewer components, or splits from a part of the components, or another manner of a layout of components. This is not limited in embodiments of this application.

Figure 34:
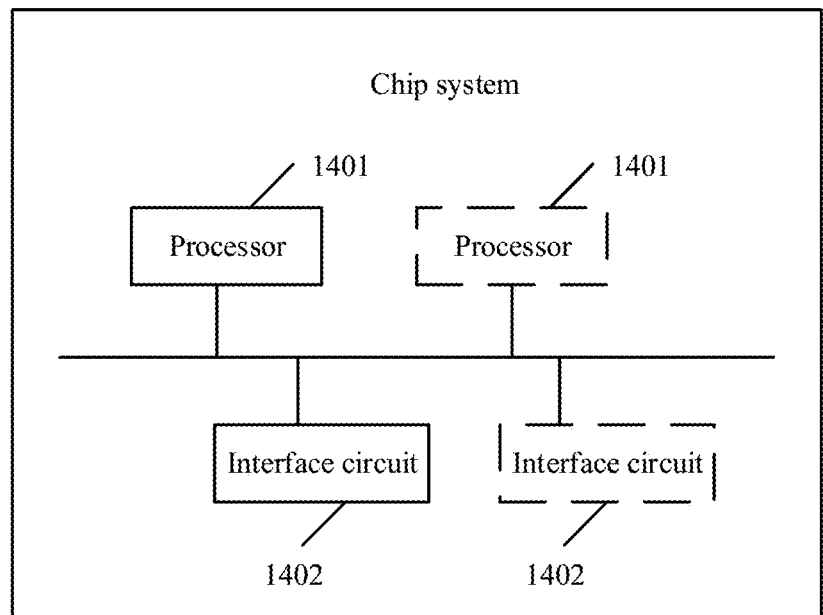
FIG. 34 is a diagram of a structure of a chip system according to an embodiment of this application.

An embodiment of this application further provides a chip system. As shown in FIG. 34, the chip system includes at least one processor 1401 and at least one interface circuit 1402. The processor 1401 and the interface circuit 1402 may be connected to each other through a line. For example, the interface circuit 1402 may be configured to receive a signal from another apparatus (for example, a memory of an electronic device). For another example, the interface circuit 1402 may be configured to send a signal to another apparatus (for example, the processor 1401). For example, the interface circuit 1402 may read instructions stored in the memory, and send the instructions to the processor 1401. When the instructions are executed by the processor 1401, the electronic device is enabled to perform the steps in the foregoing embodiments. Certainly, the chip system may further include another discrete device. This is not specifically limited in embodiments of this application.

An embodiment of this application further provides a computer storage medium. The computer storage medium includes computer instructions. When the computer instructions are run on the foregoing electronic device, the electronic device is enabled to perform functions or steps performed by the mobile phone in the foregoing method embodiments.

An embodiment of this application further provides a computer program product. When the computer program product runs on a computer, the computer is enabled to perform functions or steps performed by the mobile phone in the foregoing method embodiments.

The foregoing description about implementations allows a person skilled in the art to clearly understand that, for the purpose of convenient and brief description, division of the foregoing functional modules is used as an example for illustration. In an actual application, the foregoing functions can be allocated to different modules and implemented based on a requirement, that is, an inner structure of an apparatus is divided into different functional modules, to implement all or some of the functions described above.

In the several embodiments provided in this application, it should be understood that the disclosed apparatus and method may be implemented in other manners. For example, the described apparatus embodiment is merely an example.

For example, division into the modules or the units is merely logical function division and there may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of software functional unit.

When the integrated unit is implemented in the form of software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in the form of software product. The software product is stored in a storage medium and includes several instructions for instructing a device (which may be a single-chip microcomputer, a chip or the like) or a processor to perform all or some of the steps of the methods described in embodiments of this application. The foregoing storage medium includes any medium that can store program code, for example, a USB flash drive, a removable hard disk, a read-only memory (ROM), a random access memory (RAM), a magnetic disk, or an optical disc.

The foregoing description is merely specific implementations of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed:

1. A method, comprising:
obtaining, on a first control interface of a first electronic device, a start point of a first slide operation, the start point of the first slide operation within a focus movement control area of the first control interface;
performing, on a second electronic device, operation control associated with the first slide operation in a focus movement mode, wherein a trajectory of the first slide operation passes through a gesture control area of the first control interface, and wherein the operation control associated with the first slide operation in the focus movement mode comprises moving a focus on a display interface of the second electronic device;
obtaining, on the first control interface, a start point of a second slide operation, the start point of the second slide operation within the gesture control area of the first control interface; and
performing, on the second electronic device, operation control associated with the second slide operation in a gesture mode, wherein a trajectory of the second slide operation passes through the focus movement control area of the first control interface, and wherein the operation control associated with the second slide operation in the gesture mode comprises scrolling the display interface of the second electronic device, or zooming in or out the display interface of the second electronic device.

2. The method according to claim 1, further comprising:
receiving, in the focus movement mode or the gesture mode, an input operation on the first control interface; and
performing, in response to the input operation, an associated operation on the display interface of the second electronic device, wherein the input operation comprises at least one of the following: tap, double-tap, or touch and hold.

3. The method according to claim 2, wherein the first control interface comprises a function area, the function area comprises one or more function controls, and when being operated, the one or more function controls may execute one or more corresponding functions associated with the second electronic device.

4. The method according to claim 3, wherein in the focus movement mode or the gesture mode, an area of the first control interface available for the input operation excludes the function area.

5. The method according to claim 1, further comprising:
obtaining information about an application on the display interface of the second electronic device; and
switching the first electronic device from the first control interface to a second control interface based on the obtained information about the application, wherein a manner of performing operation control on the second electronic device with the second control interface is different from a manner of performing operation control on the second electronic device with the first control interface.

6. The method according to claim 5, further comprising:
determining, based on user actions with the first electronic device, that a user intends to perform operation control on the second electronic device; and wherein
obtaining information about the application on the display interface of the second electronic device comprises:
obtaining information about the display interface of the second electronic device in response to the determined intention, the information about the application on the display interface comprised of the information about the display interface.

7. The method according to claim 5, wherein switching the first electronic device from the first control interface to the second control interface based on the obtained information about the application comprises:
displaying an interface switching prompt on the first electronic device based on the obtained information about the application;
obtaining a selection operation associated with the prompt; and
switching from the first control interface to the second control interface in response to the selection operation.

8. The method according to claim 7, wherein the information about the application comprises a type of the application.

9. The method according to claim 5, wherein the second control interface is an operation control interface comprising a button control component.

10. The method according to claim 1, further comprising:

obtaining an interface switching event on the first electronic device; and switching the first electronic device from the first control interface to a second control interface in response to the interface switching event, wherein a manner of performing operation control on the second electronic device on the second control interface is different from a manner of performing operation control on the second electronic device on the first control interface.

11. The method according to claim 1, further comprising:

displaying a setting interface based on an obtained user instruction, wherein the setting interface is used for setting content associated with a first touch area or a second touch area on the first control interface.

12. The method according to claim 11, wherein the content indicates one or more of the following items of the first touch area or the second touch area: a shape, a position, or a size of the area.

13. The method according to claim 1, wherein before the second electronic device is controlled to perform an operation corresponding to the first slide operation, the method further comprises:

obtaining an operation parameter of the first slide operation, wherein the operation parameter comprises one or more of speed, acceleration, or distance; and performing, on the second electronic device, operation control associated with the first slide operation in the focus movement mode comprises:

performing, on the second electronic device in the focus movement mode based on the operation parameter of the first slide operation, the operation control associated with the first slide operation.

14. The method according to claim 1, further comprising:

detecting a holding posture of a user on the first electronic device; and displaying the first control interface based on the holding posture, wherein a layout of a first touch area or a second touch area on the first control interface is associated with the holding posture.

15. A first electronic device, comprising:

a first control interface, the first control interface including a focus movement control area and a gesture control area;

a memory;

one or more processors; and a display, wherein:

the memory and the display are coupled to the processor, the memory is configured to store computer program code, the computer program code comprises computer instructions and, when the one or more processors execute the computer instructions, the first electronic device is enabled to perform:

obtaining, on the first control interface, a start point of a first slide operation, the start point of the first slide operation within the focus movement control area;

performing, on a second electronic device, operation control associated with the first slide operation in a focus movement mode, wherein a trajectory of the first slide operation passes through the gesture control area of the first control interface, and wherein the operation control associated with the first slide operation in the focus movement mode comprises moving a focus on a display interface of the second electronic device;

obtaining, on the first control interface, a start point of a second slide operation, the start point of the second slide operation within the gesture control area; and performing, on the second electronic device, operation control associated with the second slide operation in a gesture mode, wherein a trajectory of the second slide operation passes through the focus movement control area of the first control interface, and wherein the operation control associated with the second slide operation in the gesture mode comprises scrolling the display interface of the second electronic device, or zooming in or out the display interface of the second electronic device.

16. The first electronic device according to claim 15, wherein the first electronic device is further enabled to perform:

receiving, in the focus movement mode or the gesture mode, an input operation on the first control interface; and performing, in response to the input operation, an associated operation on the display interface of the second electronic device, wherein the input operation comprises at least one of the following: tap, double-tap, or touch and hold.

17. The first electronic device according to claim 15, wherein the first control interface comprises a function area, the function area comprises one or more function controls, and when being operated, the one or more function controls may execute one or more corresponding functions associated with the second electronic device.

18. The first electronic device according to claim 15, wherein the first electronic device is further enabled to perform:

displaying a setting interface based on an obtained user instruction, wherein the setting interface is used for setting content associated with a first touch area or a second touch area on the first control interface.

19. The first electronic device according to claim 15, wherein before the second electronic device is controlled to perform an operation corresponding to the first slide operation, the first electronic device performs:

obtaining an operation parameter of the first slide operation, wherein the operation parameter comprises one or more of speed, acceleration, or distance; and performing, on the second electronic device, operation control associated with the first slide operation in the focus movement mode comprises:

performing, on the second electronic device in the focus movement mode based on the operation parameter of the first slide operation, the operation control associated with the first slide operation.

20. The first electronic device according to claim 15, wherein the first electronic device is further enabled to perform:

detecting a holding posture of a user on the first electronic device; and displaying the first control interface based on the holding posture, wherein a layout of a first touch area or a second touch area on the first control interface is associated with the holding posture.

* * * * *